(12) United States Patent
Yap

(10) Patent No.: US 7,321,373 B2
(45) Date of Patent: Jan. 22, 2008

(54) METHOD FOR PERFORMING SET OPERATIONS ON TWO OR MORE ARBITRARY PATHS TO PRODUCE A SIMPLE OUTLINE PATH

(75) Inventor: Sim Thong Yap, Marsfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 593 days.

(21) Appl. No.: 10/323,804

(22) Filed: Dec. 20, 2002

(65) Prior Publication Data

US 2003/0122830 A1    Jul. 3, 2003

(30) Foreign Application Priority Data

Dec. 21, 2001    (AU)    ................................. PR9705

(51) Int. Cl.
*G09G 5/00*    (2006.01)
(52) U.S. Cl. ...................................... 345/629
(58) Field of Classification Search ................ 345/421, 345/586, 623, 624, 629, 630
See application file for complete search history.

(56) References Cited

U.S. PATENT DOCUMENTS

| | | | | |
|---|---|---|---|---|
| 4,815,009 A | | 3/1989 | Blatin | .......................... 364/518 |
| 5,278,983 A | * | 1/1994 | Kawabe et al. | .............. 345/420 |
| 5,353,394 A | * | 10/1994 | Kubota | ......................... 345/441 |
| 5,379,225 A | * | 1/1995 | Tazawa et al. | ................. 700/98 |
| 5,438,656 A | | 8/1995 | Valdes et al. | ................ 395/143 |
| 5,471,568 A | * | 11/1995 | Webb et al. | ................. 382/199 |
| 5,579,461 A | * | 11/1996 | Saha | ........................... 345/443 |
| 5,630,039 A | * | 5/1997 | Fossum | ....................... 345/443 |
| 5,745,121 A | * | 4/1998 | Politis | ......................... 345/619 |
| 5,818,460 A | | 10/1998 | Covey et al. | ................. 345/443 |
| 6,005,586 A | | 12/1999 | Morita et al. | ................ 345/434 |
| 6,111,587 A | * | 8/2000 | Covey et al. | ................. 345/629 |
| 6,795,589 B1 | * | 9/2004 | Tlaskal et al. | ............... 382/284 |
| 6,985,161 B1 | * | 1/2006 | Politis | ......................... 345/629 |

FOREIGN PATENT DOCUMENTS

| | | |
|---|---|---|
| AU | 771813 | 10/2002 |
| JP | 63-280388 | 11/1988 |
| JP | 10-79038 | 3/1998 |
| JP | 2001-25190 | 2/2001 |

\* cited by examiner

*Primary Examiner*—Ulka Chauhan
*Assistant Examiner*—Dan Washburn
(74) *Attorney, Agent, or Firm*—Fitzpatrick, Cella, Harper & Scinto

(57) ABSTRACT

A computer implemented method determines an output path for use in rendering one or more graphical objects, the output path being determined from two or more input paths, based on a predetermined set operation, with each of the input paths having at least one edge, and each of the edges including one or more original segments. The method includes the steps of converting each of the two or more input paths into corresponding simple outline path representations, each of the simple output path representations having one or more of the original segments or parts thereof, and intersecting at least one original segment from one of the simple outline path representations with at least one original segment from at least another one of the simple outline path representations, depending on the predetermined set operation, to select one or more of the original segments or parts thereof to be used in the output path. The selected original segments or parts thereof are combined to determine the output path.

39 Claims, 70 Drawing Sheets

$y_{min}$ = y-coordinate of the starting vertex.

$y_{max}$ = y-coordinate of the ending vertex.

$y_{bucket}$ = y-coordinate of the current bucket being processed.

$x_{min}$ = x-coordinate of the starting vertex.

$x_{max}$ = x-coordinate of the ending vertex.

$x_{cur}$ = x-coordinate on the current bandline.

Fig. 6(b)

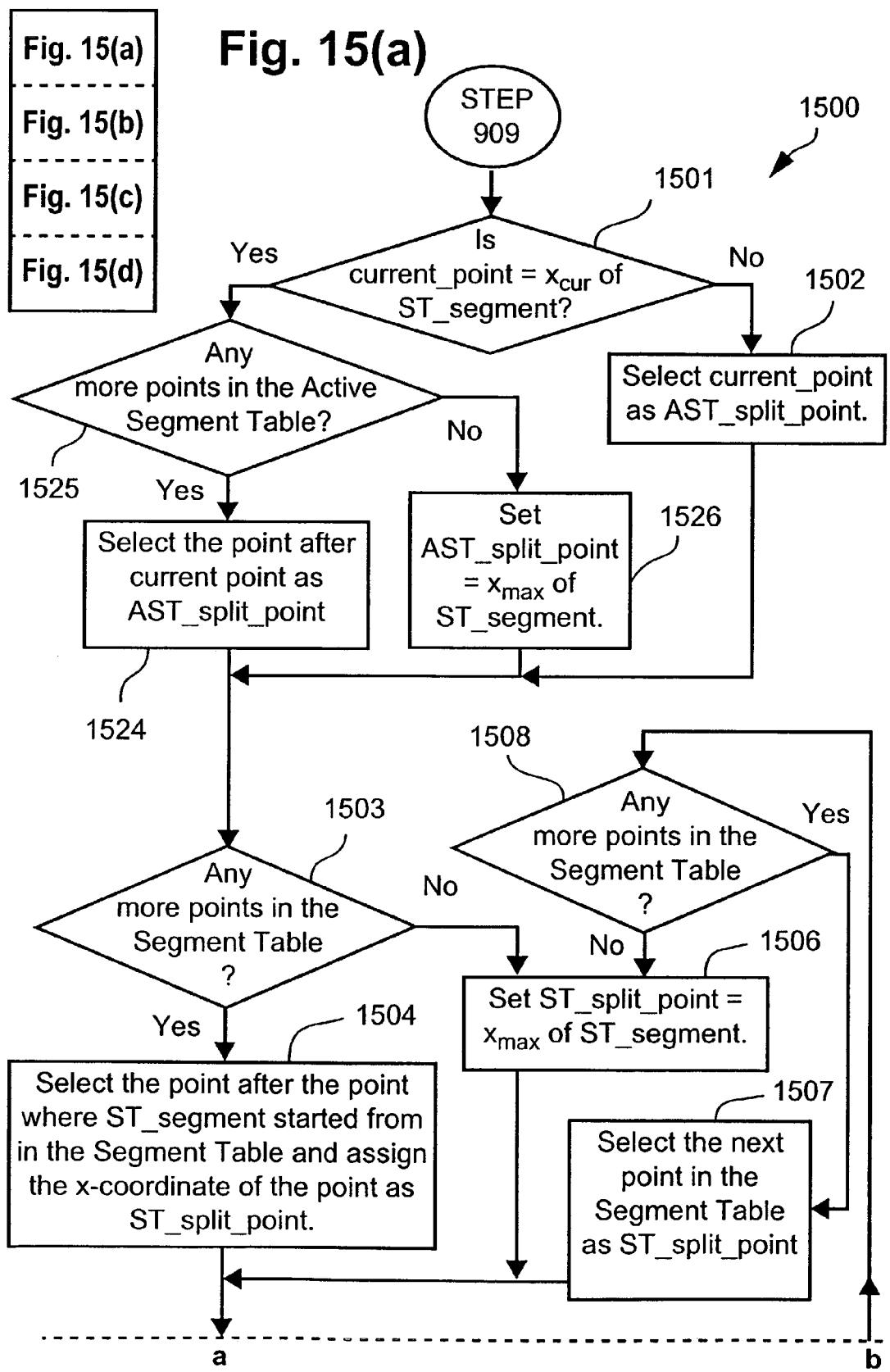

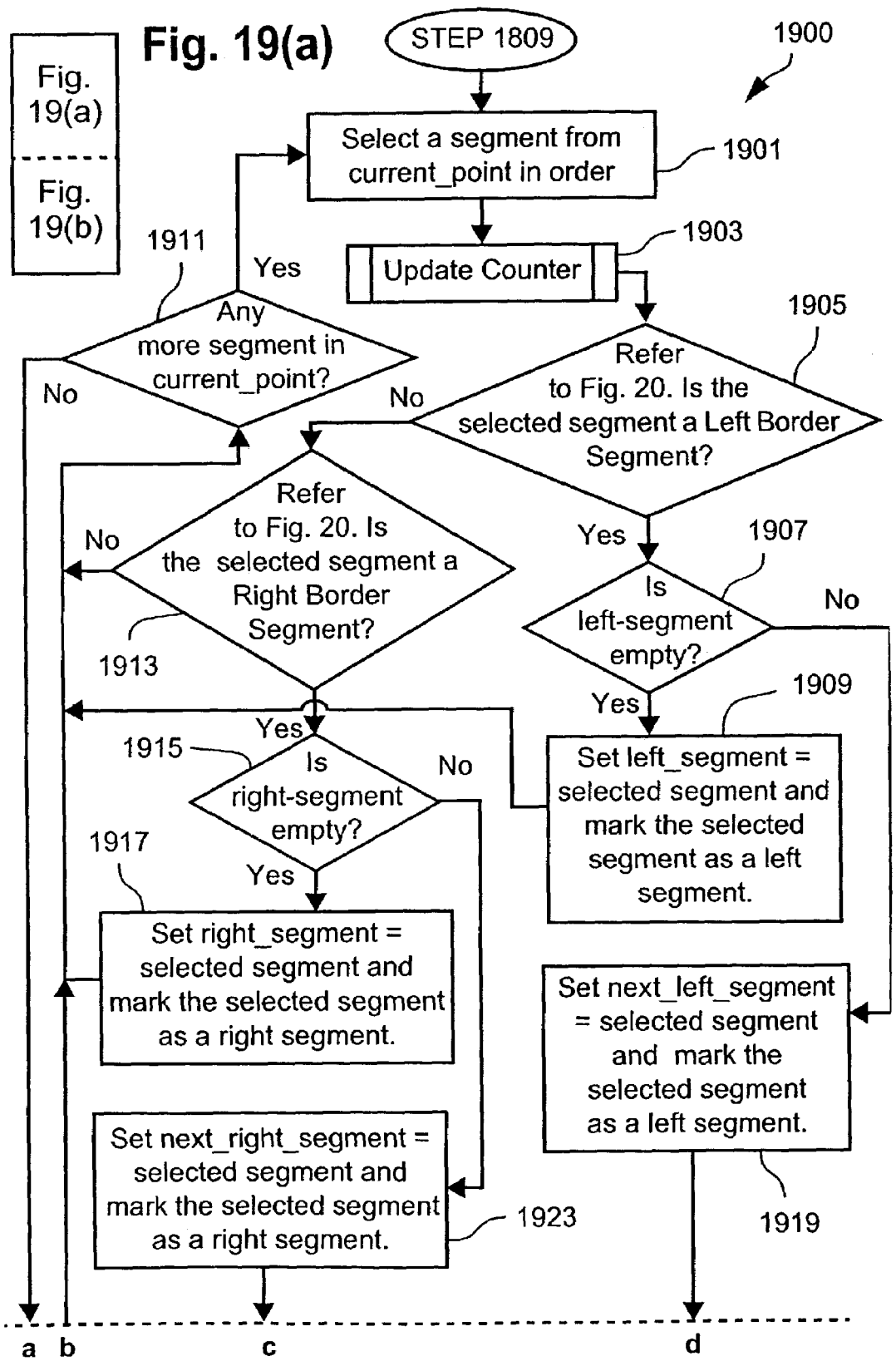

| Direction | Counter Value | Type of Segment |
|---|---|---|
| Upward | 0 | Left Border |
| Downward | 0 | Left Border |
| Downward | 1 | Right Border |
| Upward | -1 | Right Border |

Fig. 20

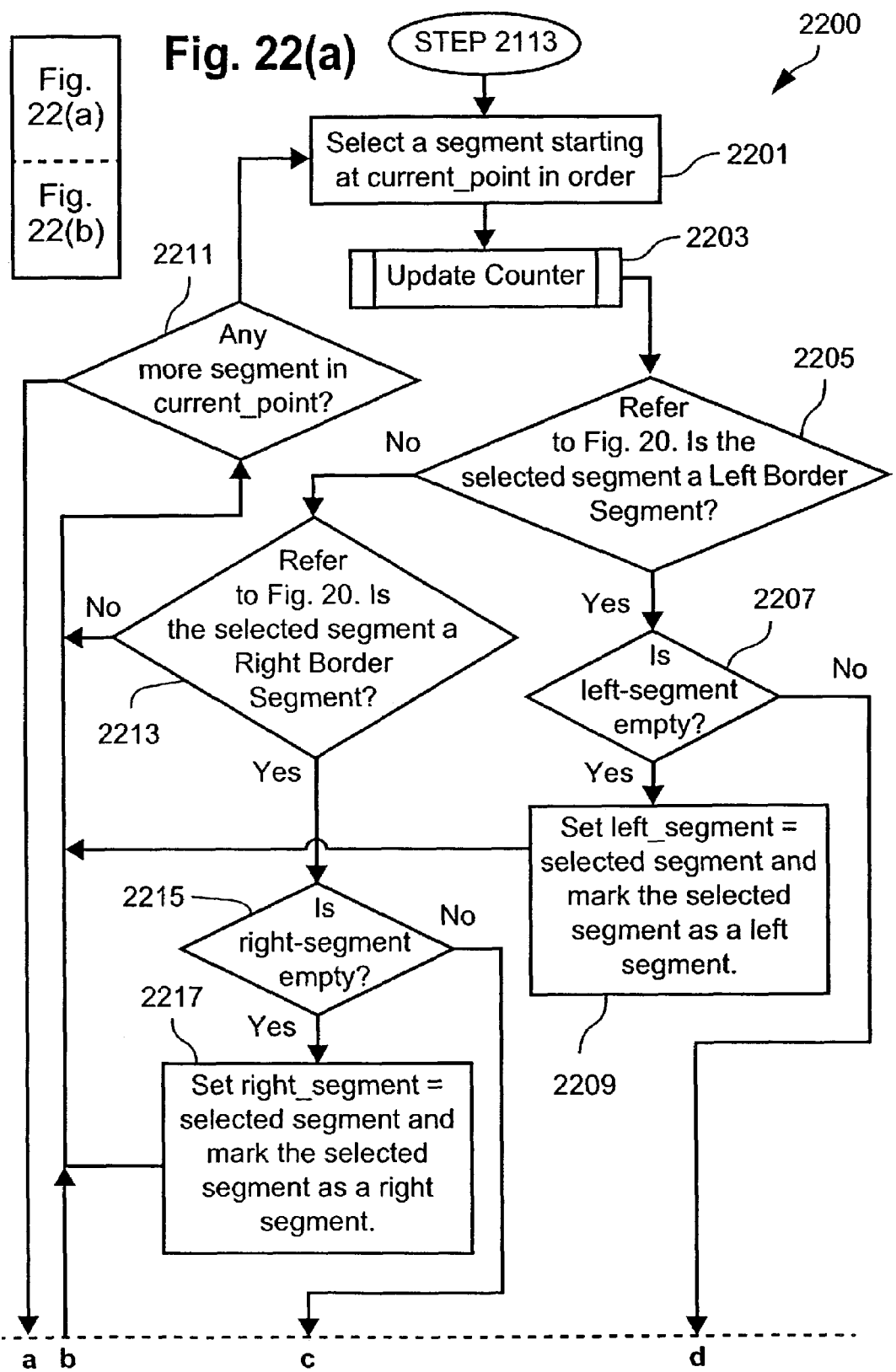

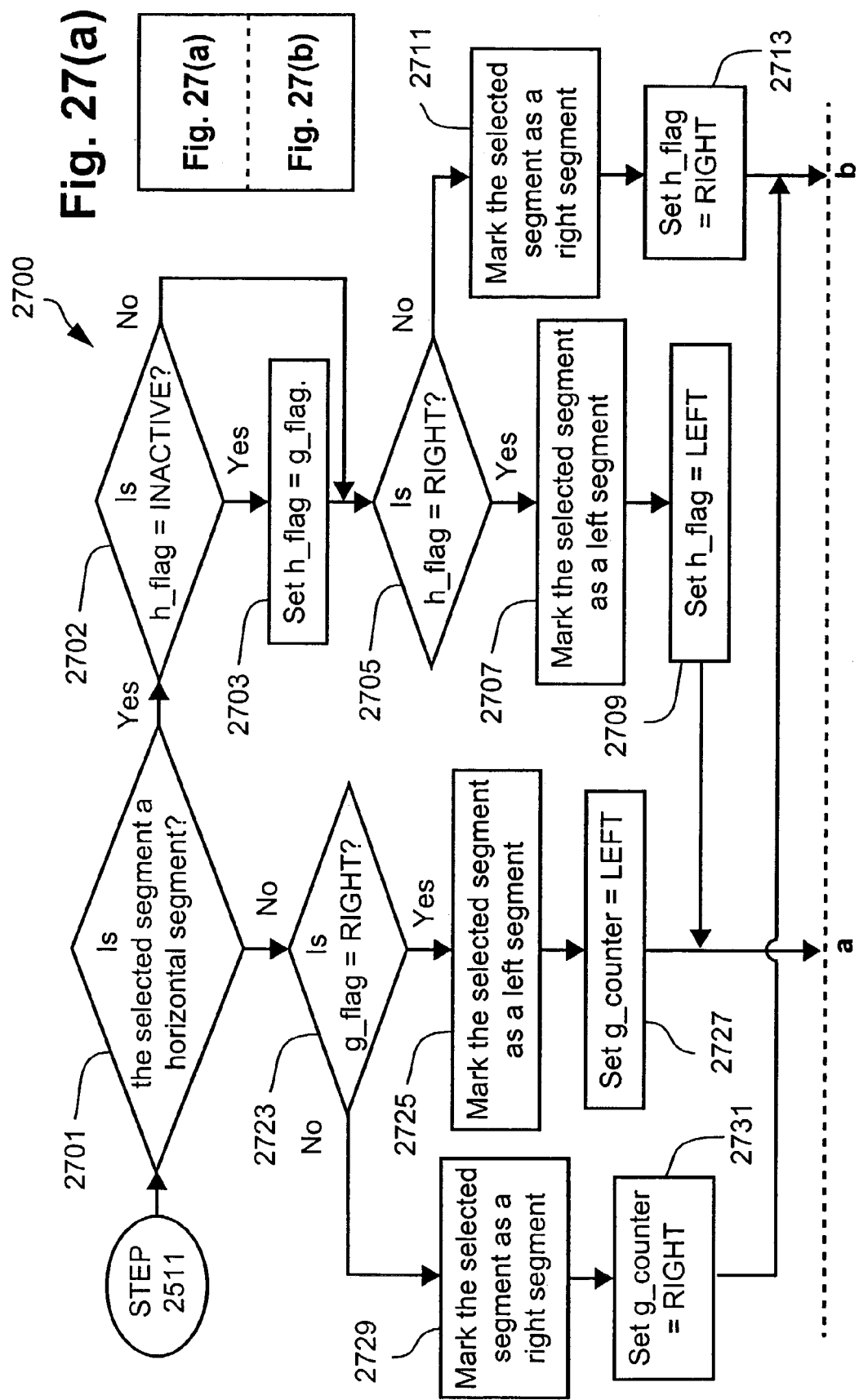

Left Vertices    Right Vertices

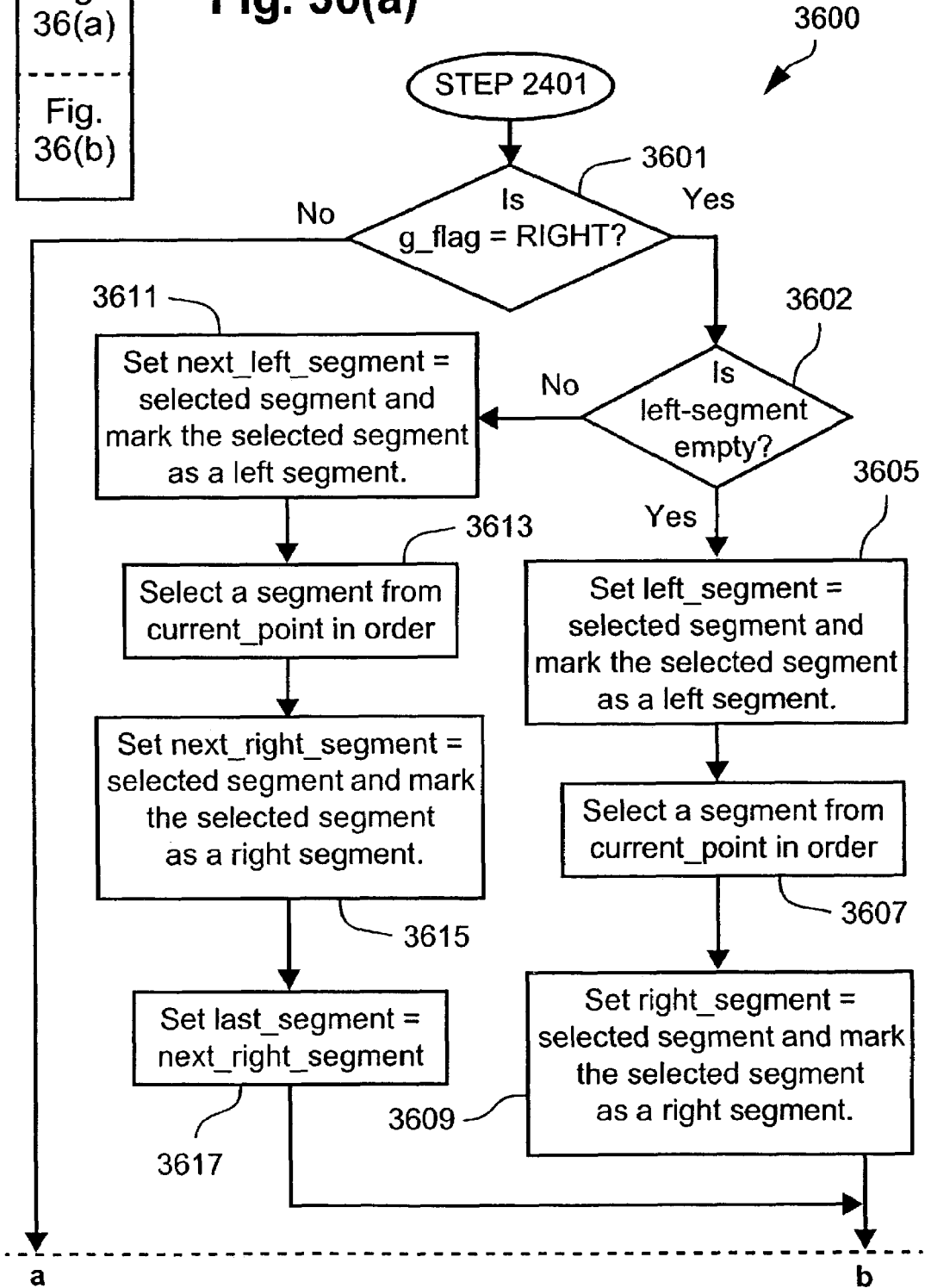

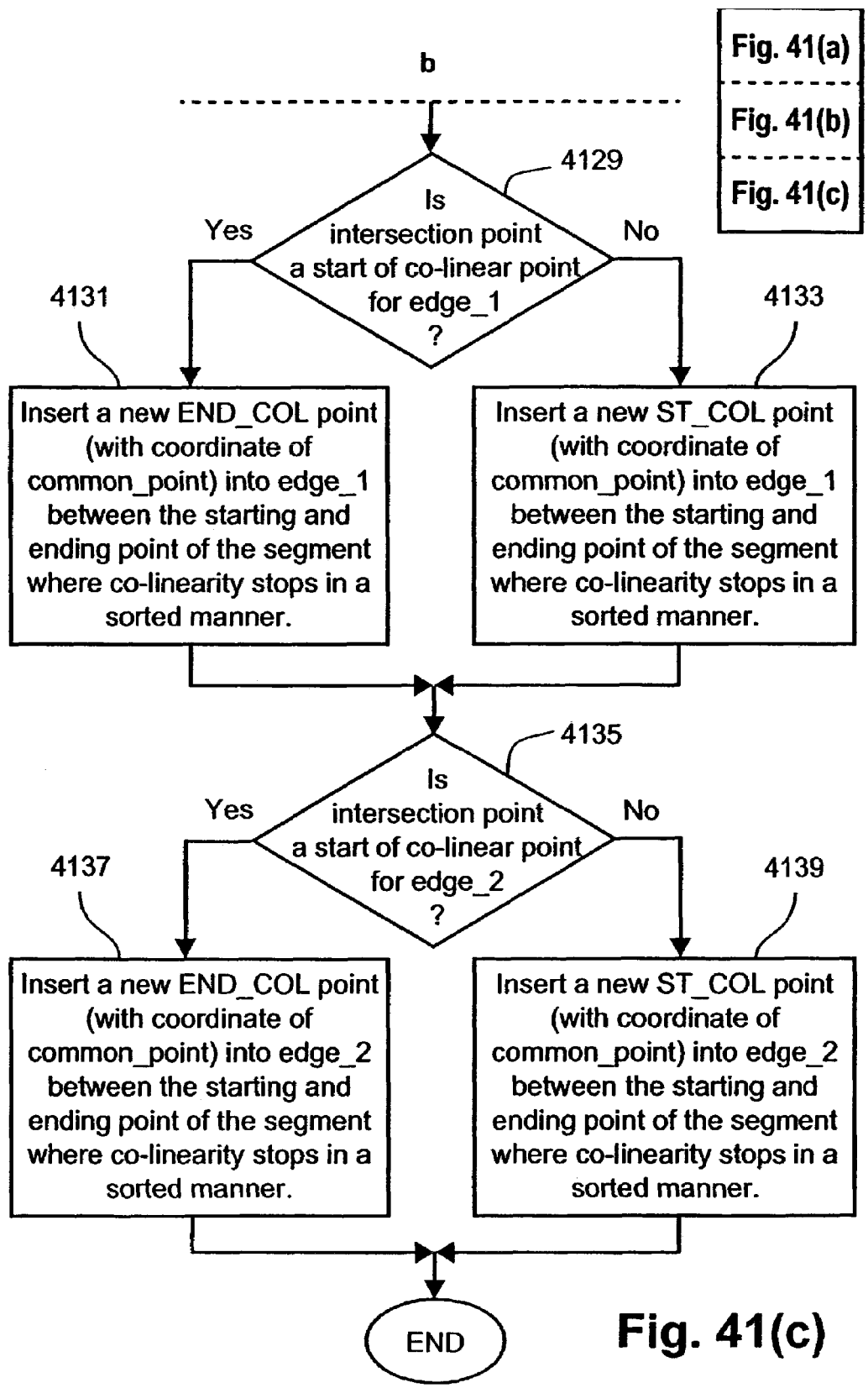

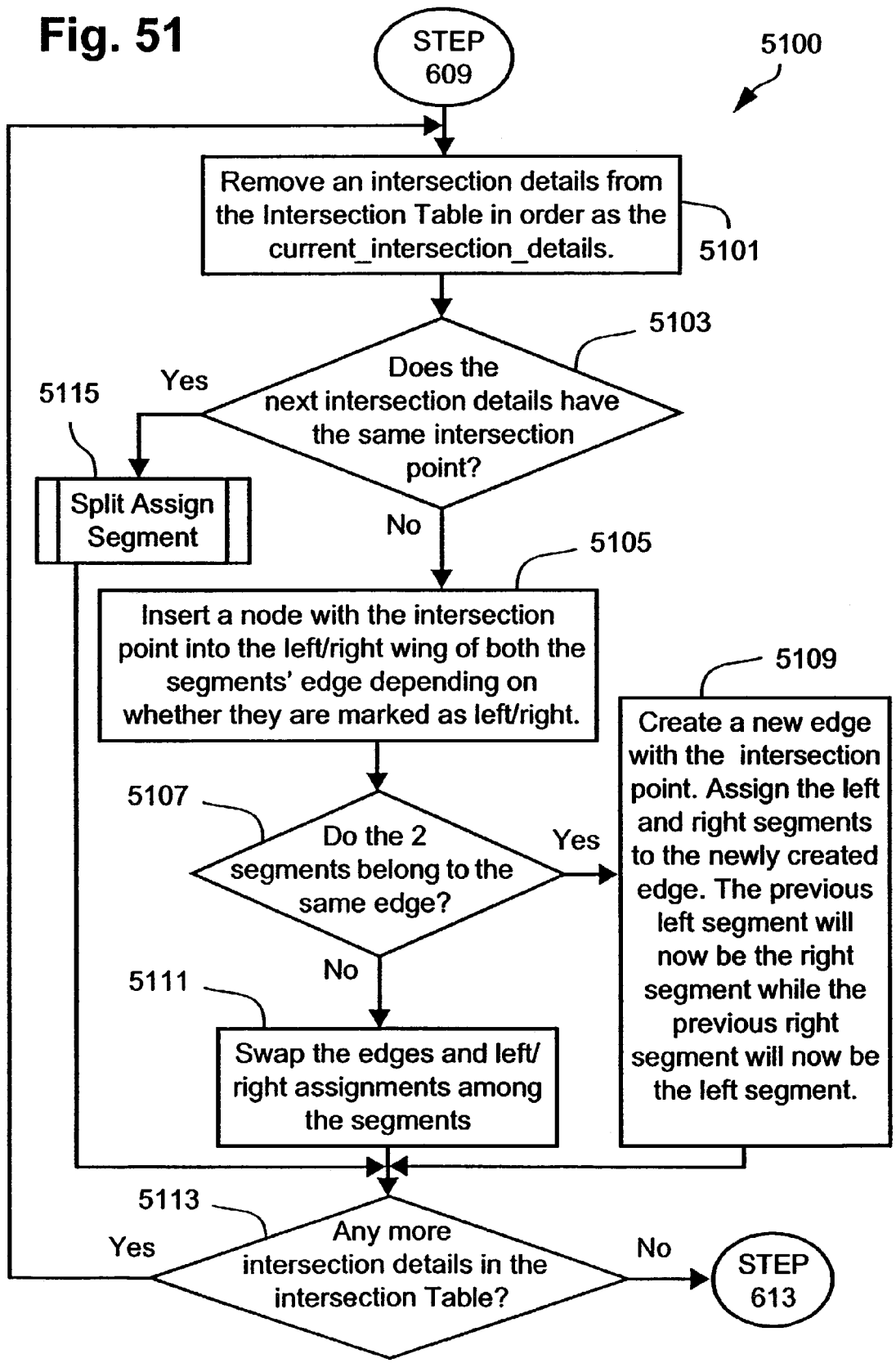

METHOD FOR PERFORMING SET OPERATIONS ON TWO OR MORE ARBITRARY PATHS TO PRODUCE A SIMPLE OUTLINE PATH

TECHNICAL FIELD OF THE INVENTION

The present invention relates generally to computer graphics and, in particular, to a method and apparatus for determining an output path from two or more input paths, based on a predetermined set operation. The invention also relates to a computer program product including a computer readable medium having recorded thereon a computer program for determining an output path from two or more input paths, based on a predetermined set operation.

BACKGROUND

In the context of raster-based graphical systems, a polygon is typically defined by a number of points or vertices, where the vertices are interconnected by a plurality of segments forming the polygon. A path consists of a plurality of edges and therefore substantially comprises a general polygon set. Each path has an associated fill rule, which determines how the edges of the path are filled when rendered. Fill rules are generally based on a winding count for a path where a winding count is a value that counts the number of line segments crossed as a straight line is projected through the path.

Set operations are commonly used on graphical objects as a pre-processing step in order to optimize further downstream processing of the graphical objects. Set operations can be used to combine two or more polygons before they are rendered or triangularized. For example, set operations are commonly used during clipping of graphical objects. Clipping is the process of selecting an area or portion of a graphical object to be included in a final representation of the graphical object. Clipping can also be used to discard an unwanted area or portion of a subject graphical object, where the discarded portion is not included in a final representation of the graphical object. Graphical objects are commonly represented by a polygon set and as such clipping is commonly executed on graphical objects using set operations such as intersection, union and difference operations.

There are several known path processing methods which perform set operations on polygons. Most of these methods are based on a particular set operation (e.g. intersection) and are only optimized for paths of certain simple shapes such as squares or straight lines using simple set operations. However, some of these known path processing methods are configured to perform a variety of set operations. The methods that perform a variety of set operations, however, require complex data structures and generally assume that an input polygon conforms to certain characteristics such as being simple and convex. Further, many of these known path processing methods can not handle degenerate cases such as segment starts/ends on other segments and/or co-linear segments.

Still further, many of the existing path processing methods, such as "scan conversion" and "triangulation", suffer from constraints in path complexity and fill rule, and are only able to handle paths with specific fill rules and complexity. Such path processing methods can only achieve optimum processing speed when input paths are relatively simple and do not always produce simple outline paths.

SUMMARY

It is an object of the present invention to substantially overcome, or at least ameliorate, one or more disadvantages of existing arrangements.

According to one aspect of the present invention there is provided a method of determining an output path from two or more input paths, based on a predetermined set operation, each of said input paths comprising at least one edge, each of said edges comprising one or more original segments, said method comprising the steps of:

(a) converting each of said two or more input paths into corresponding input path representations, each of said input path representations comprising one or more of said original segments or parts thereof;

(b) intersecting said corresponding input path representations, depending on said predetermined set operation, to select one or more of said original segments or parts thereof to be used in said output path; and (c) combining said selected original segments or parts thereof to determine said output path.

Preferably, step (a) comprises the following sub-steps for each of said input paths of:

(a1) dividing a space in which said input paths are defined into a plurality of bands such that each of said original segments or parts thereof, have at least one corresponding band;

(a2) examining each of said bands and classifying each of said original segments or parts thereof, contained within each of said bands depending on the position and/or direction of said original segments within a corresponding band;

(a3) creating further segments within each of said bands depending on said examination;

(a4) assigning at least one of said original segments or parts thereof, and/or said further segments to be border segments, depending on the position and classification of each of said original segments or parts thereof, and/or said further segments contained within a corresponding band; and (a5) combining at least one of said border segments to form at least one edge to produce at least one of said input path representations for a corresponding input path.

Preferably, step (b) comprises the following sub-steps for each point of intersection between said corresponding input path representations:

(b1) classifying said point of intersection;

(b2) inserting said classified point into any of said original segments corresponding to said point; and (b3) identifying additional segments and co-linear edges based on said classification and insertion.

The classified point can be selected as part of said output path.

Preferably, step (b) comprises the further sub-steps of:

(b4) selecting one or more of said original segments to be used in said output path representation, based on said identified additional segments and co-linear edges.

According to another aspect of the present invention there is provided an apparatus for determining an output path from two or more input paths, based on a predetermined set operation, each of said input paths comprising at least one edge, each of said edges comprising one or more original segments, said apparatus comprising:

conversion means for converting each of said two or more input paths into corresponding input path representations, each of said input path representations comprising one or more of said original segments or parts thereof;

intersection means for intersecting said corresponding input path representations, depending on said predetermined set operation, to select one or more of said original segments or parts thereof to be used in said output path; and combination means for combining said selected original segments or parts thereof to determine said output path.

According to still another aspect of the present invention there is provided a program for determining an output path from two or more input paths, based on a predetermined set operation, each of said input paths comprising at least one edge, each of said edges comprising one or more original segments, said program comprising:

code for converting each of said two or more input paths into corresponding input path representations, each of said input path representations comprising one or more of said original segments or parts thereof;

code for intersecting said corresponding input path representations, depending on said predetermined set operation, to select one or more of said original segments or parts thereof to be used in said output path; and code for combining said selected original segments or parts thereof to determine said output path.

BRIEF DESCRIPTION OF THE DRAWINGS

One or more embodiments of the present invention will now be described with reference to the drawings, in which:

FIG. 6(b) shows the definition of the symbols used throughout the following description;

FIG. 20 shows the requirements for classifying a segment as a left or right border segment;

FIG. 51 is a flow chart showing a further Intersection Processing process for input paths configured using the odd-even winding fill rule;

DETAILED DESCRIPTION INCLUDING BEST MODE

Figure 1A:
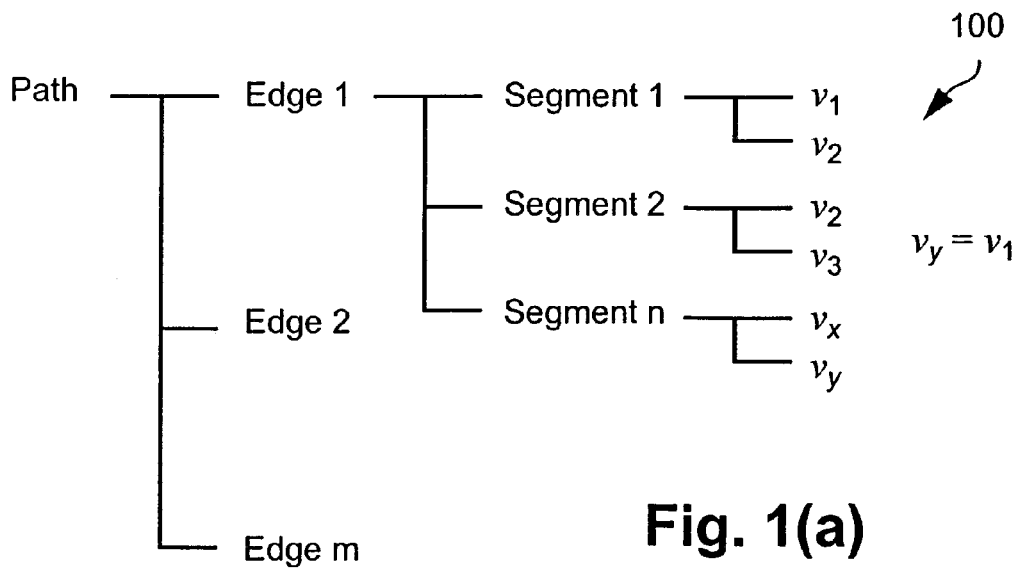
FIG. 1(a) shows an example of a tree structure used to define the components of a path.

Where reference is made in any one or more of the accompanying drawings to steps and/or features, which have the same reference numerals, those steps and/or features have for the purposes of this description the same functions or operations, unless the contrary intention appears.

A method of determining an output path from two or more arbitrary input paths, is described below. The method performs set operations on the two or more arbitrary input paths to determine the output path. The output path is a simple outline path, where a simple outline path is herein defined as a path with the following characteristics:

(i) the outline path consists of only border segments, where border segments are segments that bound the interior of an input path defined in accordance with the original fill rule of the input path;

(ii) the interior of the outline path can be interpreted correctly using either the odd-even winding fill rule or the non-zero winding fill rule; and (iii) the outline path has uniform orientation (i.e. clockwise or anti-clockwise) when interpreted with the non-zero winding fill rule (i.e. the interior of all edges defined by the outline path, can be either on the left side only or the right side only of all segments of the edges when traversing the edges in accordance with the direction of the edges of the path).

For all edges of a simple outline path, no pair of non-consecutive segments within an edge shares a vertex and each pair of consecutive segments share exactly one vertex. In the event where a non-consecutive segment within an edge does share a vertex, for example, an edge describing a line that contains only two segments (i.e. two distinct vertices), the resulting segments do not intersect.

A simple outline path having the above characteristics is extremely flexible and allows the most advantageous characteristics of both the non-zero winding fill rule and the odd-even fill rule to be exploited. Therefore, simple outline paths allow more flexibility in reusing many of the existing path processing methods while simplifying the logic required in developing new methods. Simple outline paths also allow the interior of paths to be interpreted with the most convenient fill rule for a particular process and enable specialized proprietary hardware to process a path with minimal effort required to gain a significant speed advantage over conventional path processing methods.

For ease of explanation, the steps of the methods to be described below are described with reference to the non-zero winding rule and the odd-even winding rule. However, it is not intended that the present invention be limited to the described methods. For example, the invention may have application to any other fill rule such as the "Winding Counting" fill rule or the "Zero Winding" fill rule. Further, for ease of explanation, the number of input paths processed in accordance with the methods described herein is restricted to two. However, a person skilled in the relevant art would appreciate that the methods described herein can be utilised to process any number of paths at the same time.

The edges of the input paths processed in accordance with the methods described herein can define any type of polygon, where each polygon can be of arbitrary complexity. Further, the methods described herein do not require that the location of each input polygon relative to one another within a space in which the path is defined be restricted in any manner. The methods described herein do not move or perturb any vertex when processing degenerate paths (i.e. all vertices are processed in their original position in a space in which the paths are defined).

Figure 2:
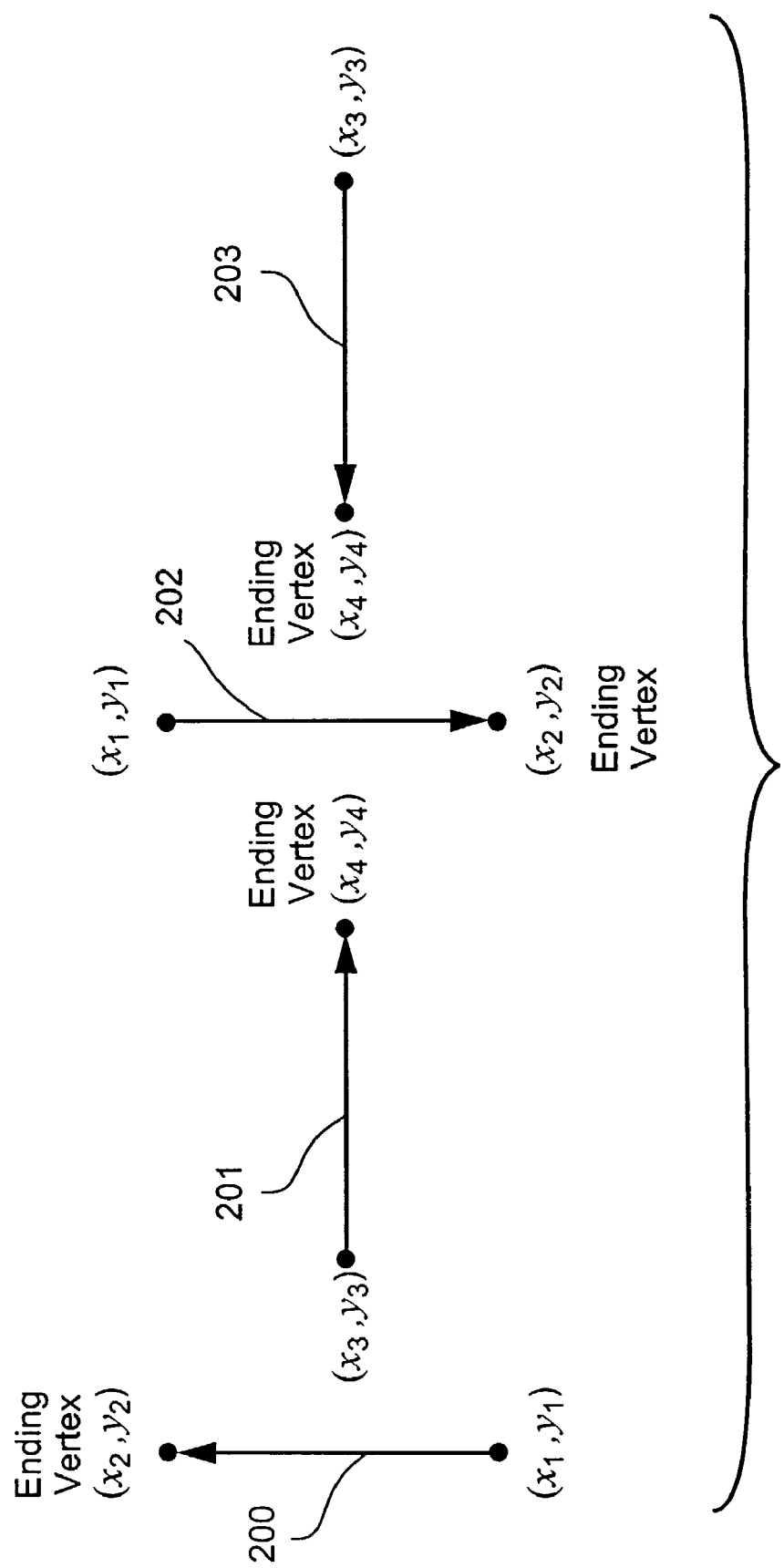
FIG. 2 shows four different segments illustrating a preferred definition of upward and downward segments.
Figure 3:
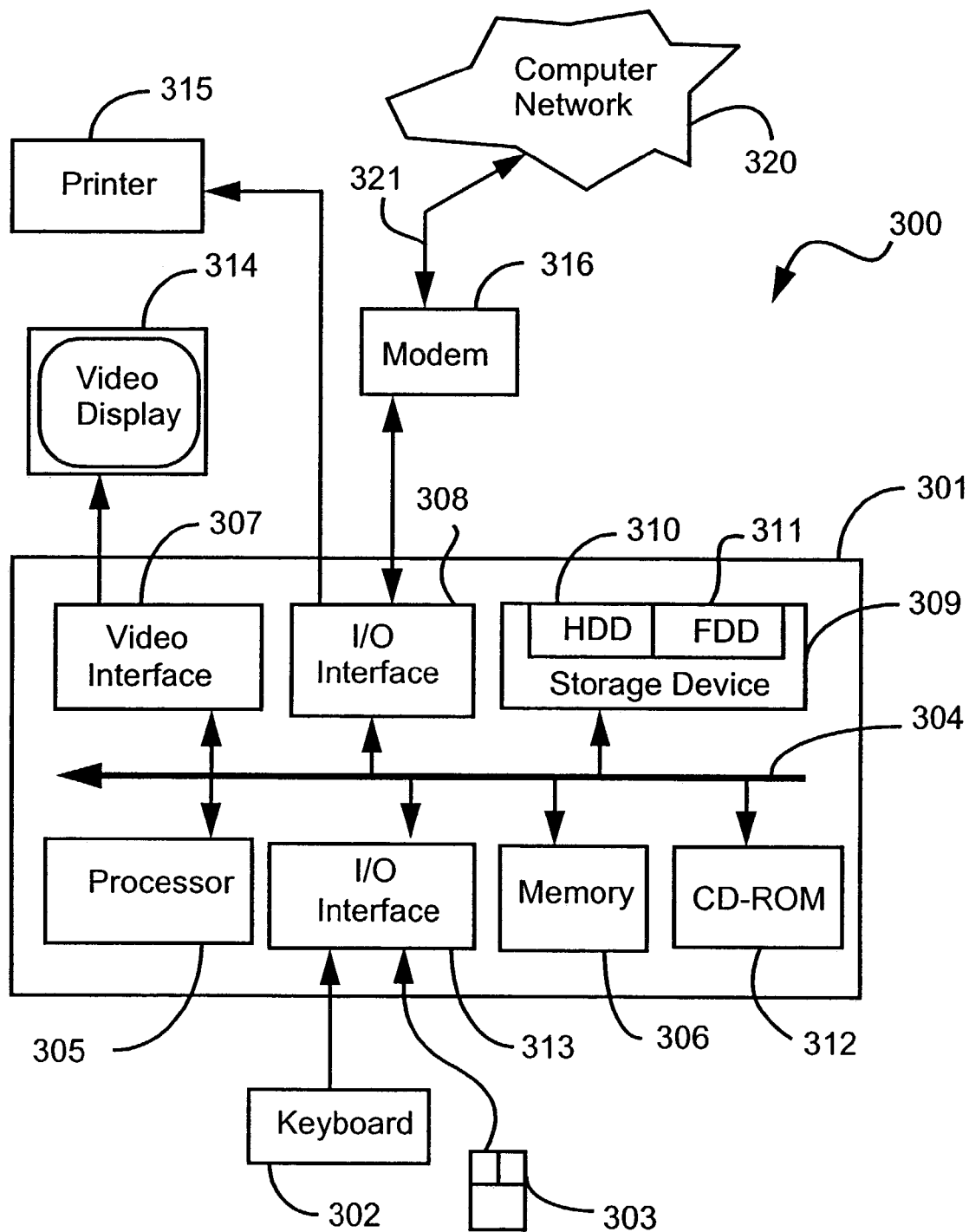
FIG. 3 is a schematic block diagram of a general purpose computer upon which arrangements described can be practiced.

The methods described herein are preferably practiced using a general-purpose computer system 300, such as that shown in FIG. 3 wherein the processes described with reference to FIGS. 1 to 45 may be implemented as software, such as an application program executing within the computer system 300. In particular, the steps of methods described herein are effected by instructions in the software that are carried out by the computer. The instructions may be formed as one or more code modules, each for performing one or more particular tasks. The software may also be divided into two separate parts, in which a first part performs the described methods and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for producing a simple outline path from two or more arbitrary paths.

The computer system 300 comprises a computer module 301, input devices such as a keyboard 302 and mouse 303, output devices including a printer 315 and a display device 314. A Modulator-Demodulator (Modem) transceiver device 316 is used by the computer module 301 for communicating to and from a communications network 320, for example connectable via a telephone line 321 or other functional medium. The modem 316 can be used to obtain access to the Internet, and other network systems, such as a Local Area Network (LAN) or a Wide Area Network (WAN).

The computer module 301 typically includes at least one processor unit 305, a memory unit 306, for example formed from semiconductor random access memory (RAM) and read only memory (ROM), input/output (I/O) interfaces including a video interface 307, and an I/O interface 313 for the keyboard 302 and mouse 303 and optionally a joystick (not illustrated), and an interface 308 for the modem 316. A storage device 309 is provided and typically includes a hard disk drive 310 and a floppy disk drive 311. A magnetic tape drive (not illustrated) may also be used. A CD-ROM drive 312 is typically provided as a non-volatile source of data. The components 305 to 313 of the computer module 301, typically communicate via an interconnected bus 304 and in a manner that results in a conventional mode of operation of the computer system 300 known to those in the relevant art. Examples of computers on which the described arrangements can be practised include IBM-PC's and compatibles, Sun Sparcstations or alike computer systems evolved therefrom.

Typically, the application program is resident on the hard disk drive 310 and read and controlled in its execution by the processor 305. Intermediate storage of the program and any data fetched from the network 320 may be accomplished using the semiconductor memory 306, possibly in concert with the hard disk drive 310. In some instances, the application program may be supplied to the user encoded on a CD-ROM or floppy disk and read via the corresponding drive 312 or 311, or alternatively may be read by the user from the network 320 via the modem device 316. Still further, the software can also be loaded into the computer system 300 from other computer readable media. The term "computer readable medium" as used herein refers to any storage or transmission medium that participates in providing instructions and/or data to the computer system 300 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 301. Examples of transmission media include radio or infra-red transmission channels as well as a network connection to another computer or networked device, and the Internet or Intranets including email transmissions and information recorded on websites and the like.

The methods described herein may alternatively be implemented in dedicated hardware such as one or more integrated circuits performing the functions or sub functions of FIGS. 4 to 45. Such dedicated hardware may include graphic processors, digital signal processors, or one or more microprocessors and associated memories.

Figure 1B:
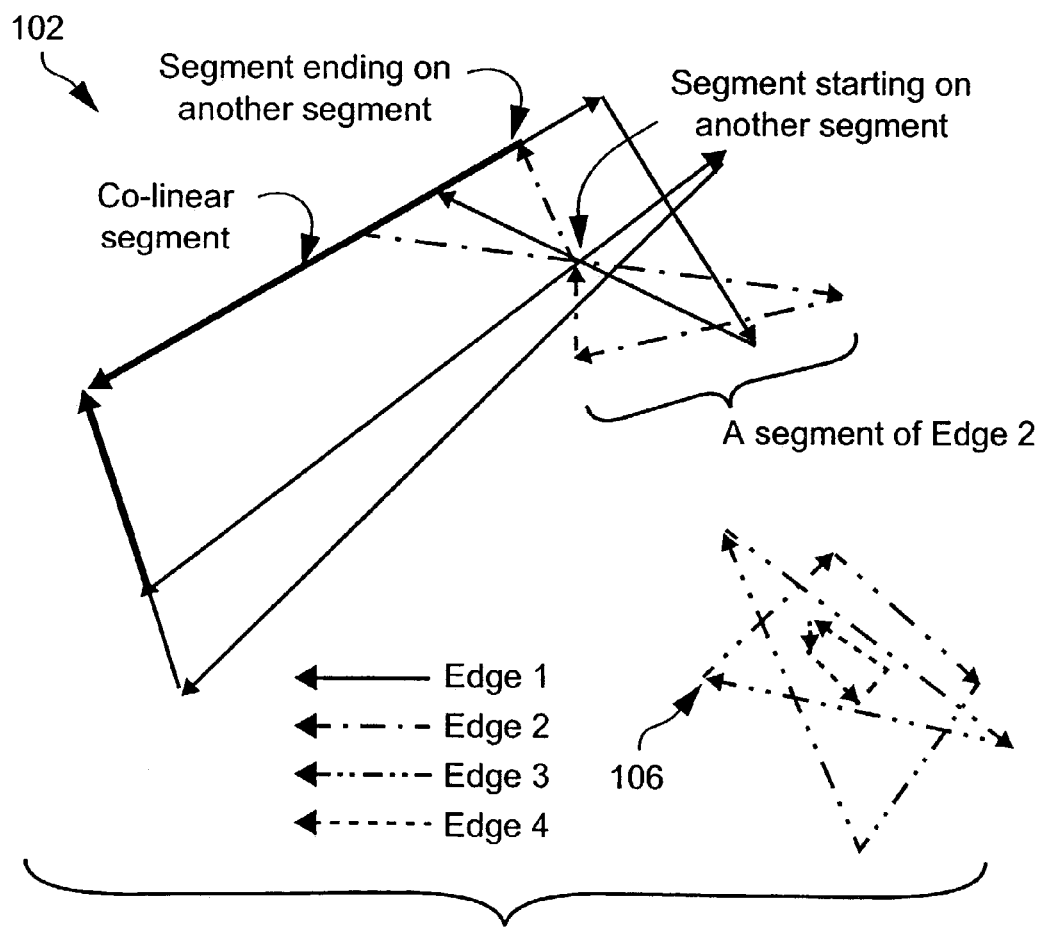
FIG. 1(b) shows an example of a path.

FIG. 1(a) shows an example of a tree structure 100 that can be used to define the components of a path. FIG. 1(b) shows an example path 102 comprising four edges as seen in FIG. 1(b). For ease of explanation, a path is herein defined as comprising one or more edges (e.g. edge 1) while an edge comprises at least two segments (e.g. segment 1, segment 2) with three vertices, since an edge with one segment is essentially a dot. The various arrangements described herein can be practiced using edges comprising any number of segments. All edges of a path are closed (i.e. form a closed contour) and all segments are configured with a starting and an ending vertex (e.g. $V_1$, $V_2$, $V_3$ etc). For example, as seen in FIG. 1(b), Edge 3 forms a closed contour which starts and ends at the vertex 106. Each vertex is defined by the x and y coordinates of the vertex. There is no limitation on the type of polygon, the complexity of each polygon and the location of each polygon relative to each other in a path. Advantageously, a path can include degenerate cases such as different segments, which start and end on the same segment, and/or co-linear segments, all of which are highlighted in FIG. 1(b) for the path 102.

The methods described herein utilise a natural coordinate space where the positive x-axis runs from left to right and the positive y-axis runs from bottom to top. FIG. 2 shows four different segments 200, 201, 202 and 203 configured in accordance with the natural coordinate space. The segment 200 runs upward in the positive y direction whilst the segment 202 runs downward in the negative y direction. The segment 201 runs in the positive x direction and the segment 203 runs in the negative x direction. A segment runs upward if and only if $y_2>y_1$ OR $y_4=y_3$ and $x_3<x_4$. Similarly, a segment runs downward if $y_2<y_1$ OR $y_4=y_3$ and $x_4<x_3$.

The type of set operation to be executed on a path is specified in a clip rule that is associated with the path. The clip rule of a path is configured to specify whether the interior of a path is to be interpreted in accordance with a fill rule associated with the path or opposite to the file rule associated with the path. Table 1, below, shows set operations and clip rules associated with each operation in accordance with the methods described herein. TRUE in Table 1 indicates that the interior of a path is to be interpreted in accordance with a fill rule associated with the path. FALSE in Table 1 indicates that the interior of a path is to be interpreted opposite to the file rule associated with the path. However, a person skilled in the relevant art would appreciate that additional set operations (e.g. exclusive OR (i.e. XOR)) can be implemented in accordance with the methods described herein.

TABLE 1

| Set Operations | Path 1 - Clip Rules | Path 2 - Clip Rules |
| --- | --- | --- |
| Path 1-Path 2 | TRUE | FALSE |
| Path 2-Path 1 | FALSE | TRUE |
| Path 1 ∪ Path 2 | FALSE | FALSE |
| Path 1 ∩ Path 2 | TRUE | TRUE |

Figure 4:
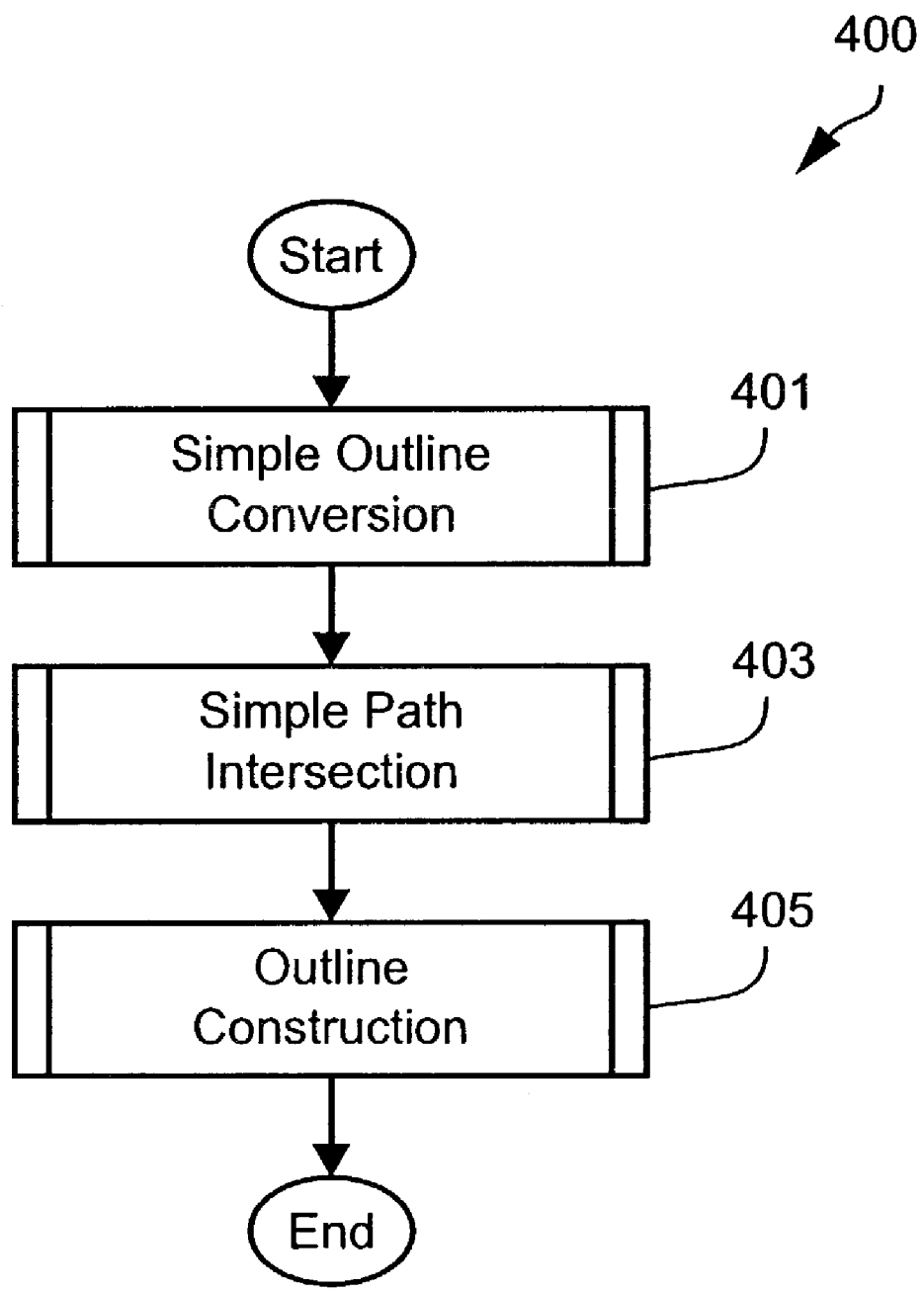
FIG. 4 is a flow diagram showing a method of determining a simple output path from two or more arbitrary input paths.
Figure 5A:
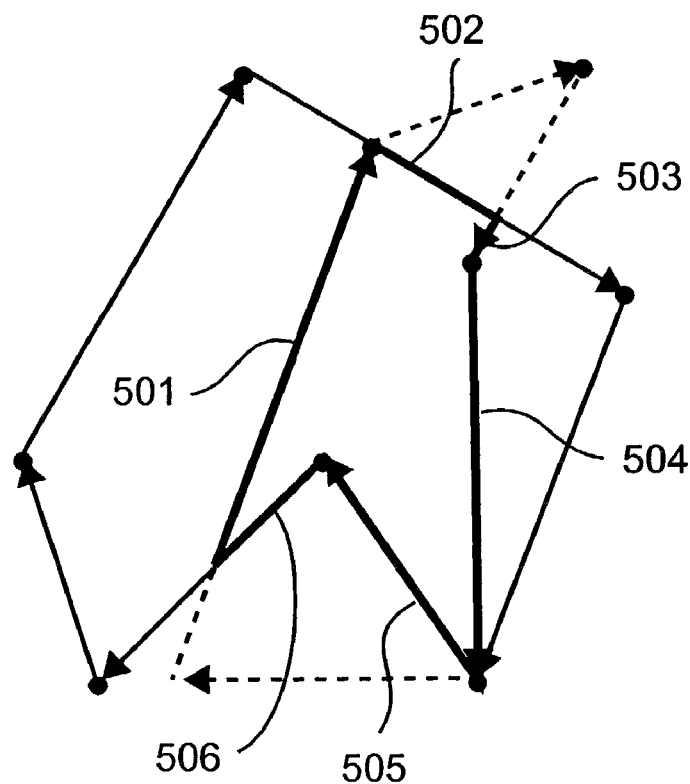
FIG. 5(a) shows two paths, which are processed in accordance with an intersection set operation.
Figure 5B:
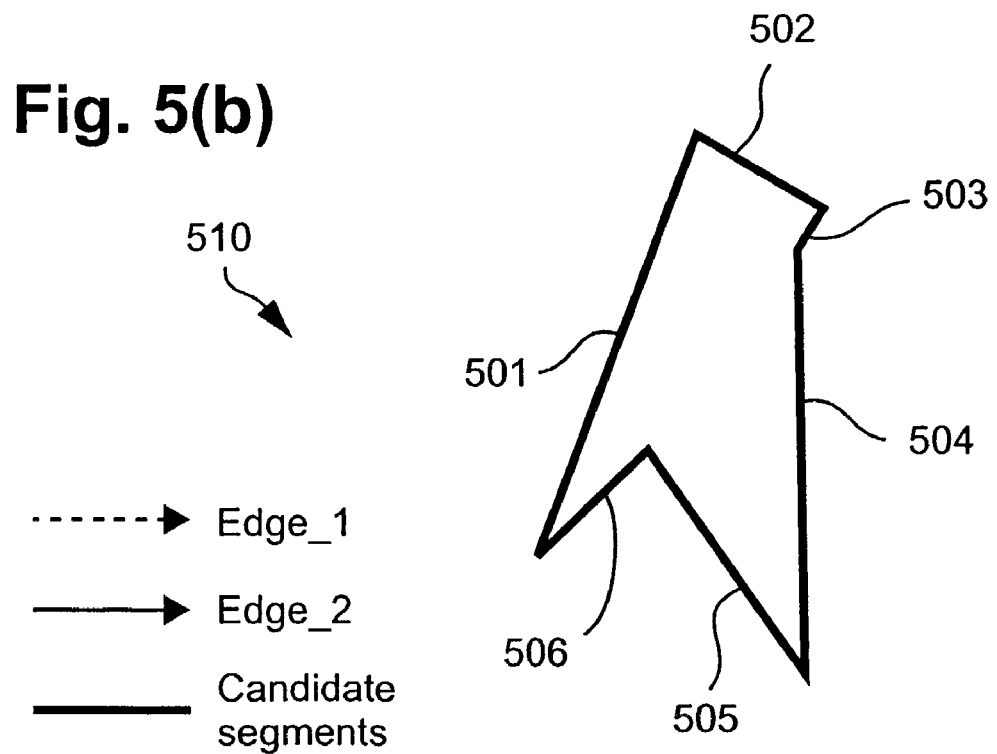
FIG. 5(b) shows a final simple outline path resulting from the intersection of the two paths of FIG. 5(a)

FIG. 4 is a flow chart showing a process 400 of determining a output path from two or more arbitrary input paths. The output path is a simple outline path as defined above. The process 400 performs set operations on the two or more arbitrary input paths to determine the output path. The process 400 is preferably implemented as an application program being resident on the hard disk drive 310 and being read and controlled in its execution by the processor 305. The process 400 begins at step 401, where the processor 305 converts two input paths into two simple outline paths through a "Simple Outline Conversion" process. The simple outline conversion process will be described in detail below particularly with reference to FIGS. 6(a) to 36. At the next step 403, the simple outline paths are intersected with each other, by the processor 305, to produce candidate segments using a "Simple Path Intersection" process. Candidate segments are segments that belong to a final resulting simple outline path where the final resulting simple outline path consists of only candidate segments. For example, FIG. 5(a) shows two paths, Edge_1 and Edge_2, which are processed in accordance with an intersection set operation (i.e. Edge_1∩Edge_2). The intersection of the paths, Edge_1 and Edge_2, includes the segments 501 to 506 which are referred to as the candidate segments. FIG. 5(b) shows the final simple outline path 510 resulting from the intersection of Edge_1 and Edge_2. The outline path 510 comprises the candidate segments 501 to 506. The simple path intersection process will be described in detail below particularly with reference to FIGS. 37 to 45. The process 400 concludes at the next step 405, where the candidate segments produced at step 403 are combined by the processor 305 to form a simple outline path through an "Outline Construction" process. The simple outline path can be stored on the hard disk drive 310 or memory 306. The outline path intersection process will be described in detail below.

Figure 6A:
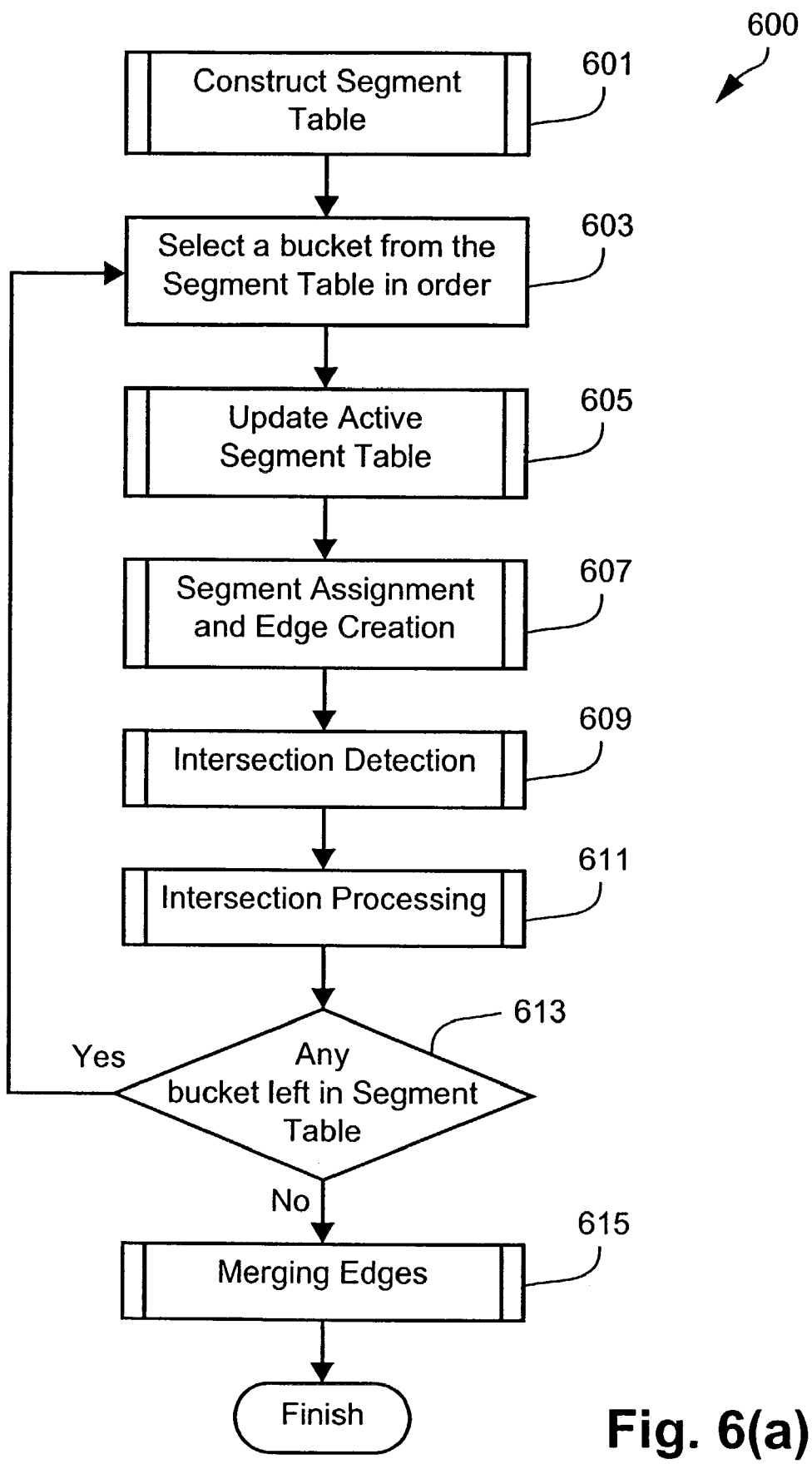
FIG. 6(a) is a flow chart showing a method of converting a path configured in accordance with the odd-even winding fill rule or the non-zero winding rule to a simple outline path.

FIG. 6(a) is a flow chart showing a process 600 of converting an input path configured in accordance with the odd-even winding fill rule or the non-zero winding rule to a simple outline path, as performed at step 401 of the method 400. The process 600 is preferably implemented as an application program being resident on the hard disk drive 310 and being read and controlled in its execution by the processor 305. FIG. 6(b) shows the definition of symbols that are used throughout the description.

The process 600 begins at step 601, where a segment table (ST) is constructed by the processor 305. The segment table contains the definition of each of one or more bands for the space in which a path is defined and is preferably stored in memory 306. The segment table is a global table containing all segments and is preferably sorted into two levels. In the first level, "buckets" containing the distinct y-positions of the starting and ending vertex of each segment of the path, are created and sorted in an increasing manner. Alternatively, if a top down processing method is utilised, then buckets can be sorted in a decreasing order where buckets contain all of the band lines of the space in which the input path is defined. Within each bucket, segments are then sorted according to the "leftness" of each segment. Graphically, a segment is classified herein as having more leftness (i.e. being situated more to the left) than other segments if the segment is located literally more left compared to the other segments, in the space in which the segments are defined. Numerically, a segment having a vertex with a smaller x-coordinate than another vertex, is considered to be more left than another segment.

If the x-coordinate of the starting segment for two segments is equivalent, then the segment with a smaller angle measured from an associated bandline, to the segment, in a clockwise orientation, is considered to have more leftness. Each bucket contains only segments that have a starting vertex with a y-coordinate that matches the y-coordinate of the bucket (i.e. starting at that bandline). The starting vertex of a segment is always the "smaller" vertex. That is, all segments (including horizontal segments) preferably have a default upward direction regardless of the original direction of a particular segment. Due to the direction sensitive nature of the non-zero winding fill rule, the original direction of all segments from a path configured according to the non-zero winding fill rule are stored.

Figure 7:
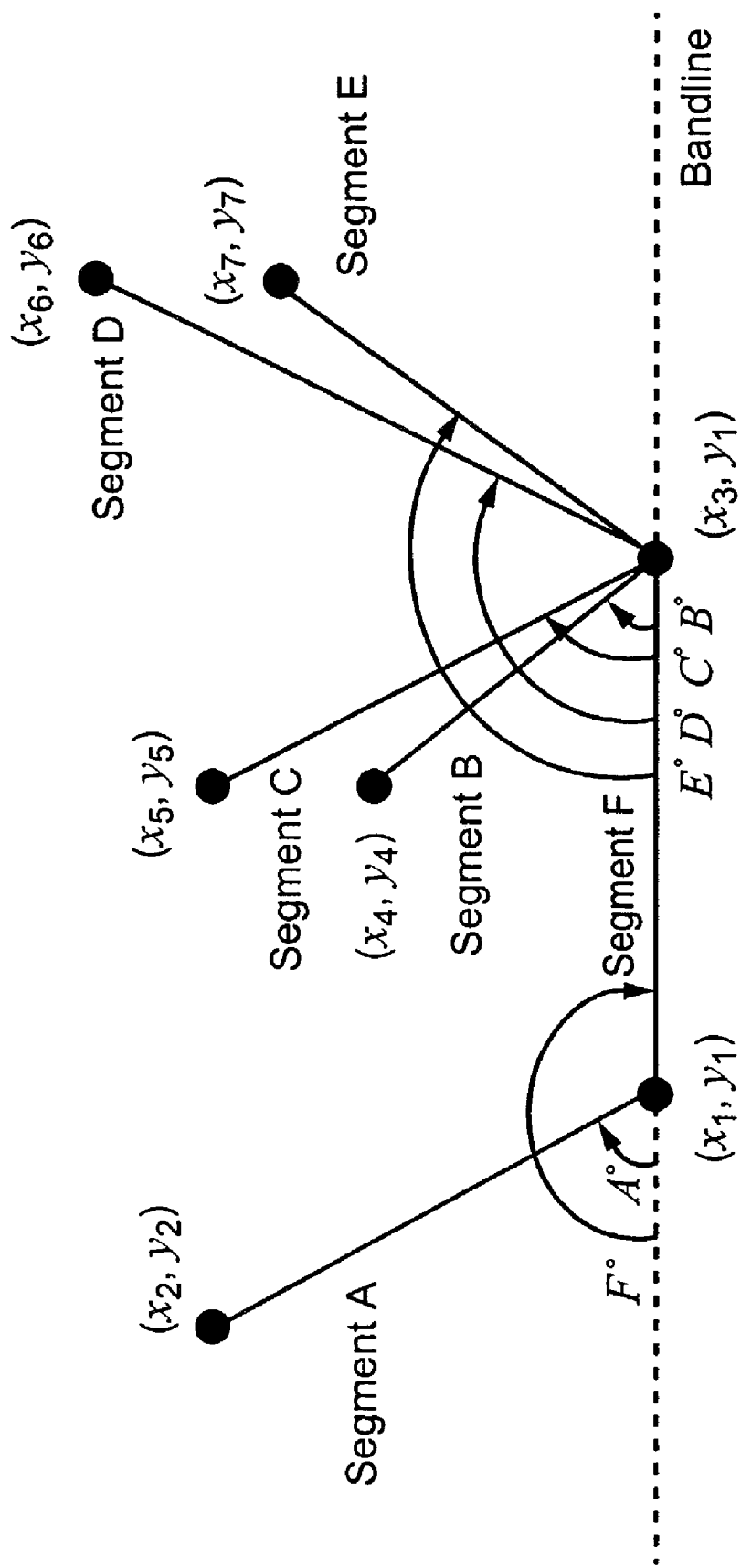
FIG. 7 shows six segments (i.e. Segments A to F) used to illustrate a leftness comparison.

In the described method for converting an input path, a leftness comparison is executed to determine the leftness of segments. The starting points of each input segment are compared and then, within each starting point, the angle of each segment starting point from that particular starting point is compared. For example, FIG. 7 shows six segments (i.e. Segments A to F). Segments A and F are considered to have the most leftness of the Segments A to F, since $x_1<x_3$. At the point defined by the coordinates $(x_1, y_1)$, segment A is considered as having more leftness than segment F, since $A°<F°$. Further, at point $(x_3, y_1)$, segment B has more leftness than segment C since $B°<C°$, segment C has more leftness than segment D since $C°<D°$, and segment D has more leftness than segment E since $D°<E°$.

Figure 8:
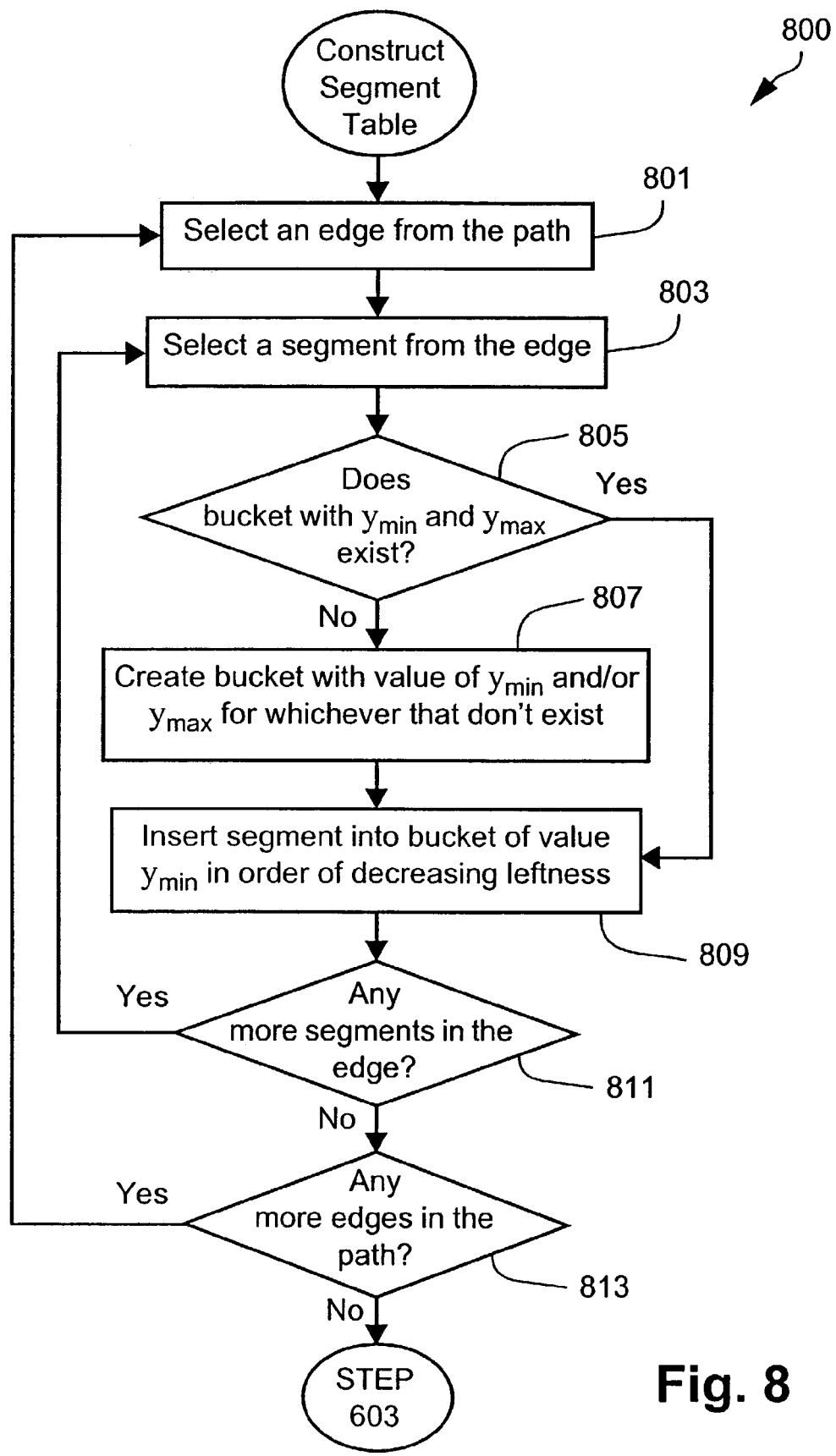
FIG. 8 is a flow chart showing a method of constructing a segment table for a particular input path.

FIG. 8 is a flow chart showing a process 800 of constructing the segment table (i.e. ST) for a particular input path as executed at step 601. The process 800 is preferably implemented as an application program being resident on the hard disk drive 310 and being read and controlled in its execution by the processor 305. The process begins at the first step 801, where an edge of the path is selected by the processor 305. At the next step 803, a segment of the selected edge is selected. The process 800 continues at the next step 805, where if buckets having values of $y_{max}$ and/or $y_{min}$ of the segment selected at step 803 do not exist, then buckets are created for $y_{max}$ and/or $y_{min}$, at the next step 807, and the buckets are stored in memory 306 or on the hard disk drive 310. Otherwise, the process 800 proceeds to the next step 809, where the segment selected at step 803 is inserted into the bucket with value $y_{min}$, in the order of decreasing leftness. At the next step 811, if there are more segments in the edge, the process 800 returns to step 803. Otherwise the process 800 proceeds to step 813, where if there are more edges in the path, the process returns to step 801. Thus steps 801 to 813 are repeated by the processor 305 for every segment of every edge of the path. If two segments are equally as left, the segments are then ordered according to the occurrence of the segment in time (i.e. the second segment is inserted after the first segment). The process 800 concludes if there are no more edges in the path at step 813.

Returning to the process 600 of FIG. 6(a). At step 603, a bucket is selected by the processor 305 from the segment table in order from the bottom most bucket to the top most bucket upward for the space in which the path is defined. The process 600 continues at the next step 605, where an 'active segment table (AST)' is created by the processor 305 and updated. The active segment table stores all active segments and is preferably configured in memory 306. A segment is considered active when the segment exists within a current band that is being processed. Thus, the active segment table allows each bucket to be processed independently. A process 900 of updating the active segment table, at step 605, will now be described in detail below with reference to the flow chart of FIG. 9.

Figure 9:
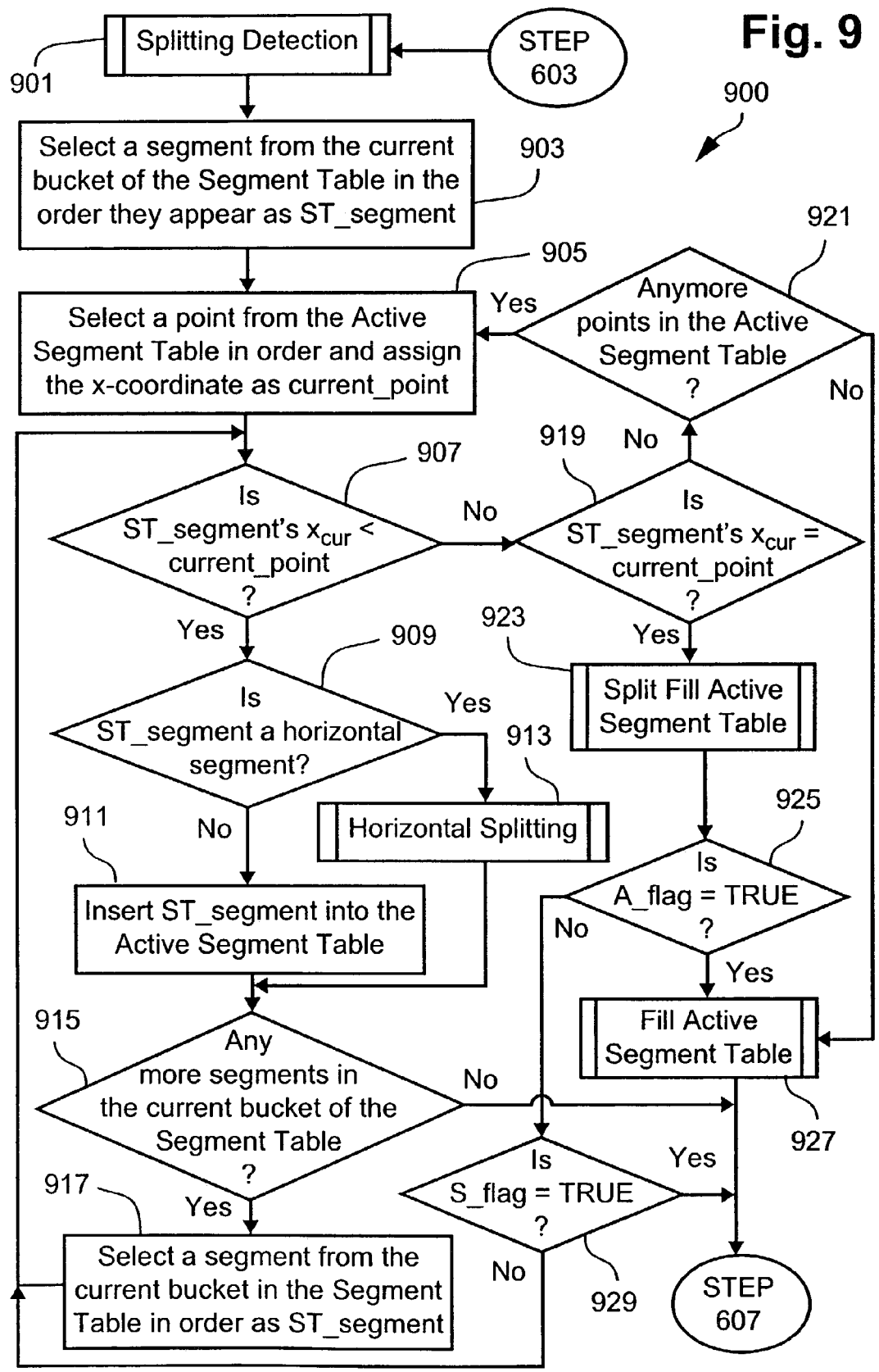
FIG. 9 is a flow chart showing a method of updating an active segment table.
Figure 10:
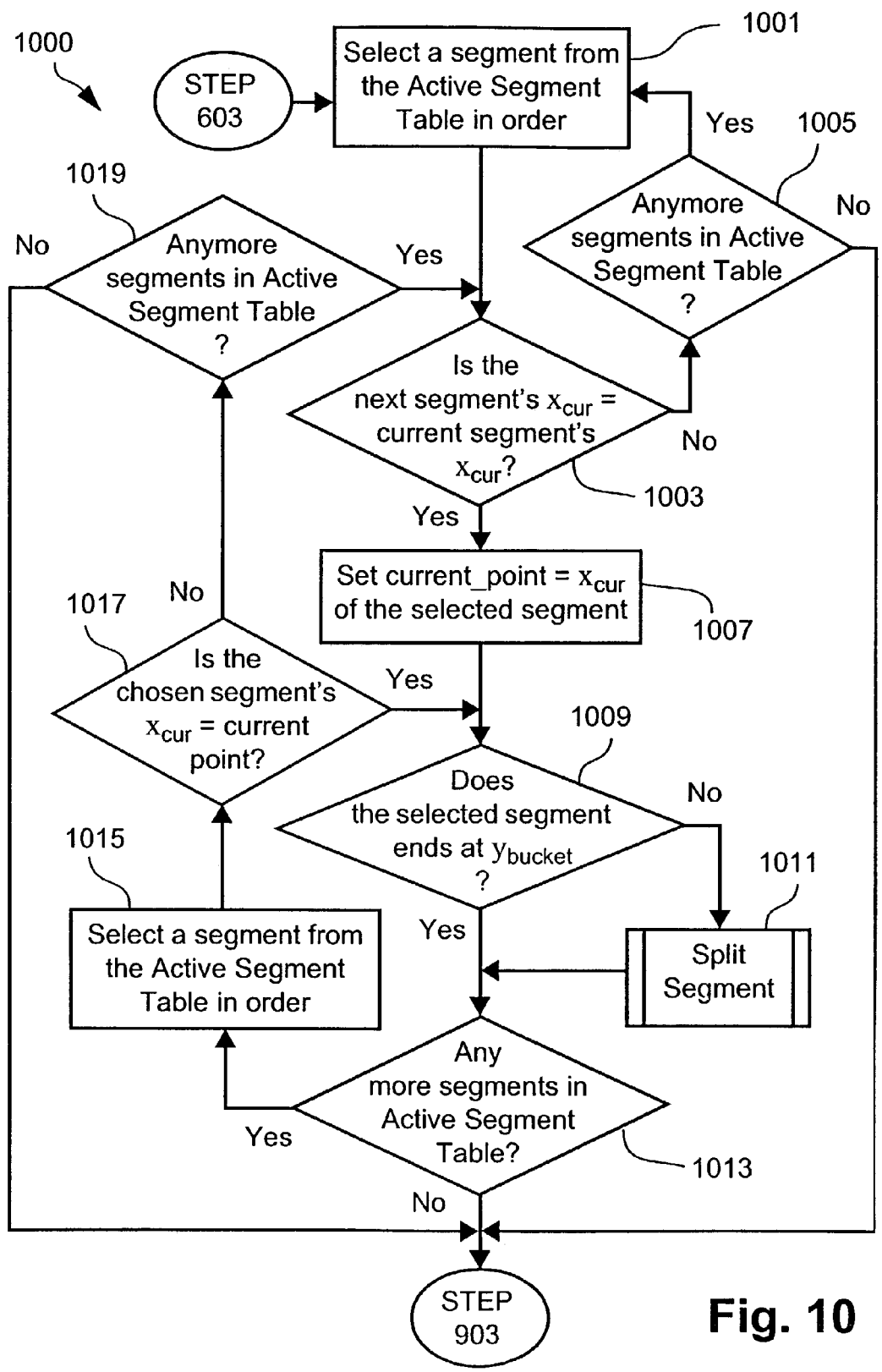
FIG. 10 is a flow chart showing a Splitting Detection process for determining if segments on a particular point need to be split.

FIG. 9 is a flow chart showing the steps of the process 900 for updating the active segment table. The process 900 is preferably implemented as an application program being resident on the hard disk drive 310 and being read and controlled in its execution by the processor 305. The process 900 begins at step 901, where a "Splitting Detection" process 1000, as shown in FIG. 10, is executed by the processor 305. For every point in the active segment table, the splitting detection process 1000 tests to determine if segments on the particular point need to be split. A segment on a point needs to be split if the point contains more than one segment incident on it and the segment under consideration does not end at that particular point (i.e. the segment passes through the point). The splitting detection process 1000 will be explained in more detail below with reference to FIG. 10. After the splitting detection process 1000 the active segment table stored in memory 306 is ready to be inserted with new segments from the segment table (i.e. segments that start from the current bandline). During the insertion, it is possible that new points will be introduced into the active segment table and if there is more than one new segment starting from the new point, these new segments are sorted in a decreasing leftness order (i.e. inheriting their order in the segment table). If segments are being inserted amongst existing segments starting from an existing point in the active segment table, these new segments are inserted after all of the ending segments at that point and the new segments are sorted in a decreasing leftness order amongst segments starting at that point.

In addition, if there are new segments to be inserted into an existing point with only one segment and the segment does not end on that particular point, the existing segment is split before any new segments can be inserted on that particular point. As before all new segments must be inserted after the ending segment and be sorted in a decreasing leftness order. The splitting of existing segments is executed by a "Split Fill Active Segment Table" process 1300 which will be explained below with reference to FIG. 13.

At the next step 903 of the process 900, a segment is selected by the processor 305 from the segment table stored in memory 306, in order from the left most segment to the right most segment of the current bucket. The segment selected at step 903 is preferably assigned the label ST_segment. The process 900 continues at step 905, where a segment is selected from the active segment table stored in memory 306 in order from the left most active segment to the right most active segment, and the x-coordinate of the segment selected from the active segment table is set as the current point. A current_point label is preferably assigned to the current point. At the next step 907, a test is executed by the processor 305 to determine if the x-coordinate of the segment selected from the segment table at step 903 is less than the current point value (i.e. the value represented by the label current_point).

If the result of step 907 is true then the process 900 proceeds to step 909, where a test is executed by the processor 305 to determine if the current segment selected from the segment table at step 903 is a horizontal segment. Horizontal segments are herein defined as segments that span across one or more points. Horizontal segments are split at each of these points and these points include points that may or may not be distinct from both the active segment table and the segment table. In the methods described herein, a Horizontal Splitting process 1500 executed by the processor 305 determines the points where a horizontal segment needs to be split and will be explained in more detail later in this document with reference to the flow chart 1500 of FIG. 15. The actual splitting of horizontal segments is executed by a "Split Horizontal Segment" process 1600, which will be explained in further detail with reference to the flow chart of FIG. 16. If the result of step 909 is false, then the process 900 proceeds to step 911, where the current segment is inserted into the active segment table stored in memory 306. If the result of step 909 is true, then the process 900 proceeds to step 913, where the horizontal splitting process 1500 is executed by the processor 305 to split the horizontal segment at each of the points which the segment spans.

The process 900 continues at the next step 915, where if there are any more segments in the current bucket of the segment table stored in memory 306 then the process 900 proceeds to step 917. Otherwise, the update of the segment table is completed and the process 900 concludes and returns to step 607 of flow chart 600.

At step 917, another segment is selected from the segment table in decreasing leftness order and the process 900 returns to step 907. If the result of step 907 is false, then the process 900 proceeds to step 919, where a test is executed by the processor 305 to determine whether the x-coordinate of the segment selected from the segment table at step 917 is equal to the current point value (i.e. current_point). If the result of step 919 is false then the process 900 proceeds to step 921.

At step 921, if there are more points in the active segment table then the process 900 returns to step 905.

If the result of step 919 is true, then the process 900 proceeds to step 923 where the split fill active segment table process 1300 is executed for the current point. As discussed above, the split fill active segment table process 1300 will be explained in more detail below with reference to the flow chart of FIG. 13.

Further, as discussed above, if there are new segments to be inserted into an existing point with only one segment and the segment does not end on that particular point, the existing segment is split before any new segment can be inserted on that particular point. Therefore, all existing points in the active segment table must be tested. However, if there are no more points left in the active segment table stored in memory 306, this test can be omitted and the active segment table can be filled directly. The filling of the active segment table is executed by a "Fill Active Segment Table" process 1400 which will explained in further detail later in this document with reference to the flow chart of FIG. 14.

The process 900 of FIG. 9 continues at the next step 925, where a test is executed by the processor 305 to determine if there are any more points in the active segment tables. A buffer labelled A_flag configured within memory 306 is preferably used to indicate whether there are any more points in the active segment table.

If the result of step 925 is true then the process proceeds to step 927 where the fill active segment table process 1400 is executed by the processor 305 and the process 900 proceeds to step 607 of the process 600. The fill active segment table process 1400 has a self-contained "Horizontal Segment Splitting Point Determination" process since there are no more points in the active segment table. Alternatively, if the result of step 925 is false then the process 900 proceeds to step 929 where a test is executed to determine if there are any more segments in the current bucket of the segment table. A buffer labelled $S_{13}$ flag configured within memory 306 is preferably used to indicate if there are any more segments in the current bucket of the segment table. If the result of the test at step 929 is false then the process returns to step 907. Otherwise, the process 900 concludes and proceeds to step 607 of flow chart 600.

Figure 11:
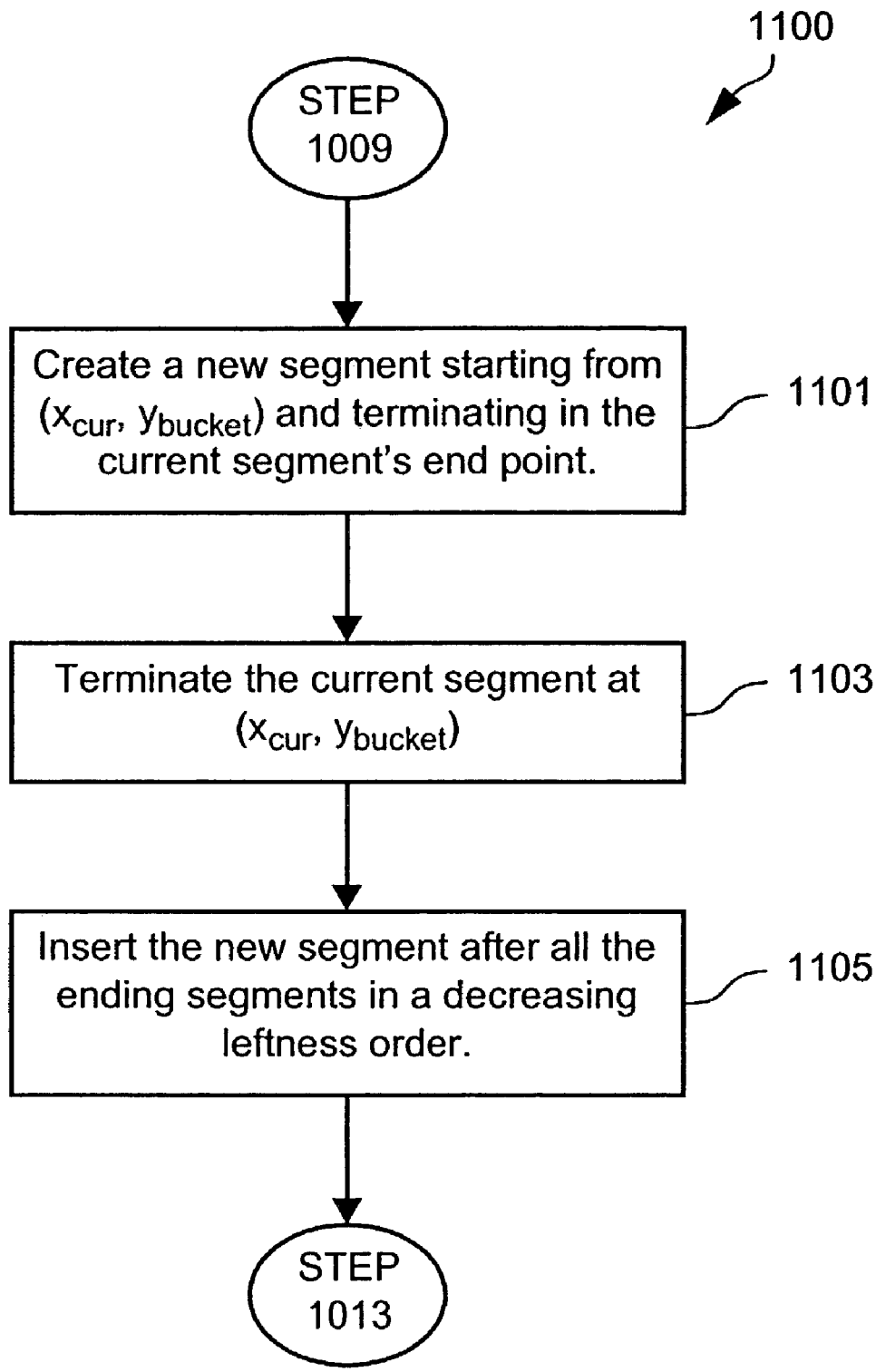
FIG. 11 is a flow chart showing a Split Segment process for separating ending and starting segments on a particular point.
Figure 12:
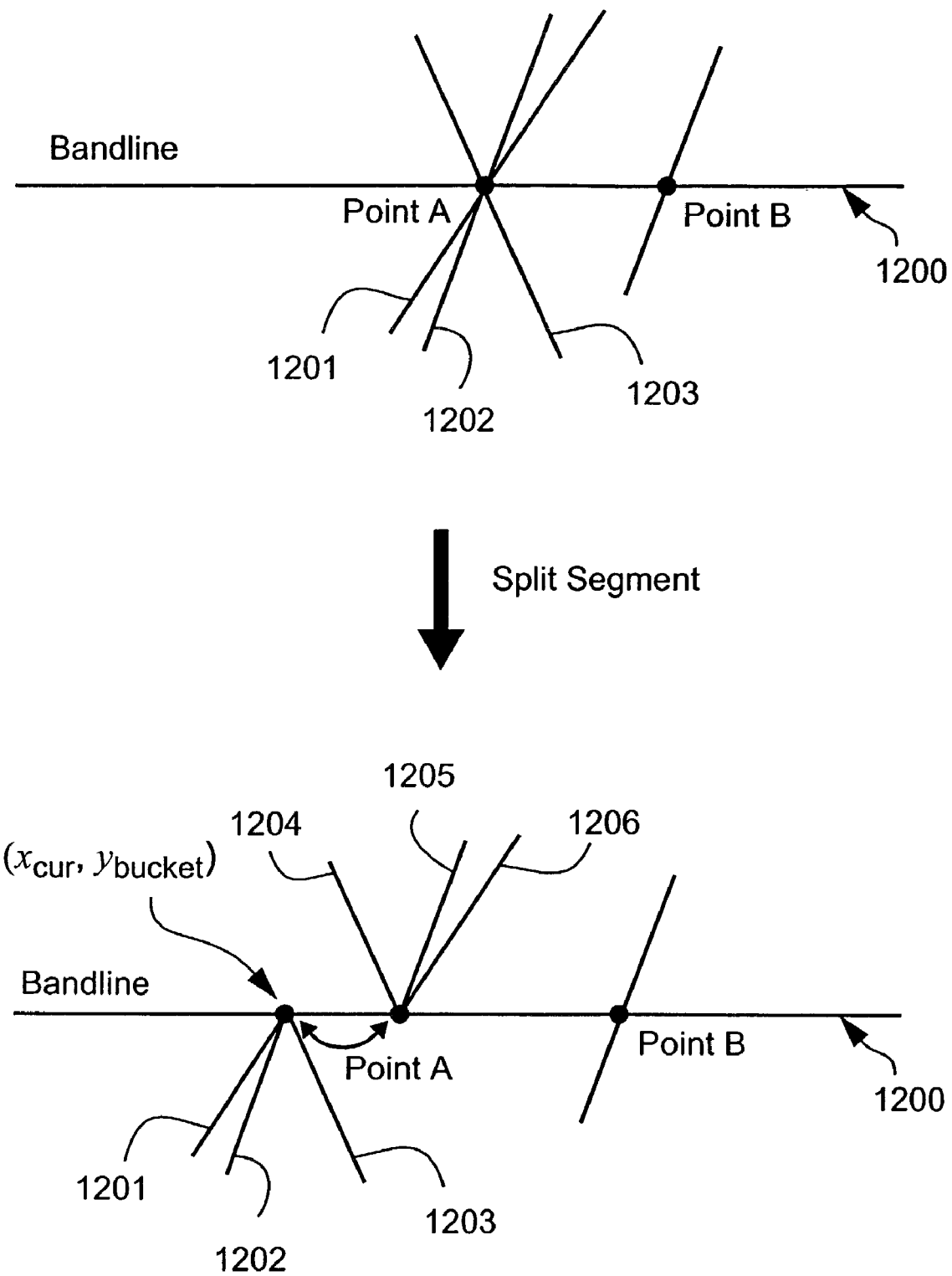
FIG. 12 shows an example of splitting of segments for a band line.

FIG. 10 is a flow chart showing the steps of the splitting detection process 1000 for determining if segments on a particular point need to be split, in accordance with the described methods. The process 1000 is preferably implemented as an application program being resident on the hard disk drive 310 and being read and controlled in its execution by the processor 305. The process 1000 begins at step 1001, where a segment is selected by the processor 305 from the active segment table, stored in memory 306, in order from the left most active segment to the right most active segment. At the next step 1003, a test is executed by the processor 305 to determine if the x-coordinate of the next segment on the current bandline is equal to the x-coordinate of the current segment on the current bandline. If the result of the test at step 1003 is false then the process proceeds to step 1005. At step 1005, if there are more segments in the active segment table, then the process 1000 returns to step 1001. If the x coordinate of the next segment on the current bandline is equal to the x coordinate of the current segment on the current bandline, at step 1003, the process 1000 proceeds to step 1007. At step 1007, the current point label (i.e. current_point) is set to the x coordinate of the current segment on the current bandline. The process 1000 continues at step 1009, where a test is executed by the processor 305 to determine if the segment selected at step 1001 ends at the y-coordinate of the current bucket being processed. If the result of the test at step 1009 is false then the process 1000 proceeds to step 1011, where the selected segment at the current point is split using a "Split Segment" process 1100 as shown in FIG. 11. The split segment process 1100 separates the ending and starting segments on a particular point by creating a new segment after terminating the existing segment on that particular point. The new segment starts from that particular point and ends at the original ending vertex of the terminated segment. The new segment must be inserted after all of the ending segments in a decreasing leftness order. For example, FIG. 12 shows an example of the insertion of new segments 1204, 1205 and 1206 after all of the ending segments 1201, 1202 and 1203 of a current band line 1200. As shown in FIG. 12, after the split segment process 1100 (represented by the arrow of FIG. 12) has been executed, the three segments 1201 to 1203 are terminated at the point A and new segments 1204 to 1206 are inserted. The split segment process 1100 will be explained in more detail below with reference to the flow chart of FIG. 11.

If the segment selected at step 1001 ends at the y-coordinate of the current bucket being processed, at step 1009, then the process 1000 proceeds to step 1013. At step 1013, if there are more segments in the active segment table stored in memory 306 then the process proceeds to step 1015. Otherwise, the splitting detection process 1000 proceeds to step 903 of the process 900. At step 1015, the next segment is selected by the processor 305 from the active segment table stored in memory 306. The process 1000 continues to step 1017, where a test is executed by the processor 305 to determine if the x-coordinate at the current bandline of the segment selected at step 1015, is equal to the current point. If the result of step 1017 is true then the process 1000 returns to step 1009. Otherwise, the process 1000 proceeds to step 1019, where if there are more segments in the active segment table then the process 1000 returns to step 1003. If there are no more segments in the active segment table at step 1019, then the splitting detection process 1000 proceeds to step 903 of the process 900.

FIG. 11 is a flow chart showing the steps of the split segment process 1100 for splitting segments at a particular point. The process 1100 is preferably implemented as an application program being resident on the hard disk drive 310 and being read and controlled in its execution by the processor 305. The split segment process 1100 creates a new segment after terminating an existing segment on a particular point. The process 1100 begins at step 1101, where a new segment is created starting at the point defined by coordinates ($x_{cur}$, $y_{bucket}$) and terminating at the end point of the current segment. At the next step 1103, the current segment is terminated at the point defined by the coordinates ($x_{cur}$, $y_{bucket}$). The process 1100 concludes at step 1105, where a new segment is inserted after all of the ending segments, at the current point on the current bandline, in a decreasing leftness order, and the process 1100 concludes and proceeds to step 1013 of flow chart 700.

Figure 13:
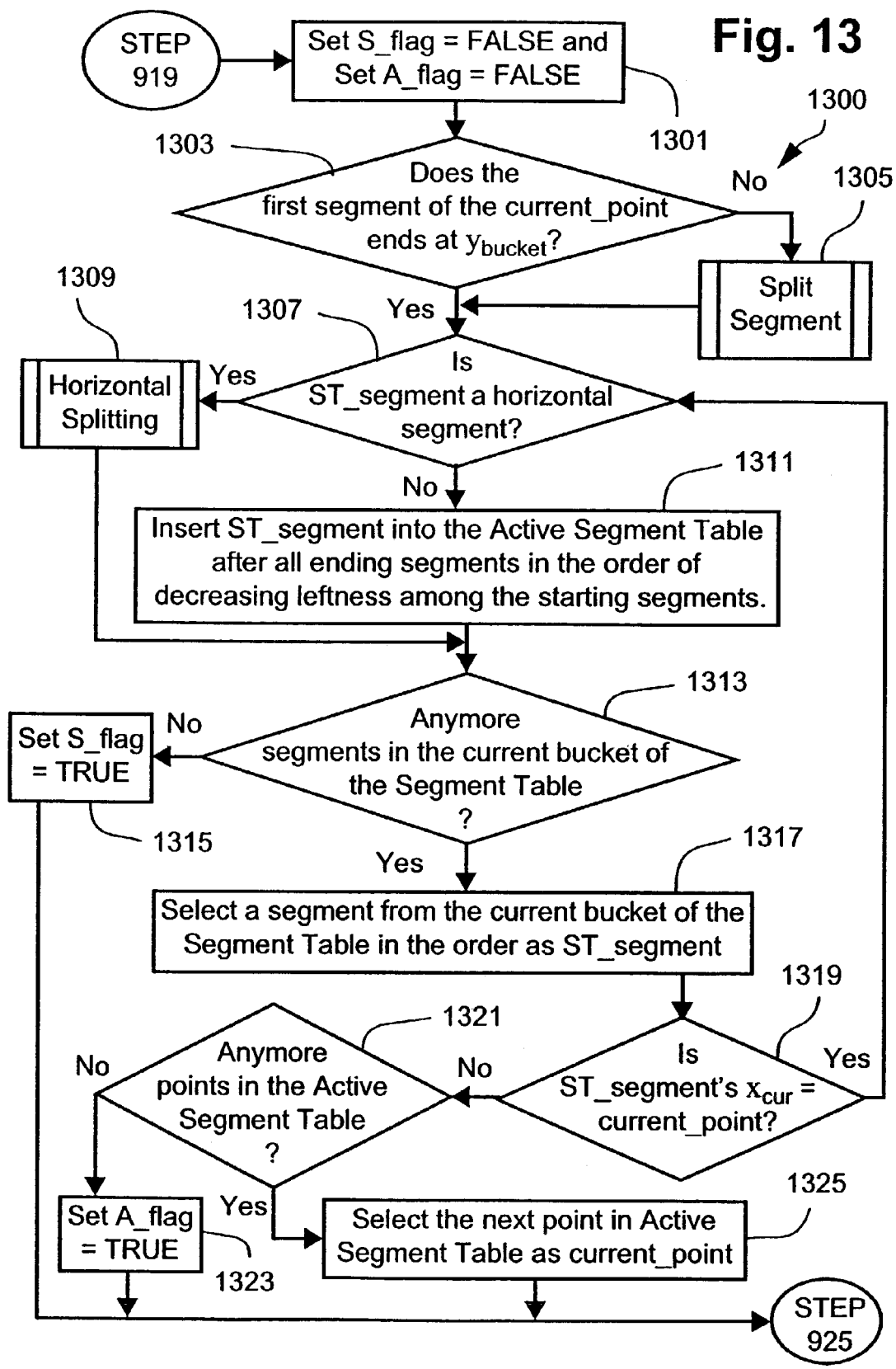
FIG. 13 is a flow chart showing a Split Fill Active Segment Table process.

FIG. 13 is a flow chart showing the steps of the split fill active segment table process 1300. The process 1300 is preferably implemented as an application program being resident on the hard disk drive 310 and being read and controlled in its execution by the processor 305. The split fill active segment table process 1300 is executed by the processor 305 if there are new segments to be inserted into an existing point. The process 1300 begins at step 1301, where both the S_flag and the A_flag stored in memory 306 are set to FALSE indicating that the current bucket of the segment table is not empty and that there is at least one more point in the active segment table. At the next step 1303, a test is executed by the processor 305 to determine if the first segment of the current point ends at $y_{bucket}$. If the result of step 1303 is false then the process 1300 proceeds to step 1305 where the split segment process 1100 is executed by the processor 305 on the first segment of the current bandline. The process 1300 continues at the next step 1307, where a test is executed by the processor 305 to determine if the current segment of the segment table (i.e. ST_segment) is a horizontal segment. If the result of step 1307 is true then the process 1300 proceeds to step 1309, where the horizontal splitting process 1500 is executed by the processor 305 as described above. Otherwise, the process 1300 proceeds to step 1311, where the current segment is inserted into the active segment table after all ending segments of the current bandline, in order of decreasing leftness of the starting segments.

The process 1300 continues at the next step 1313, where a test is executed by the processor 305 to determine if there are any more segments in the current bucket of the segment table. If the result of step 1313 is false then the process 1300 proceeds to step 1315 where the S_flag is set to TRUE. Otherwise, the process 1300 proceeds to step 1317, where a next segment is selected from the current bucket of the segment table in order from the left-most segment to right-most segment of the current bucket. The process 1300 continues at the next step 1319, where a test is executed by the processor 305 to determine if the x-coordinate on the current bandline for the current segment is equal to the current point value (i.e. current_point). If the result of step 1319 is true then the process 1300 returns to step 1307. Otherwise, the process 1300 proceeds to step 1321, where a test is executed by the processor 305 to determine if there are any more segments in the active segment table stored in memory 306. If the result of step 1321 is false then the process 1300 proceeds to step 1323 where the A_flag is set to TRUE. Otherwise, the process 1300 proceeds to step 1325 where the current_point value is set to the next point in the active segment table, the split fill active segment table process 1300 proceeds to step 925 of the process 900.

Figure 14:
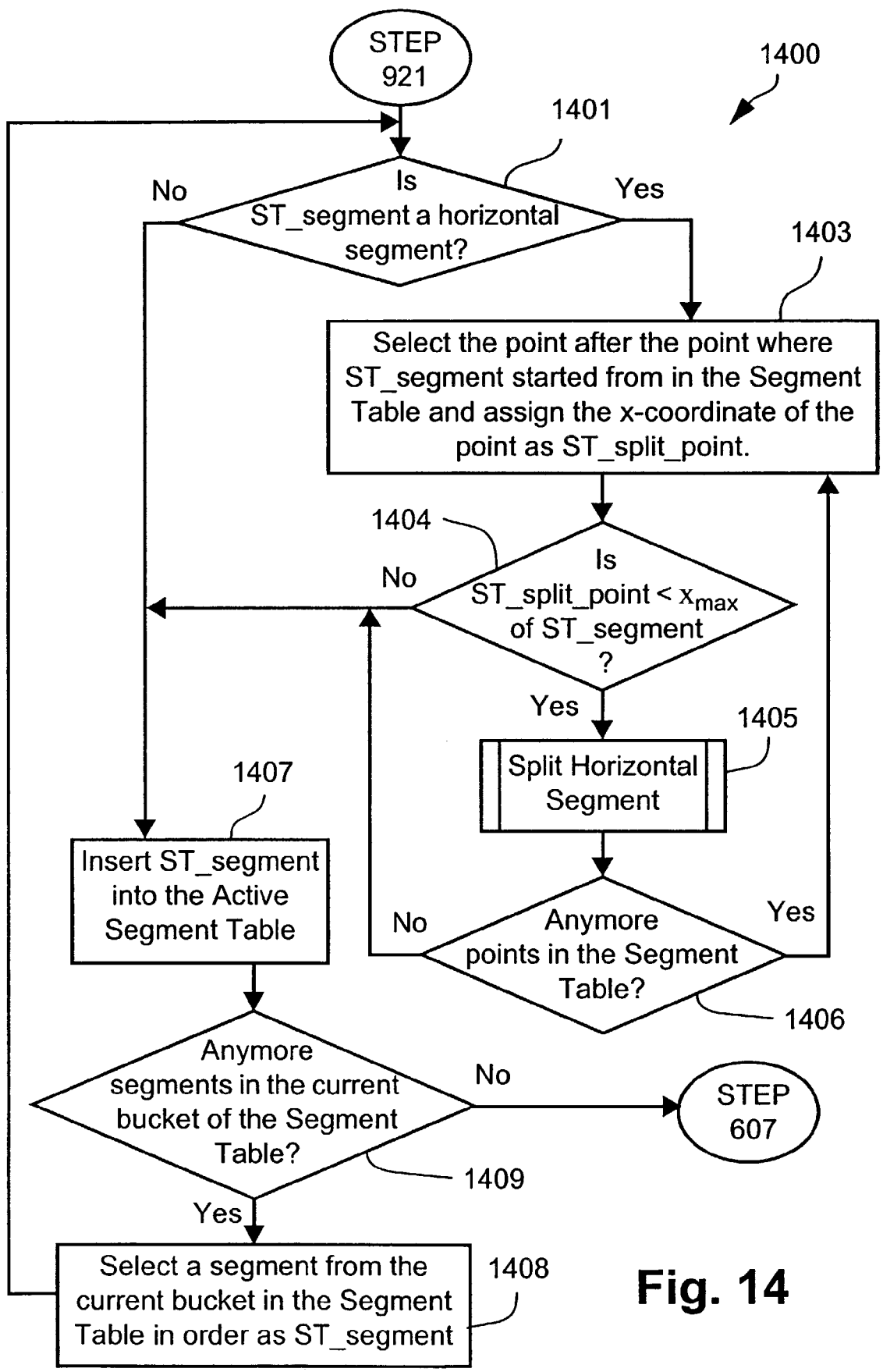
FIG. 14 is a flow chart showing a Fill Active Segment Table process.

FIG. 14 is a flow chart showing the steps of the fill active segment table process 1400 for filling the active segment table. The process 1400 is preferably implemented as an application program being resident on the hard disk drive 310 and being read and controlled in its execution by the processor 305. The process 1400 begins at step 1401, where a test is executed by the processor 305 to determine if the current segment selected from the segment table (i.e. ST_segment) is a horizontal segment. If the result of step 1401 is true then the process proceeds to step 1403, where the point following the point where the current segment starts from in the segment table, is selected and is assigned the x-coordinate of the point. The point where the current segment starts from in the segment table point is preferably assigned the label ST_split_point. The process 1400 continues at the next step 1404, where a test is executed by the processor 305 to determine if ST_split_point is less than the x-coordinate of the ending vertex for the current segment. If the result of step 1404 is true then the process 1400 continues to step 1405, where the split horizontal segment process 1600 is executed by the processor 305 on the current segment. Otherwise, the process 1400 proceeds to step 1407, where the current segment (i.e. ST_segment) is inserted into the active segment table. At the next step 1406, if there are any more points in the segment table then the process 1400 returns to step 1403. Otherwise, the process 1400 proceeds to step 1409.

If the result of step 1401 is false, the current segment is inserted into the active segment table stored in memory 306 at step 1407 and the process 1400 proceeds directly to step 1409. At step 1409, a test is executed by the processor 305 to determine if there are any more segments in the current bucket of the segment table. If there are more points in the segment table at step 1409, then the process 1400 proceeds to step 1408, where a next segment is selected from the current bucket of the segment table and is assigned as the current segment (i.e. ST_segment). After step 1408, the process 1400 returns to step 1401. The process 1400 concludes at step 1409 when there are no more segments in the current bucket of the segment table, and proceeds to step 607 of the process 600.

Figure 15B:
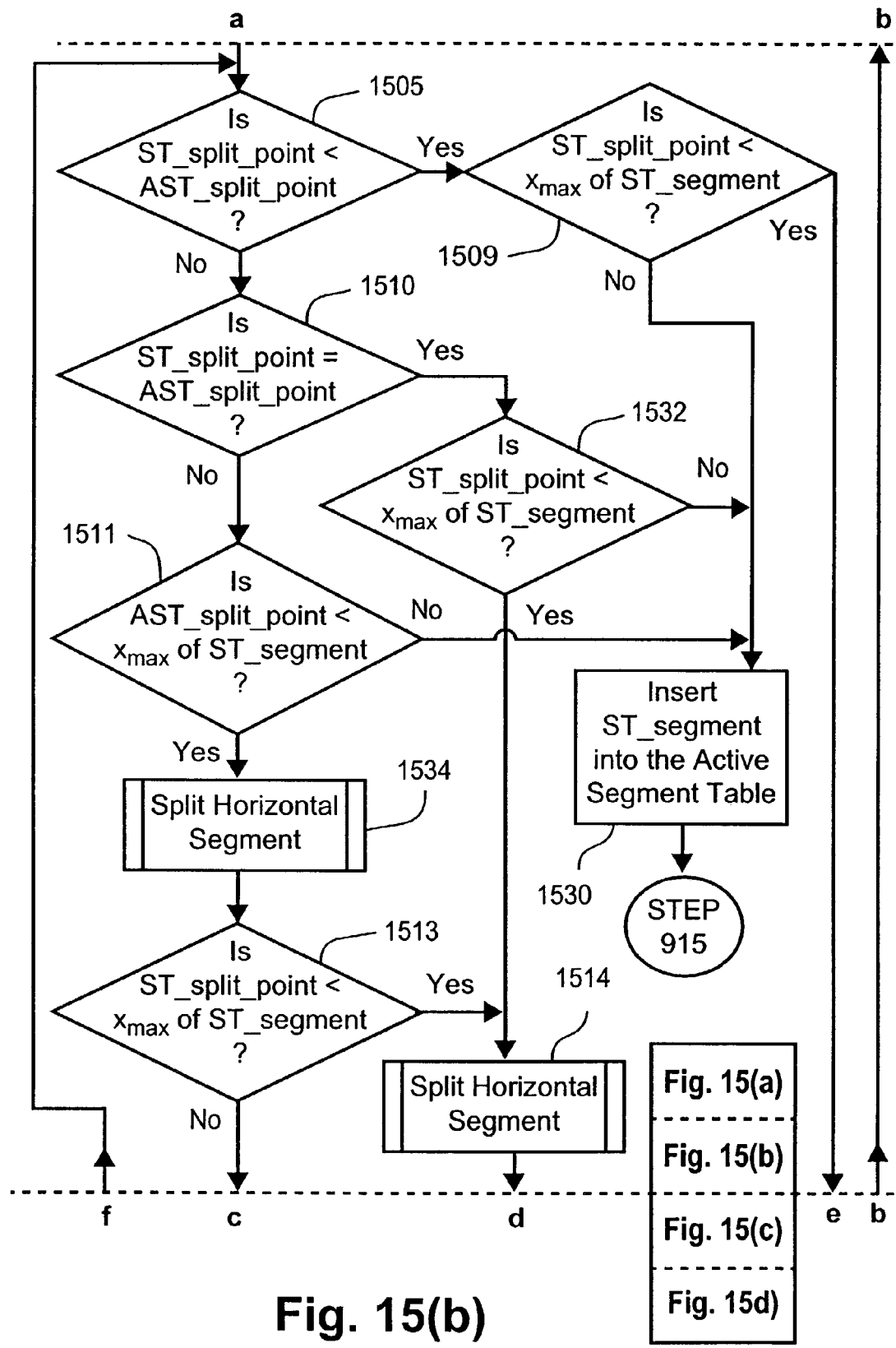
FIG. 15 is a flow chart showing a Horizontal Splitting process for determining points where a horizontal segment needs to be split.
Figure 15C:
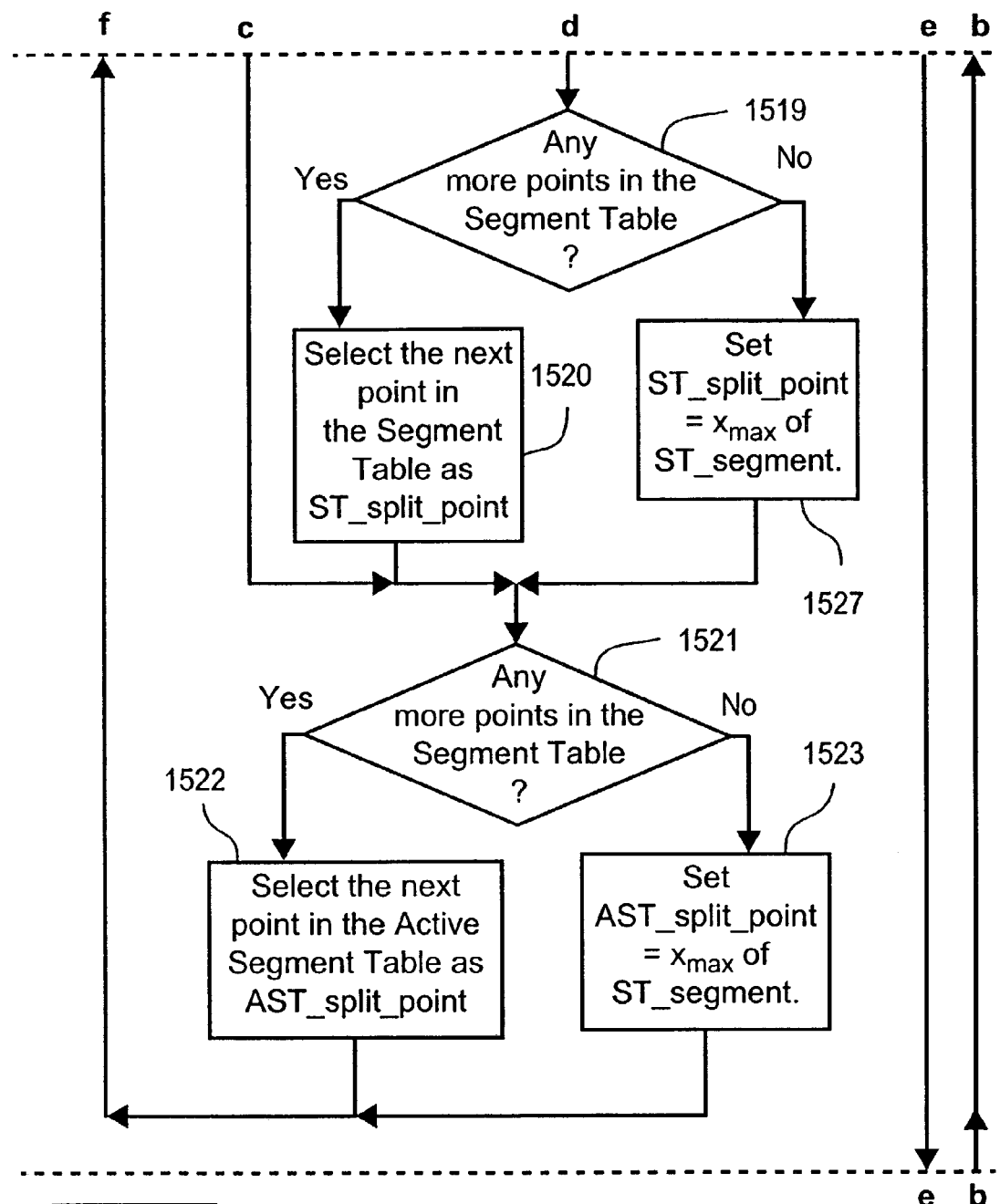
Figure 15D:
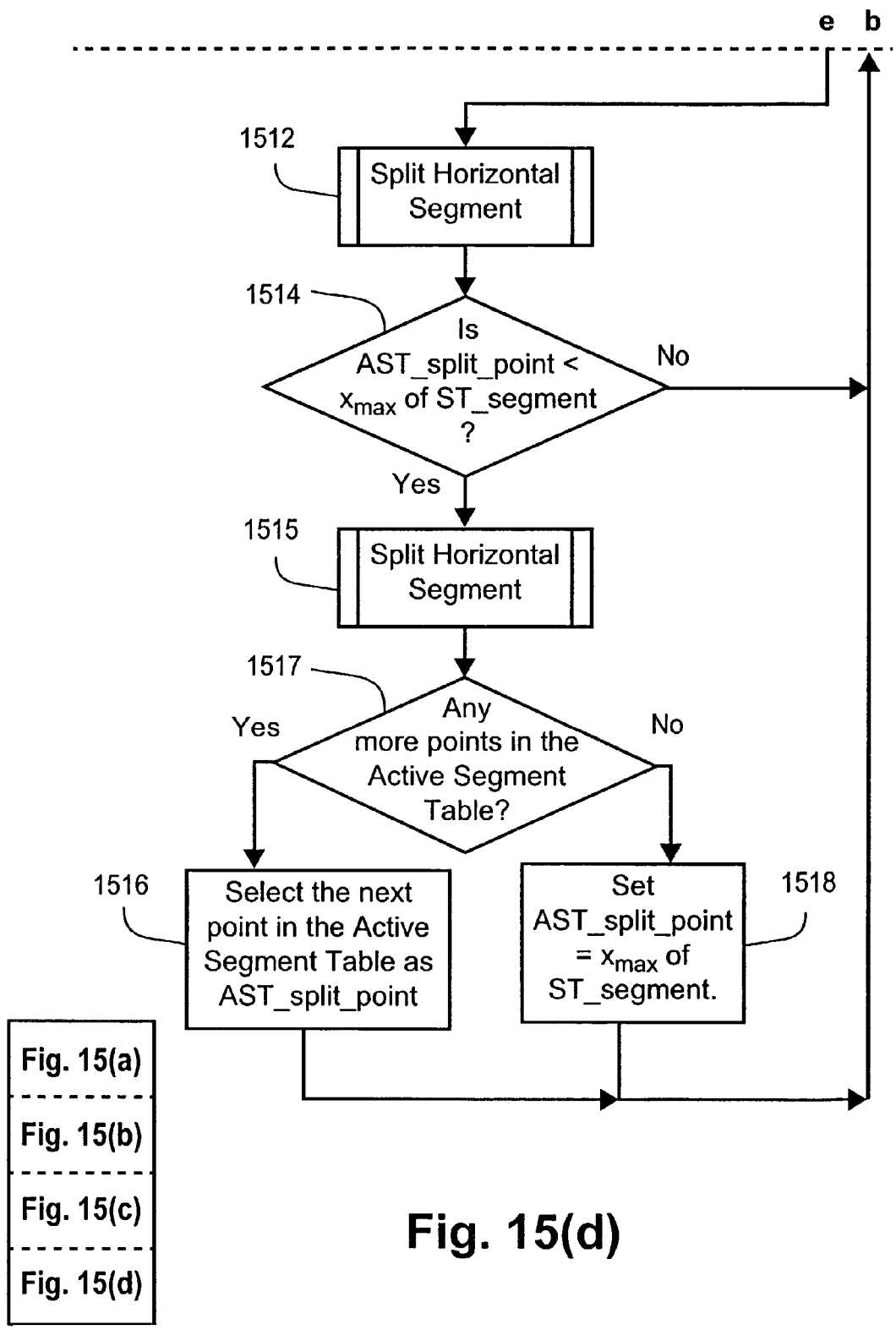

FIG. 15 is a flow chart showing the steps of the horizontal splitting process 1500 for determining the points where a horizontal segment needs to be split. The process 1500 is preferably implemented as an application program being resident on the hard disk drive 310 and being read and controlled in its execution by the processor 305. The process 1500 begins at step 1501, where a test is executed by the processor 305 to determine if the current point is equal to the x-coordinate on the current bandline for the current segment (i.e. ST_segment). If the result of step 1501 is false, then the process 1500 proceeds to step 1502 where the current point is selected as the "Active Segment Table Split Point" (preferably assigned as AST_split_point and stored in memory 306). The process 1500 continues at step 1503, where a test is executed by the processor 305 to determine if there are any more segments in the segment table. If the result of step 1503 is true, then the process 1500 proceeds to step 1504 where the point, following the point where the current segment starts from in the segment table, is selected and this point is assigned the x-coordinate of the point (i.e. ST_split_point). Otherwise, the process 1500 proceeds to step 1506 where the ST_split_point is set by the processor 305 to contain the x-coordinate of the ending vertex for the current segment (i.e. $x_{max}$). At the next step 1505, a test is executed to determine if the ST_split_point is less than the AST_split_point. If the result of step 1505 is true then the process 1500 proceeds to step 1509. At step 1509, if the ST_split_point is greater than or equal to the x-coordinate of the ending vertex for the current segment (i.e. $x_{max}$), then the process 1500 proceeds to step 1530. At step 1530, the segment selected at step 903 or 917 of the process 900 is inserted into the active segment table stored in memory 306. After step 1530, the process 1500 concludes and proceeds to step 915 of the process 900. Otherwise, the process 1500 proceeds to step 1512, where the split horizontal segment process 1600 is executed on the current segment.

At the next step 1514 of the process 1500, if the AST_split_point stored in memory 306 is greater than or equal to the x-coordinate (i.e. $x_{max}$) of the ending vertex for the current segment, ST_segment, then the process 1500 proceeds to step 1508. Otherwise, the process 1500 proceeds to step 1515, where the split horizontal segment process 1600 is executed by the processor 305 on the current segment (i.e. ST_segment). At the next step 1517, if there are any more points in the active segment table then the process 1500 proceeds to step 1516 where the next point in the active segment table is selected as the AST_split_point. Otherwise, the process 1500 proceeds to step 1518 where the AST_split_point is set to contain the x-coordinate (i.e. $x_{max}$) of the ending vertex for the current segment. The process 1500 continues at the next step 1508, where if there are no more points in the segment table then the process 1500 returns to step 1506. Otherwise, the process 1500 proceeds to step 1507 where the next point in the segment table is selected by the processor 305 as the ST_split_point and the process 1500 returns to step 1505.

If the result of step 1501 is true then the process 1500 proceeds to step 1525, where if there are any more points in the active segment table then the point after the current_point is selected as the AST_split_point at the next step 1524. Otherwise, the process 1500 proceeds to step 1526, where the AST_split_point is set to contain the x-coordinate (i.e. $x_{max}$) of the ending vertex for the current segment.

If the result of step 1505 is false, then the process 1500 proceeds to step 1510. At step 1510, if the ST_split point is equal to the AST_split_point then the process 1500 proceeds to step 1532. At step 1532, if the ST_split_point is less than the x-coordinate of the ending vertex for the current segment (i.e. $x_{max}$), then the process 1500 proceeds to step 1514. At step 1514, the split horizontal segment process 1600 is executed by the processor 305 on the current segment. If the ST_split_point is more than the x-coordinate of the ending vertex for the current segment (i.e. $x_{max}$) at step 1532 then the process 1500 proceeds to step 1530. At step 1530, the segment selected at step 603 (or 1017) of the process 600 is inserted into the active segment table stored in memory 306. After step 1530, the process 1500 concludes and proceeds to step 915 of the process 900.

If the ST_split_point is not equal to the AST_split_point at step 1510, then the process 1500 proceeds to step 1511. At step 1511, if the AST_split_point is less than the x-coordinate of the ending vertex for the current segment (i.e. $x_{max}$), then the process 1500 proceeds to step 1534. Otherwise, the process 1500 proceeds to step 1530. At step 1534, the split horizontal segment process 1600 is executed by the processor 305 on the current segment. At the next step 1513, if the ST_split_point is less than the x-coordinate of the ending vertex for the current segment (i.e. $x_{max}$), then the process proceeds to step 1514. Otherwise, the process proceeds to step 1521.

After step 1514 has been executed on the current segment, the process 1500 continues at the next step 1519 where if there are any more segments in the segment table then the process proceeds to step 1520. At step 1520, the next point in the segment table is selected by the processor 305 as the ST_split_point and the process 1500 proceeds to step 1521. If the result of step 1519 is false, then the ST_split_point is set to contain the x-coordinate of the ending vertex for the current segment (i.e. $x_{max}$). At step 1521, if there are any more points in the active segment table, then the next point in the active segment table is selected by the processor 305 as the AST_split_point at step 1522 and the process 1500 returns to step 1505. Otherwise, the process 1500 proceeds to step 1523, where AST_split_point is set to contain the x-coordinate of the ending vertex for the current segment (i.e. $x_{max}$) and the process proceeds to step 1505.

Figure 16:
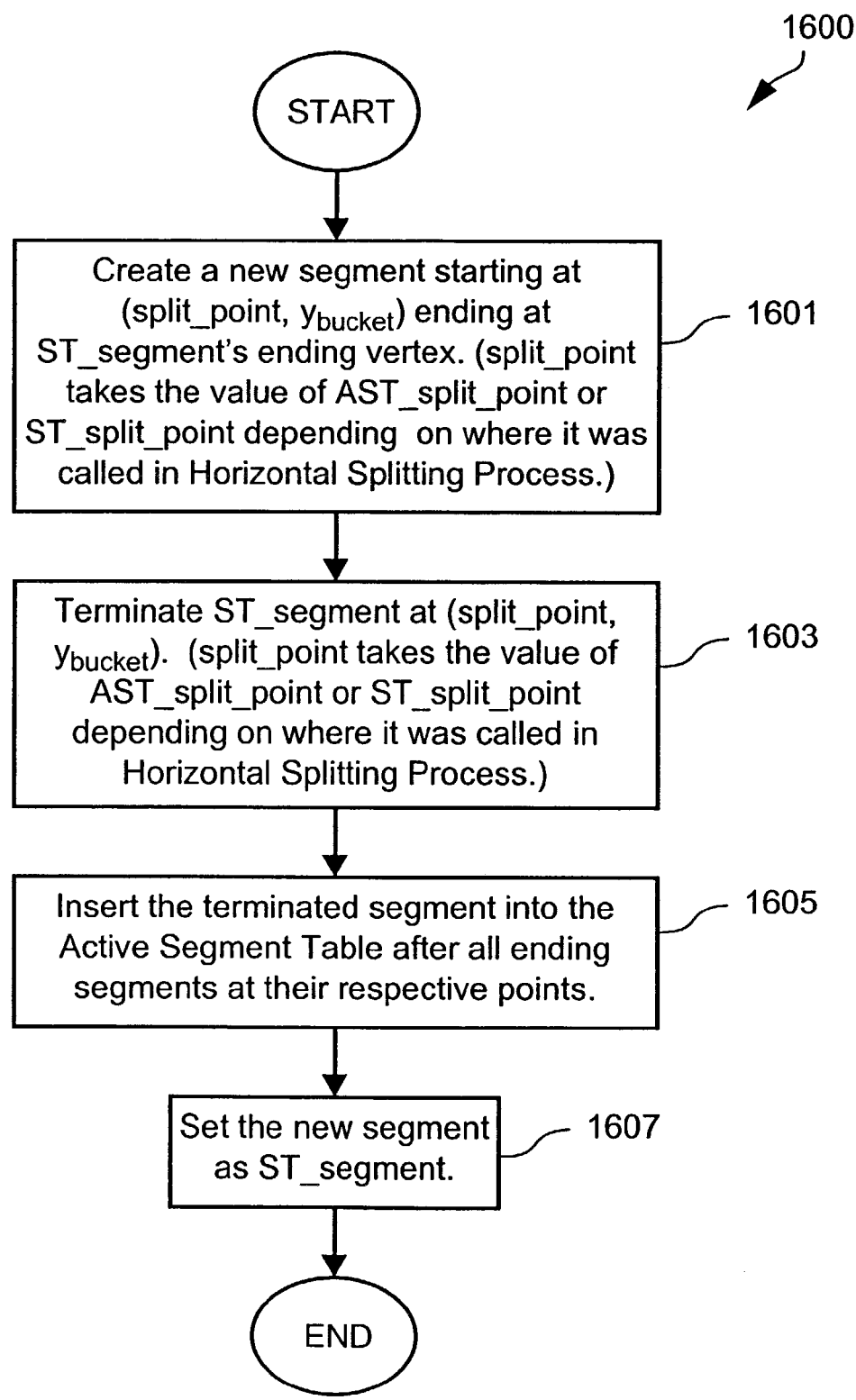
FIG. 16 is a flow chart showing a Split Horizontal Segments process for splitting horizontal segments.

FIG. 16 is a flow chart showing the steps of the split horizontal segments process 1600 for splitting horizontal segments. The process 1600 is preferably implemented as an application program being resident on the hard disk drive 310 and being read and controlled in its execution by the processor 305. The process 1600 begins at step 1601, where a new segment is created starting at the point defined by the coordinates (split_point, y bucket) and ending at the ending vertex of the current segment (i.e. ST_segment). In accordance with the methods described herein, the point defined by the label split_point takes the value of either AST_split_ point or ST_split point depending on where it was in the horizontal splitting process 1500. At the next step 1603 of the process 1600, the current segment (i.e. ST_segment) is terminated at the point defined by the coordinates (split_point, y bucket). The process 1600 continues at the next step 1605 where the terminated segment is inserted into the active segment table by the processor 305 after all ending segments at their respective starting points. The process 1600 concludes at step 1607 where the new segment is set as ST_segment.

Figure 17:
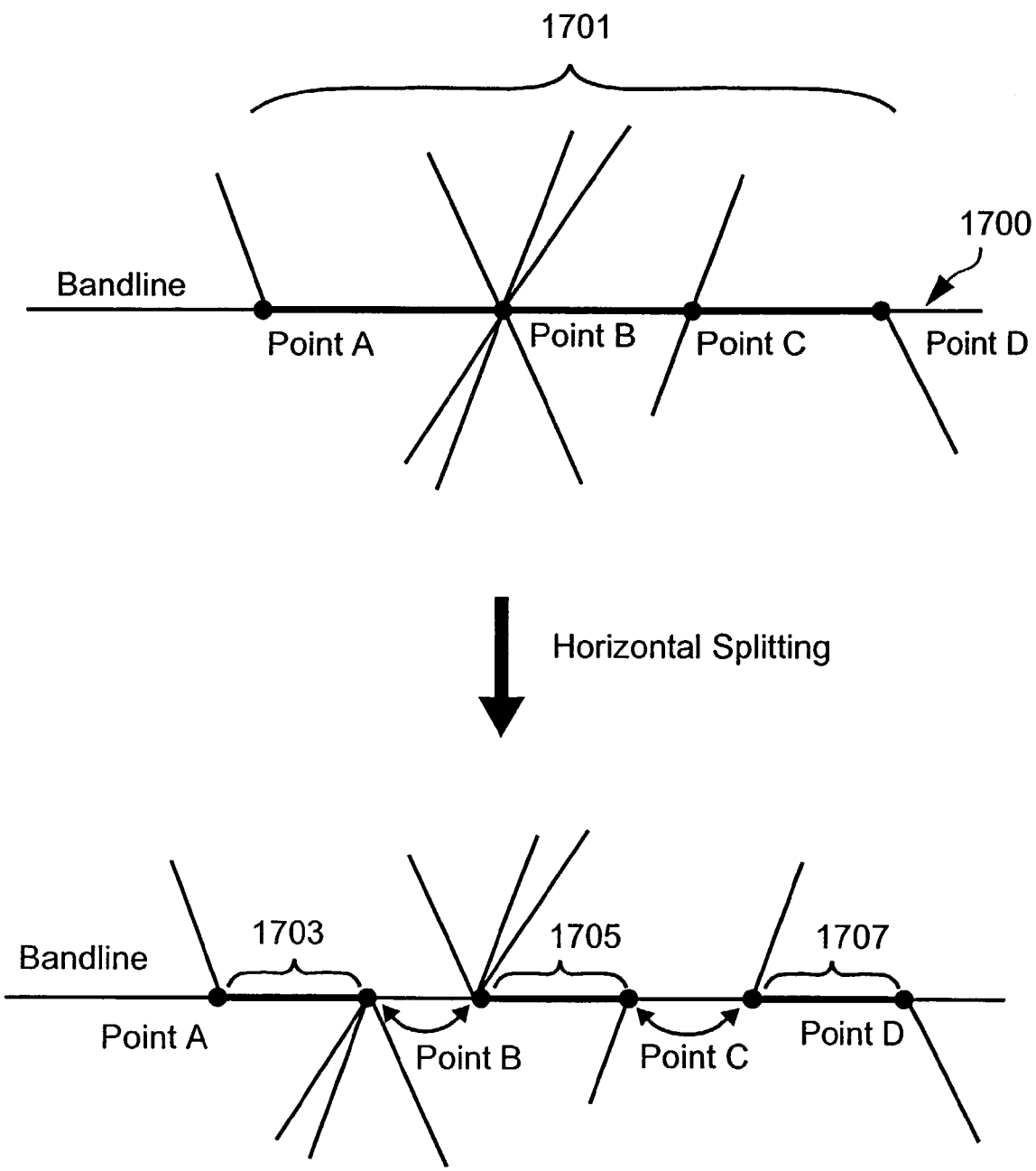
FIG. 17 shows an example of the Horizontal Splitting process of FIG. 15 being executed on segments of a band line.

FIG. 17 shows an example of the horizontal splitting process 1500 being executed on the segment 1701 for the bandline 1700. As shown in FIG. 17, after the horizontal splitting process 1500 (represented by the arrow) has been executed on the segment 1701, the new segments 1703, 1705 and 1707 are created where the segment 1703 starts at point A and ends at the point defined by the coordinates (split_point, y bucket).

Figure 18:
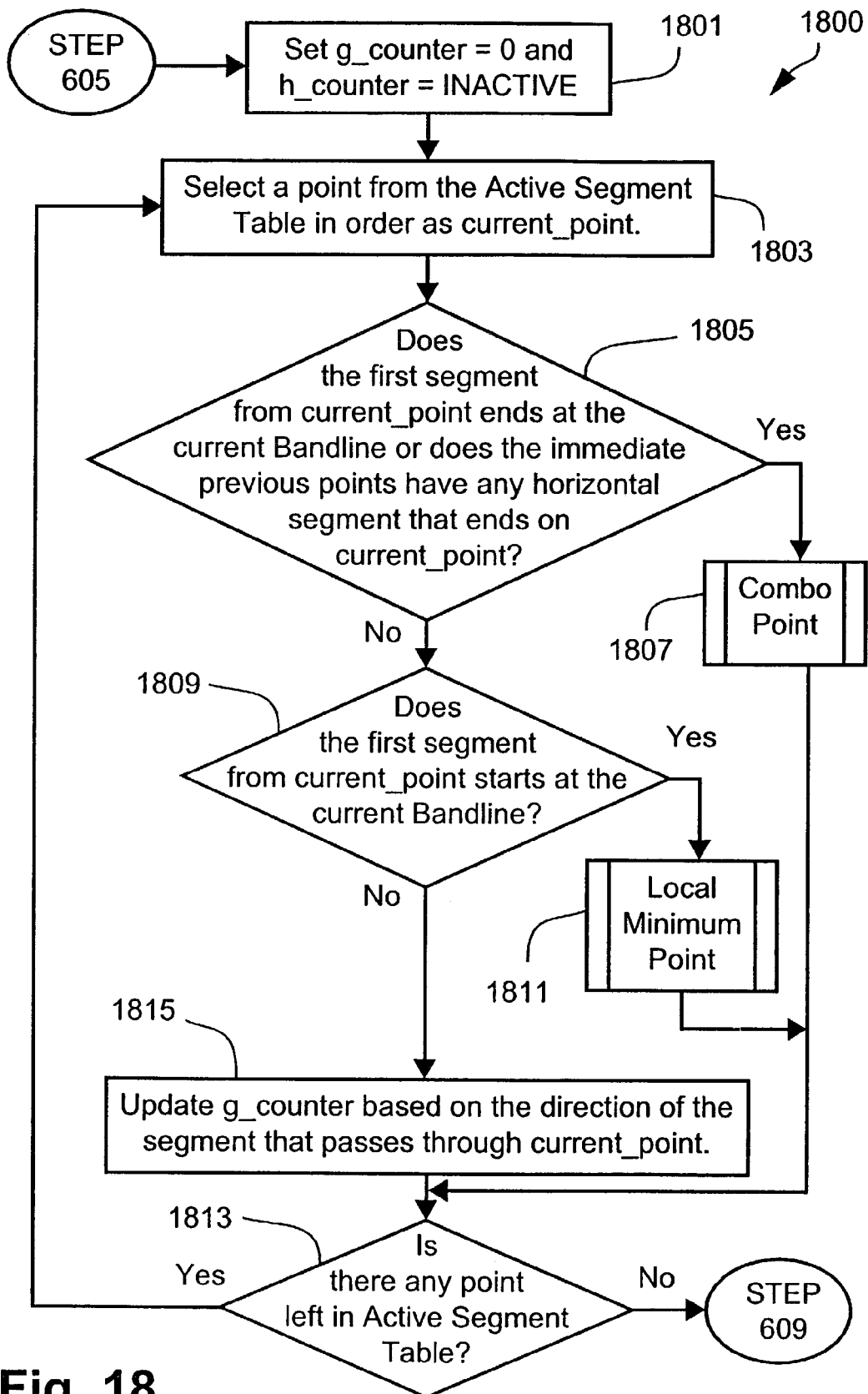
FIG. 18 is a flow chart showing a Segment Assignment and Edge Creation process for creating edges that form a simple outline path for an input path configured with the non-zero winding fill rule.

Returning to the process 600 of FIG. 6(*a*), after the active segment table stored in memory 305 has been updated by the processor 305 and all of the active segments of the current bucket processed, at step 605, the process 600 proceeds to step 607. At step 607 a "Segment Assignment and Edge Creation" process 1800, as seen in FIG. 18, is executed by the processor 305 where the edges that form the simple outline path are created and border segments are assigned to the created edges. The segment assignment and edge creation process 1800 differs for input paths configured with the odd-even winding fill rule and input paths configured with the non-zero winding fill rule.

FIG. 18 is a flow chart showing the segment assignment and edge creation process 1800 for creating the edges that form the simple outline path for an input path configured with the non-zero winding fill rule. The process 1800 is preferably implemented as an application program being resident on the hard disk drive 310 and being read and controlled in its execution by the processor 305. The process 1800 begins at the first step 1801, where a global counter (preferably labelled g_counter and stored within memory 306), is reset to zero. The global counter (i.e. g_counter) is used to identify new border segments and is updated constantly based on the non-zero winding fill rule to reflect the correct counter value for a segment at any time. Also at step 1801, a horizontal counter (preferably labelled h_counter and stored in memory 306) is reset to INACTIVE indicating that no horizontal segments have been encountered in the current bucket. The horizontal counter (h_counter) is set to-ACTIVE by the processor 305 when horizontal segments are encountered at a point and is reset (i.e. to INACTIVE) at the next point pending any horizontal segments. At the next step 1803, a point is selected by the processor 305 from the active segment table and the point is assigned as the current point (i.e. as current_point). The active segment table is processed point by point from left to right in an increasing x-coordinate order. The process 1800 continues at step 1805, where for every point, the first segment of the current point is examined by the processor 305 in order to classify the point as a "combo point" or a "local minimum point". A combo point is a point having a first segment ending on the point. A local minimum point is a point having a first segment starting from the point. Horizontal segments that start from the immediately previous point and end at the current point must also be taken into account. A single segment that passes through the current point is ignored. If the point selected at step 1803 is a combo point or the previous point has any horizontal segment that ends on the selected point, at step 1805, then the process 1800 proceeds to step 1807. At step 1807, the point selected at step 1803 is processed by a "Combo Point" process 2100 for an input path configured with the non-zero winding fill rule, which will now be explained with reference to the flow chart of FIG. 21. The process 2100 is preferably implemented as an application program being resident on the hard disk drive 310 and being read and controlled in its execution by the processor 305.

Steps 2101 to 2107 of the process 2100, identify the first border segment that ends at the current point (i.e. the point selected at step 1803 and assigned the label current_point). This involves a search, which must include any border horizontal segments starting from the immediate previous point and ending at the current point. Steps 2101 to 2107 also identify the last border segment that ends at the current point. Steps 2109 and 2111 of the process 2100 create new vertices for all edges of the border segments. Further, closed edges, indicated by the edge's right and left segment ending on the current point, together with all non-border ending segments are removed from the current point. The process 2100 begins at step 2101 where a test is executed by the processor 305 to determine if the previous point has horizontal segments, as defined above, starting from it. If the result of step 2101 is true, then the process 2100 proceeds to step 2103 where the first ending segment buffer (preferably assigned the label first_ending_segment) is set to contain the first border horizontal segment, if such a horizontal segment exists. Otherwise, the first_ending_segment buffer is set to contain the first ending segment of the current point. If the result of step 2101 is false, the first_ending_segment buffer is set to contain the first_ending_border segment at the current point. At the next step 2107, the last ending segment buffer (preferably assigned the label last_ending_segment) is set to contain the last ending border segment of the point selected at step 1803 of the process 1800. The process 2100 continues at step 2109, where for all of the ending border segments between and including the segments pointed to by the first_ending_segment and the last_ending_segment buffers, a node with a vertex defined by the point ($x_{cur}$, $y_{bucket}$) is inserted by the processor 305 into the left/right wing of the first and last ending segment's respective edges depending on whether the segments have been classified as a "left" or "right" border segment. The requirements for classifying a segment as a left or right border segment are shown in FIG. 20. In this connection, the methods described herein utilise a counter preferably configured within memory 306, which is assigned to each segment. A segment is classified as a left border segment if the segment is an upward segment, as discussed above, and the counter associated with the particular segment has a value of zero or the segment is a downward segment and the counter associated with the segment has a value of zero. Alternatively, a segment is classified as a right border segment if the segment is a downward segment and the counter associated with the segment has a value of one or the segment is an upward segment and the associated counter has a value of negative one.

The process 2100 continues at step 2111, where all ending border segments belonging to the same edge and all non-border ending segments on the current point are removed from the active segment table by the processor 305. At steps 2113 to 2117 of the process 2100, segments starting from the current point are processed by a Segment Connection and Edge Creation process 2200 whereby for each border segment starting from the current point, new edges are created. The Segment Connection and Edge Creation process 2200 will be explained below with reference to the flow chart of FIG. 22. If there is a border segment remaining at step 2115, the remaining segment is connected to the first ending segment by a Connecting Segment process 3300 which will be explained below with reference to the flow chart 3300 of FIG. 33.

At step 2113 of the process 2100, a test is executed to determine if there is any segment starting at the current point. If the result of step 2113 is false, then all remaining ending segments on the current point are removed from the active segment table by the processor 305, at step 2117. Otherwise, the process 2100 proceeds to step 2115 where the Segment Connection and Edge Creation process 2200 is executed by the processor 305.

Figure 22B:
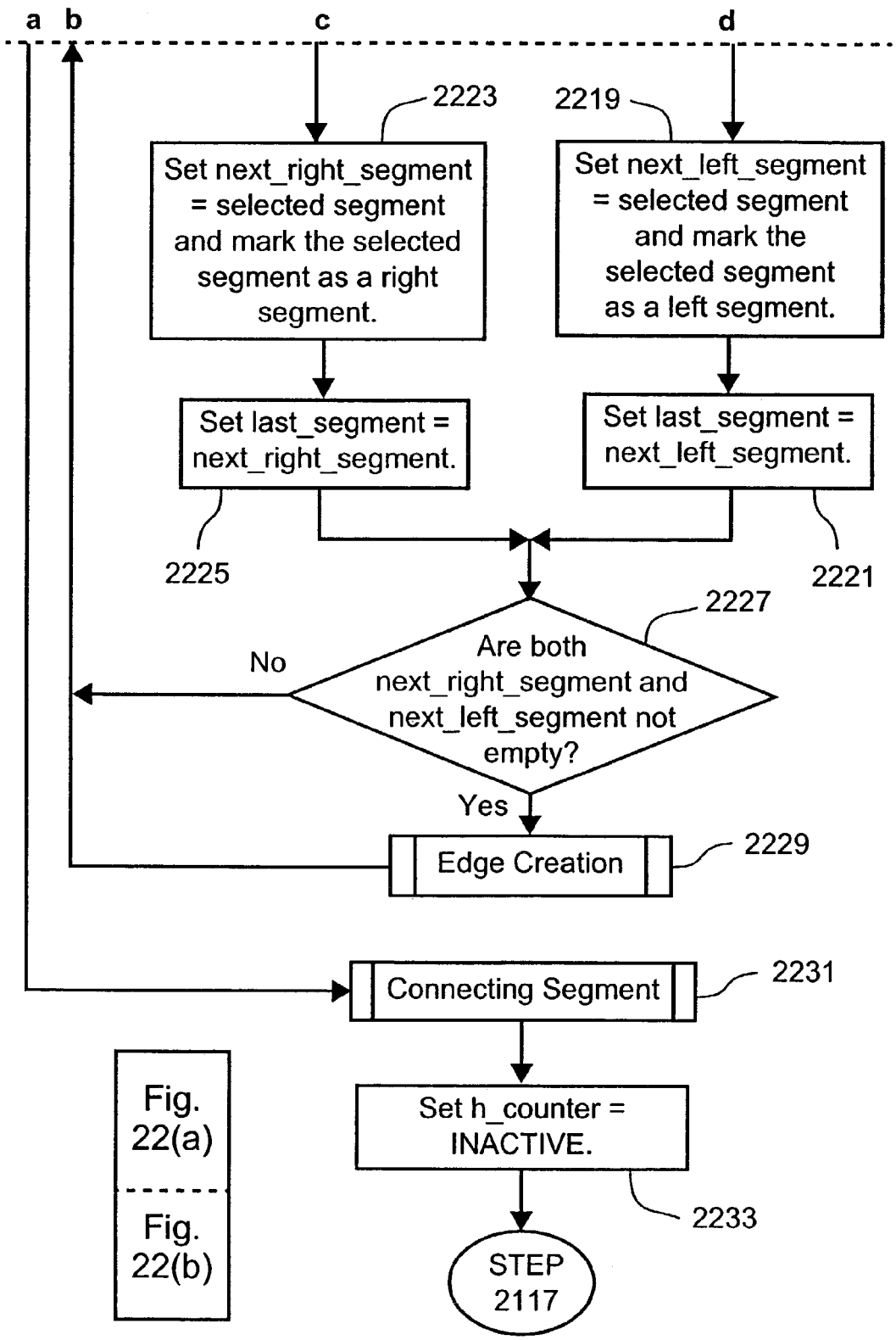
FIG. 22 is a flow chart showing a Segment Connection and Edge Creation process for creating edges that form a simple outline path for an input path.
Figure 34:
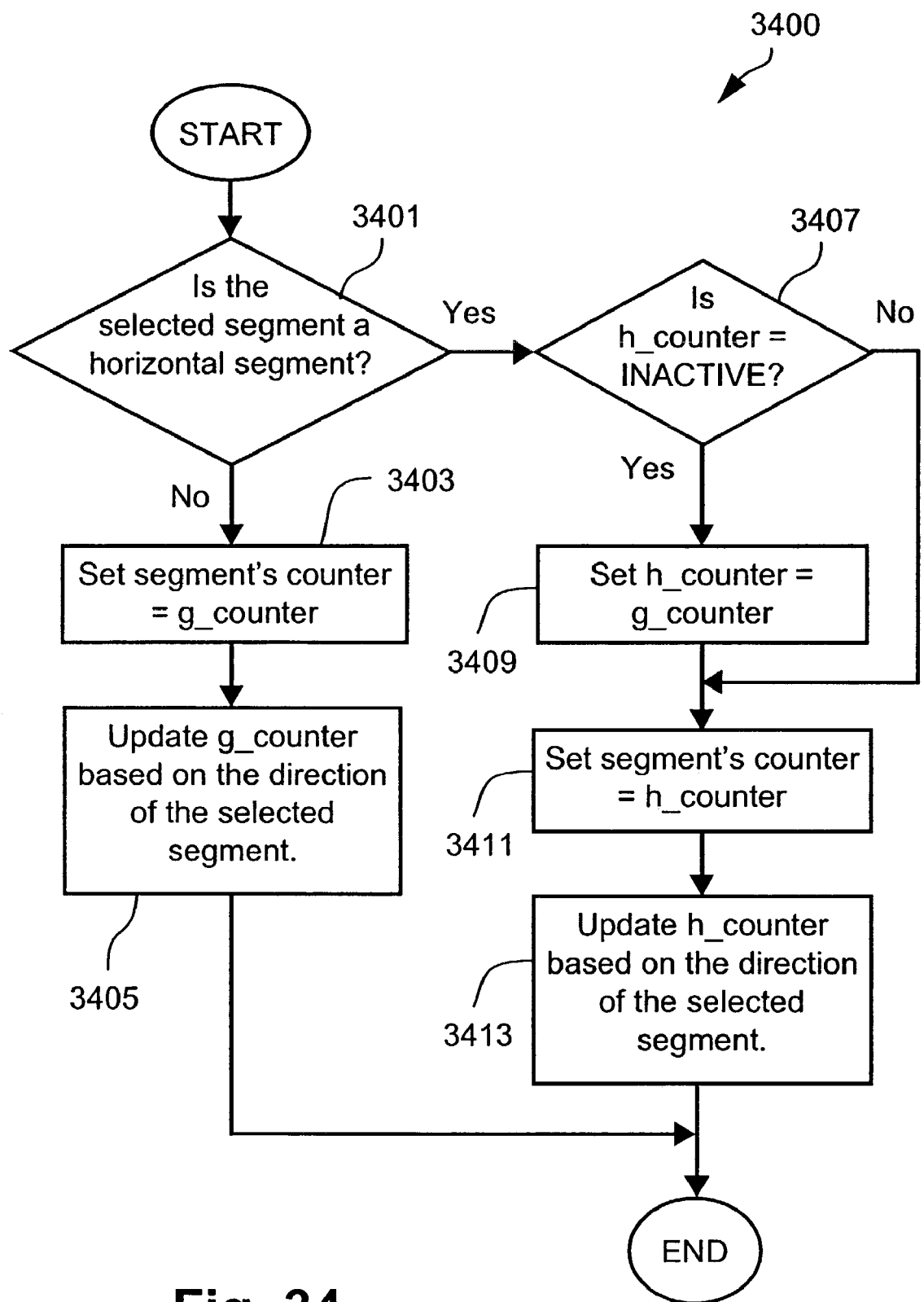
FIG. 34 is a flow chart showing an Update Counter process for updating global and horizontal flags.
Figure 35:
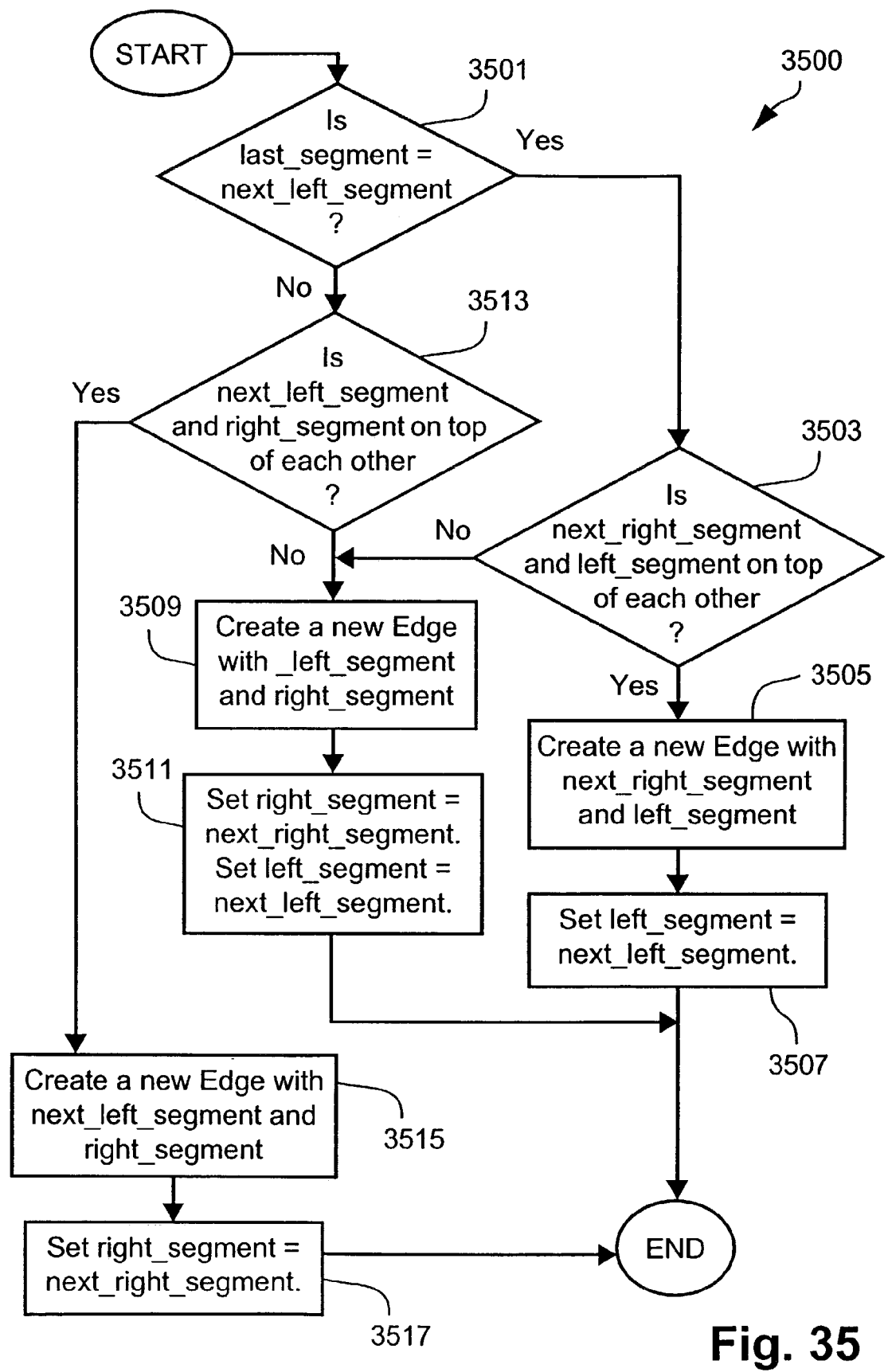
FIG. 35 is a flow chart showing an Edge Creation process for creating edges at a point.

As seen in FIG. 22, the process 2200 begins at step 2201 with the selection of a segment starting at the current point (hereinafter referred to as the selected segments). The segments are selected by the processor 305 in order of decreasing leftness, as discussed above, for the current bandline. At the next step 2203, the process 2200 proceeds to step 2203 where an Update Counter process is executed for the segment selected at step 2201. The Update Counter process 3400, as seen in FIG. 34, assigns the value of the global counter (i.e. g_counter) to the current segment selected at step 2201, and updates the global counter based on the direction of the segment. The horizontal flag (i.e. h_flag) is set to contain the value of the g_counter if the segment selected at step 2201 is a horizontal segment. The update counter process 3400 will now be explained below with reference to the flow chart of FIG. 34.

The update counter process 3400 updates the global and horizontal flags during the process 2200. The process 3400 begins at step 3401 where a test is executed to determine if the current segment selected at step 2201 is a horizontal segment. If the current segment selected at step 2201 is not a horizontal segment step 3401, then the process 3400 proceeds to step 3403 where the counter associated with the segment is set to the value of the g_counter stored in memory 306. The value of the g_counter is updated based on the direction of the segment selected at step 2201. The process 3400 concludes when the g_counter has been updated.

If the current segment selected at step 2201 is a horizontal segment at step 3401, then the process 3400 proceeds to step 3407. At step 3407, if the h_flag is set to INACTIVE, as discussed above, then the process proceeds to step 3409 where the h_flag is set to the value of the g_counter stored in memory. If the h_flag is not set to INACTIVE at step 3407, then the process 3400 proceeds directly to the next step 3411, where the counter associated with the segment selected at step 2201 is set to contain the h_flag. At the next step 3413, the value of the h_flag is updated by the processor 305 based on the direction of the segment selected at step 2201, and the process 3400 concludes.

Returning to the process 2200, at the next step 2205, a counter associated with the segment selected at step 2201 is tested by the processor 305 to determine if the current segment selected at step 2201 is a left border segment, as discussed above with reference to FIG. 20. If the result of step 2205 is true then the process 2200 proceeds to step 2207. At step 2207, if a left_segment buffer is empty then the process 2200 proceeds to step 2209 where the left_segment buffer is set point to the segment selected at step 2201 and the selected segment is marked as a left segment. The process 2200 continues at step 2211, where if there are more segments at the current point then the process 2200 returns to step 2201.

If the result of step 2205 is false then the process 2200 proceeds to step 2213, where the counter associated with the segment is tested by the processor to determine if the current segment selected at step 2201 is a right border segment, as discussed above with reference to FIG. 17. If the result of step 2213 is true then the process 2200 proceeds to step 2215. At step 2215, if a right_segment buffer is empty then the process 2200 proceeds to step 2217 where a right_segment buffer is set to contain the segment selected at step 2201 and the selected segment is marked as a right segment. After step 2217, the process 2200 continues at step 2211, where if there are more segments at the current point then the process 2200 returns to step 2201.

If the result of step 2207 is false then the process 2200 proceeds directly to step 2219 where a next_left_segment buffer is set to contain the segment selected at step 2201 and the selected segment is marked as a left segment. At the next step 2221, a last_segment pointer is set to point to the next_left_segment buffer. Similarly, if the result of step 2215 is false then the process 2200 proceeds directly to step 2223 where a next_right_segment buffer is set to contain the segment selected at step 2201 and the selected segment is marked as a right segment. At the next step 2225, a last_segment pointer is set to point to the next_right_segment buffer.

The process 2200 continues at the next step 2227, as shown in FIG. 22, where if both the next_right_segment and the next_left_segment buffers are not empty then the process 2200 proceeds to step 2211. Otherwise the process 2200 proceeds to step 2229, where an Edge Creation process is executed by the processor 305 on the buffered segments to create a new edge. Four border segments (i.e. two left and two right border segments) are preferably buffered before the Edge Creation process 3500 is executed. The Edge Creation process 3500 will now be described with reference to the flow chart of FIG. 35.

When creating new edges, priority is given to segments that are on top of each other (i.e. co-linear segments). New edges that have been created are marked as starting from the current point and the two segments that form each particular edge are assigned as owned by the edge, which the two segments form. The process 3500 begins at step 3501 where if the last_segment pointer points to the next_left_segment buffer then the process 3500 proceeds to step 3503. At step 3503, if the segments contained in the next_right_segment buffer and the left_segment buffer are co-linear then the process 3500 proceeds to step 3505, where a new edge is created with the segments pointed to by the next_right_segment and left_segment buffers. At the next step 3507, the left_segment buffer is set to the next_left_segment buffer and the process 3500 concludes.

If the segments pointed to by the next_right_segment buffer and the left_segment buffer are not co-linear at step 3503, then the process 3500 proceeds to step 3509, where a new edge is created by the processor 305 with the segments contained in the right_segment and the left_segment buffers. At the next step 3511, the left_segment buffer is set to point to the next_left_segment buffer, the right_segment buffer is set to the next_right_segment buffer, and the process 3500 concludes.

If the last_segment pointer is not pointing to the next_left_segment buffer at step 3501 then the process 3500 proceeds to step 3513. At step 3513, if the next_left_segment buffer and the right_segment buffer are co-linear then the process 3500 proceeds to step 3515. Otherwise the process 3500 proceeds to step 3509. At step 3515, a new edge is created with the segments pointed to by the next_left_segment and the right_segment buffers. The process 3500 concludes at the next step 3517 where the next_right_segment buffer is set to the right_segment buffer.

Returning to the process 2200, if there are no more segments at the current point at step 2211, then the process 2200 proceeds to step 2231 where the Connecting Segment process 3100 is executed by the processor 305 for the current point. As discussed above, the process 3100 connects any left-over border segments to the first ending segment. The process 2200 concludes at the next step 2233 where the h_flag is set to INACTIVE. The connecting segment process 3300, in accordance with the methods described herein, will now be explained. The process 3300 is preferably implemented as an application program being resident on the hard disk drive 310 and being read and controlled in its execution by the processor 305.

The process 3300 begins at step 3301, where if both the left_segment and the right_segment buffers are not empty then the process proceeds to step 3303. At step 3303, if either the next_left_segment or the next_right_segment buffers are not empty then the process 3300 proceeds to step 3305. At step 3305, a test is executed by the processor 305 to determine if the last_segment pointer points to the next_left_segment buffer. If the result of step 3305 is true then the process 3300 proceeds to step 3307, where the last_segment pointer is set to point to the next_right_segment buffer. If the result of step 3305 is false then the process 3300 proceeds to step 3309, where the last_segment pointer is set to point to the next_left_segment buffer. The process 3300 continues at the next step 3311, where the Edge Creation process 2200 is executed for the left over segment. At the next step 3313, the left over segment is assigned to the edge of the first ending segment (preferably labelled as first_ending_segment). Also at step 3313, the left over segment is marked as left or right depending on the first ending segment.

If the result of step 3301 is false, then the process 3300 proceeds to step 3317. At step 3317, if either the left_segment or the right_segment buffers are not empty then the process 3300 proceeds to step 3313. Otherwise, the process 3300 proceeds directly to step 3319. If the result of step 3303 is false, then the process 3300 proceeds to step 3319. At step 3319, a new edge is created with the left (i.e. left_segment) and the right (i.e. right_segment) segments. The process 3300 concludes after step 3319.

Returning to the process 1800, if the first point is not a combo point, then the process 1800 proceeds to step 1809. At step 1809, if the first segment from the current point (i.e. selected at step 1803), does not start at the current bandline then the process 1800 proceeds to step 1815. At step 1815, the g_counter is updated by the processor 305 based on the direction of the segment that passes through the current point (i.e. current_point). At the next step 1813, if there are any more points left in the active segment table then the process 1800 returns to step 1803. Otherwise, the process 1800 concludes and proceeds to step 609 of the process 600. Alternatively, if the first segment of the current point, selected at step 1803, starts at the current bandline, at step 1809, then the point is classified as a local minimum point and the point is processed by a local minimum point process for an input path configured with the non-zero winding fill, at the next step 1811 before proceeding to step 1813. The local minimum point process 1900 for an input path configured with the non-zero winding fill rule will now be explained with reference to the flow chart of FIG. 19. The process 1900 is preferably implemented as an application program being resident on the hard disk drive 310 and being read and controlled in its execution by the processor 305.

In accordance with the Local Minimum Point process 1900, segments are processed one at a time in the order that the segments are arranged (i.e. in order of decreasing leftness). For a local minimum point, all segments are new (i.e. all segments start at the current bandline). Therefore, the global counter (i.e. g_counter) value is assigned to each of the segments and then updated by the processor 305 based on the direction of each of the segments at the local minimum point, utilising the update counter process 3200. The process 1900 begins at steps 1901 where a segment from the current point (i.e. selected at step 1803) is selected by the processor 305 in order of decreasing leftness. At the next step 1903, the process 1900 proceeds to step 1903 where the update counter process 3400 is executed for the segment selected at step 1901.

As discussed above, the update counter process 3400 assigns the value of the counter associated with the current segment selected at step 1901, and updates the counter based on the direction of the segment.

At the next step 1905 of the process 1900, a counter associated with the segment selected at step 1901 is tested together with the direction of the segment in order to determine if the segment selected at step 1901 is a left border segment (i.e. the counter and direction associated with the segment selected at step 1901, indicates if the segment is a Left or Right border segment. For example, if the counter associated with the segment has a value of zero and the segment is an upward segment then the segment is classified as an upward left border segment). If the result of step 1905 is true then the process 1900 proceeds to step 1907. At step 1907, if the left_segment buffer is empty then the process 1900 proceeds to step 1909 where the left_segment buffer is set by the processor 305 to contain the segment selected at step 1901 and the selected segment is marked as a left segment. The process continues at step 1911, where if there are more segments at the current point then the process 1900 returns to step 1901.

If the result of step 1905 is false then the process 1900 proceeds to step 1913, where the counter associated with the current segment and the direction of the current segment is tested and the direction of the segment is determined by the processor 305 in order to test if the segment selected at step 1901 is a right border segment, as discussed above with reference to FIG. 17. If the result of step 1913 is true then the process 1900 proceeds to step 1915. At step 1915, if the right_segment buffer is empty then the process 1900 proceeds to step 1917 where the right_segment buffer is set to contain the segment selected at step 1901 and the selected segment is marked as a right segment. After step 1917, the process 1900 continues at step 1911, where if there are more segments at the current point then the process 1900 returns to step 1901.

If the result of step 1907 is false then the process 1900 proceeds directly to step 1919 where a next_left_segment buffer is set to contain the segment selected at step 1901 and the selected segment is marked as a left segment by the processor 305. At the next step 1921, the last_segment pointer is set by the processor 305 to point to the next_left_segment buffer. Similarly, if the result of step 1915 is false then the process 1900 proceeds directly to step 1923 where the next right_segment buffer is set to contain the segment selected at step 1901 and the selected segment is marked as a right segment. At the next step 1925, the last_segment pointer is set to point to the next_right_segment buffer.

Figure 19B:
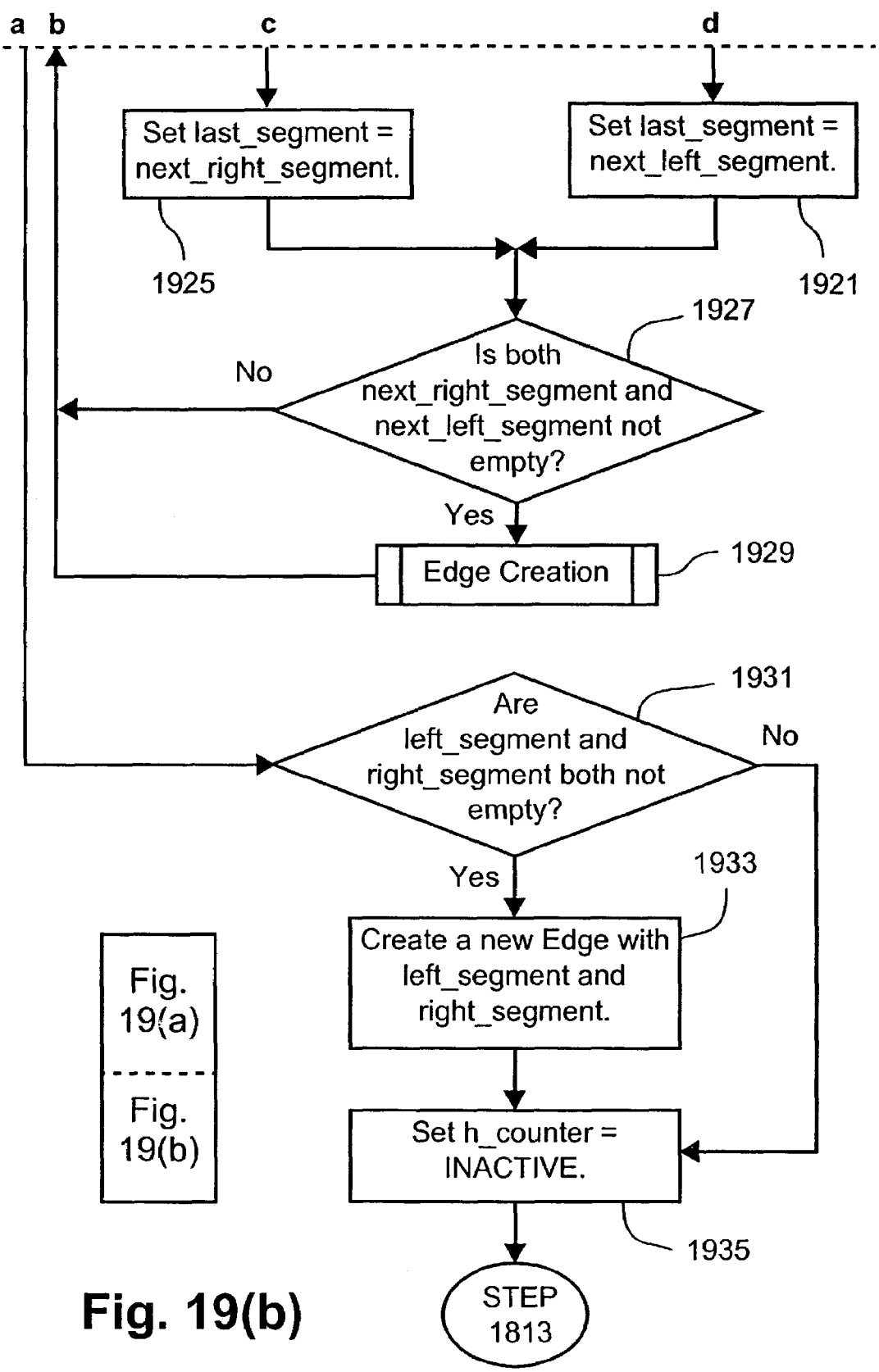
FIG. 19 is a flow chart showing a Local Minimum Point process for processing an input path configured with the non-zero winding fill rule.

As discussed above, when creating new edges, priority is given to co-linear segments. New edges that have been created are marked as starting from the current point and the two segments that form each particular edge are assigned as owned by the edge, which the two segments form. In order to establish priority for co-linear segments, two left segments and two right segments are buffered prior to creating the new edge, as discussed above. As soon as the left and right segments have been buffered, a new edge can be created and marked as starting from the current point. The left and right segments of the new edge are marked as left and right respectively and are assigned as owned by the newly created edge. Those skilled in the art will appreciate that the number of border segments at a local minimum point is always even and that there will always be an equal number of left and right segments. Therefore, the process 1900 continues at the next step 1927, as shown in FIG. 19, where if both the next_right_segment and the next_left_segment buffers are empty then the process 1900 proceeds to step 1911. Otherwise the process 1900 proceeds to step 1929, where the Edge Creation process 3300 is executed by the processor 305 for the buffered segments.

After the process 3500 has been executed at step 1929, the process 1900 proceeds to step 1911. If there are no more segments left at the current point at step 1911, then the process proceeds to step 1931 where if both the left segment and the right_segment buffers are not empty then the process proceeds to step 1933. At step 1933, a new edge is created with the segments pointed to by the left_segment and right_segment buffers. After step 1933, the process of flow chart 1900 proceeds to step 1935 where the horizontal counter (i.e. h_counter) is set to INACTIVE by the processor 305. If both the left_segment and the right_segment buffers are empty at step 1931, then the process of flow chart 1900 proceeds directly to step 1935, the process of flow chart 1900 concludes and proceeds to step 1813 of flow chart 1800.

Figure 23:
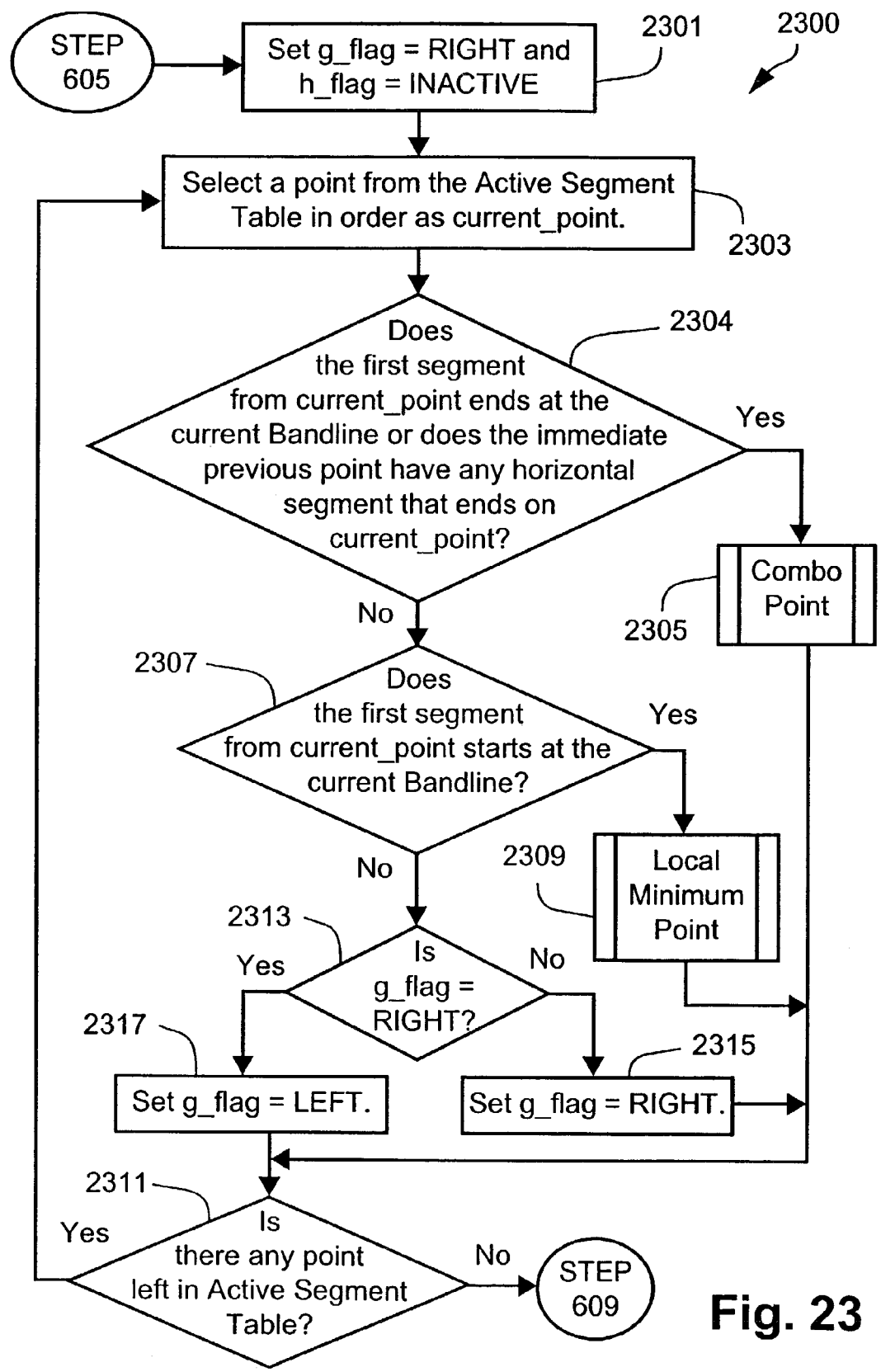
FIG. 23 is a flow chart showing a Segment Assignment and Edge Creation process for creating edges that form a simple outline path for an input path configured with the odd-even winding fill rule.
Figure 24:
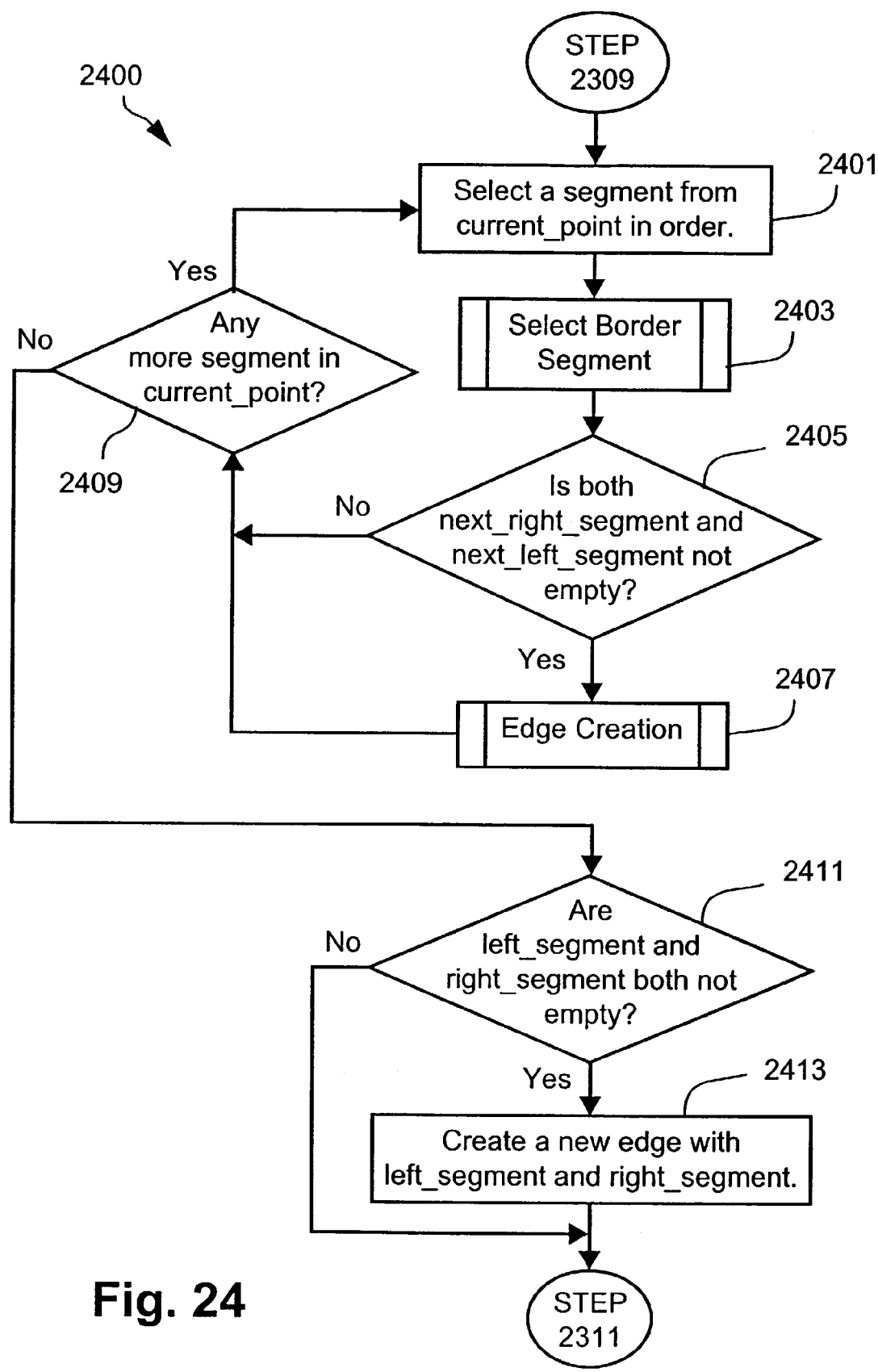
FIG. 24 is a flow chart showing a Local Minimum Point process for processing an input path configured with the odd-even winding fill rule.
Figure 25:
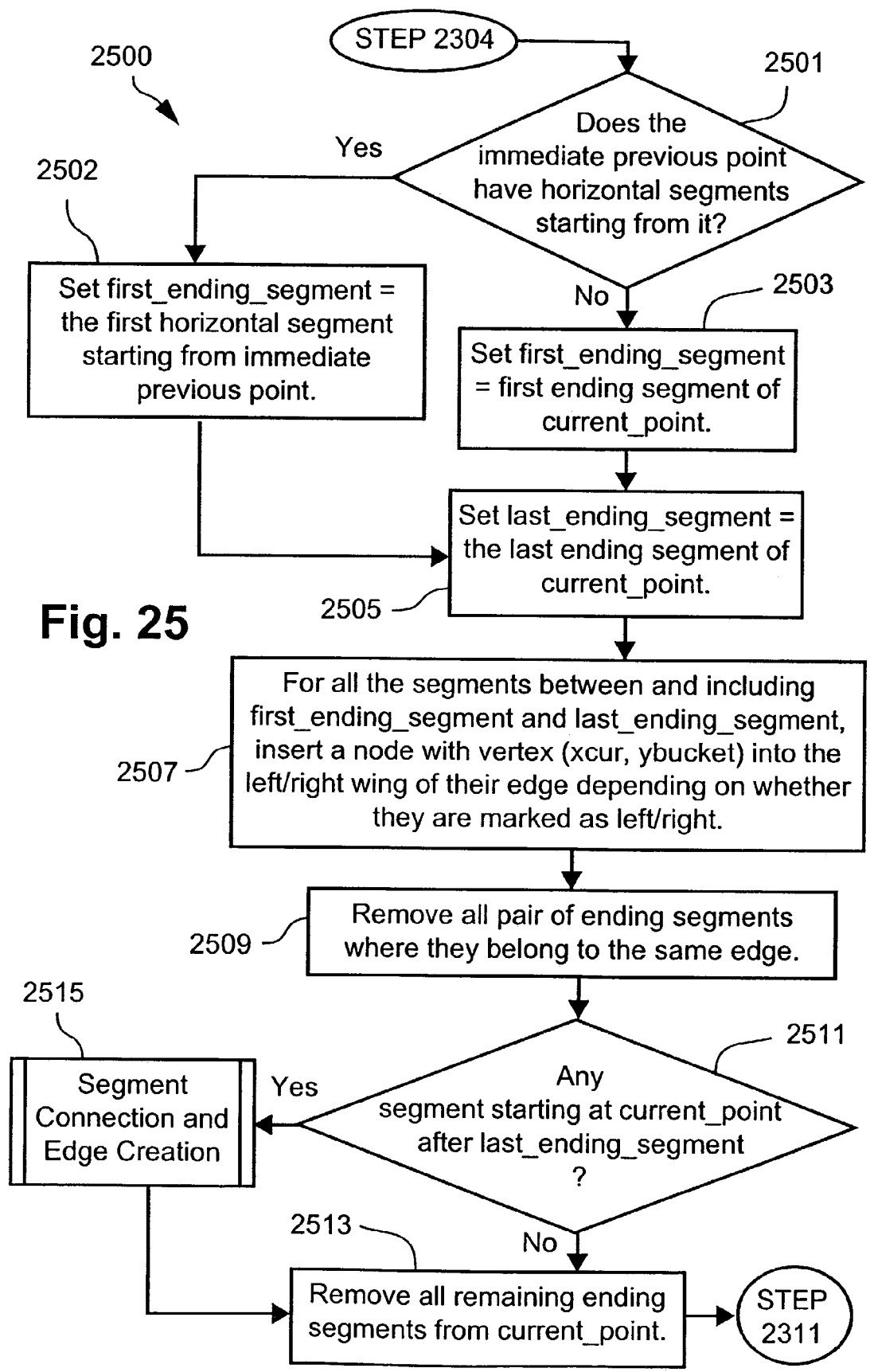
FIG. 25 is a flow chart showing a Combo Point process for processing an input path configured with the odd-even winding fill rule.

FIG. 23 is a flow chart showing a Segment Assignment and Edge Creation 2300 process for creating the edges that form a simple outline path for an input path configured with the odd-even winding fill rule. In contrast to the Segment Assignment and Edge Creation process of flow chart 1800 for paths configured with the non-zero winding rule, every segment of the paths configured with the odd-even winding rule are border segments. Further, a global flag (preferably labelled g_flag) is used in the process of FIG. 23 compared to a global counter (i.e. g_counter) used in the process of flow chart 1800. The global flag is used to classify border segments into left/right segments of an edge and is initialised to RIGHT. The process 2300 is preferably implemented as an application program being resident on the hard disk drive 310 and being read and controlled in its execution by the processor 305.

Figure 21:
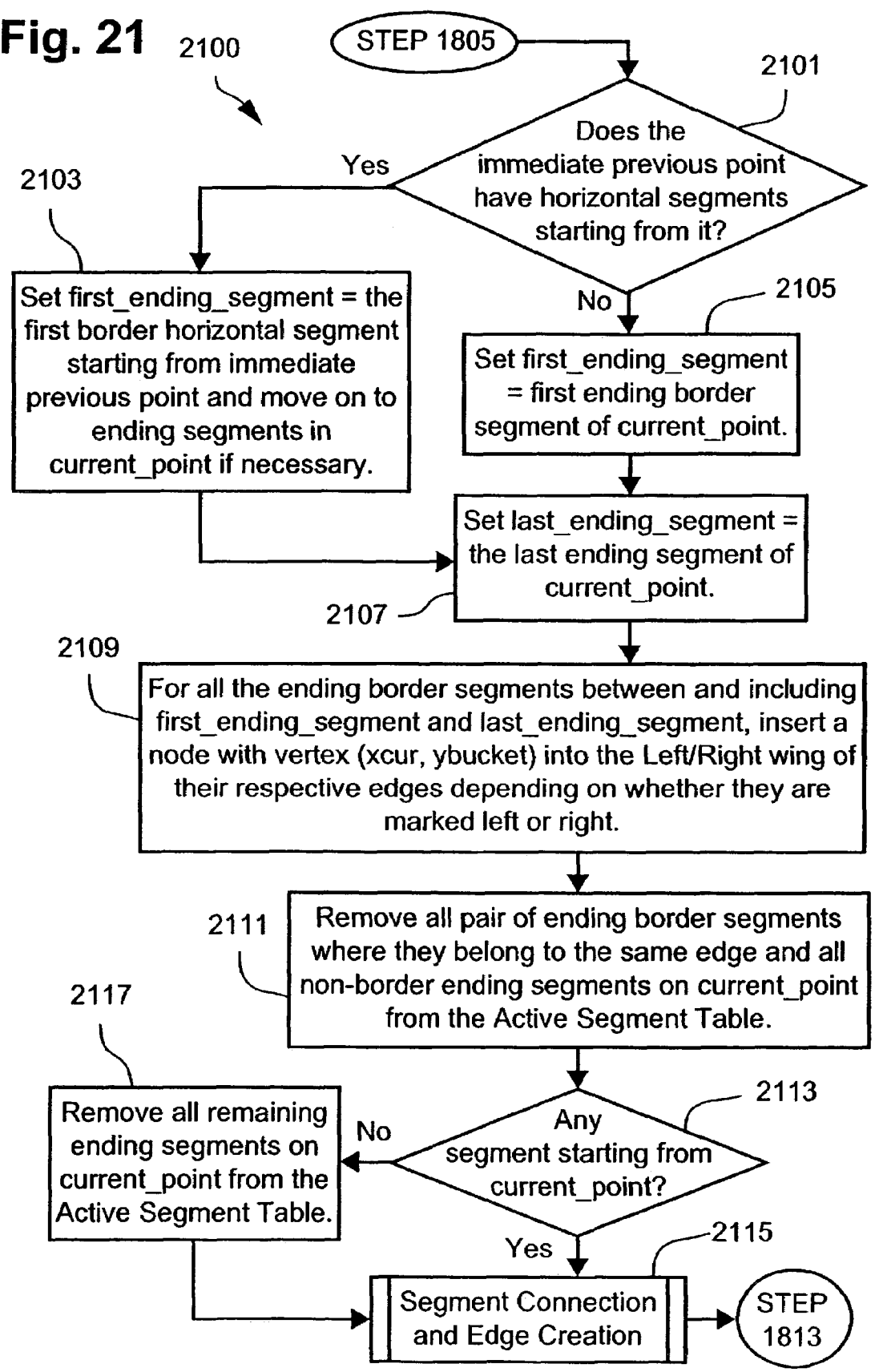
FIG. 21 is a flow chart showing a Combo Point process for processing an input path configured with the non-zero winding fill rule.

The process 2300 begins at step 2301 where a buffer labelled as g_flag stored in memory 306 is initialised to RIGHT. At the next step 2303, a point is selected by the processor 305 from the active segment table. The active segment table is processed point by point from left to right in increasing x-coordinate order. The process 2300 continues at step 2304, where for every point, the first segment at that point is examined by the processor 305 in order to classify the point as a "combo point" or a "local minimum point". The point selected at step 2303 is classified as a combo point if the first segment from the point ends at the current bandline or if the previous point has any horizontal segment that ends on the point selected at step 2303. Again, a single segment that passes through a point is ignored. At the next step 2307, if the first segment from the point selected at step 2303 starts at the current bandline, then the point is classified as a local minimum point and the point is processed by a local minimum point process 2100, as shown in FIG. 21, for an input path configured with the odd-even winding fill rule at the next step 2309 before proceeding to step 2311. Otherwise, the process 2100 proceeds to step 2313, where if the g_flag is set to RIGHT then the process 2300 proceeds to step 2317. At step 2317, the g_flag is set to LEFT. If the g_flag is not set to RIGHT at step 2313, then the process 2300 proceeds to step 2315, where the g_flag is set to RIGHT before the process proceeds to step 2311. The local minimum point process 2300 for an input path configured with the odd-even winding fill rule will now be explained with reference to the flow chart 2100 of FIG. 21.

Figure 36B:
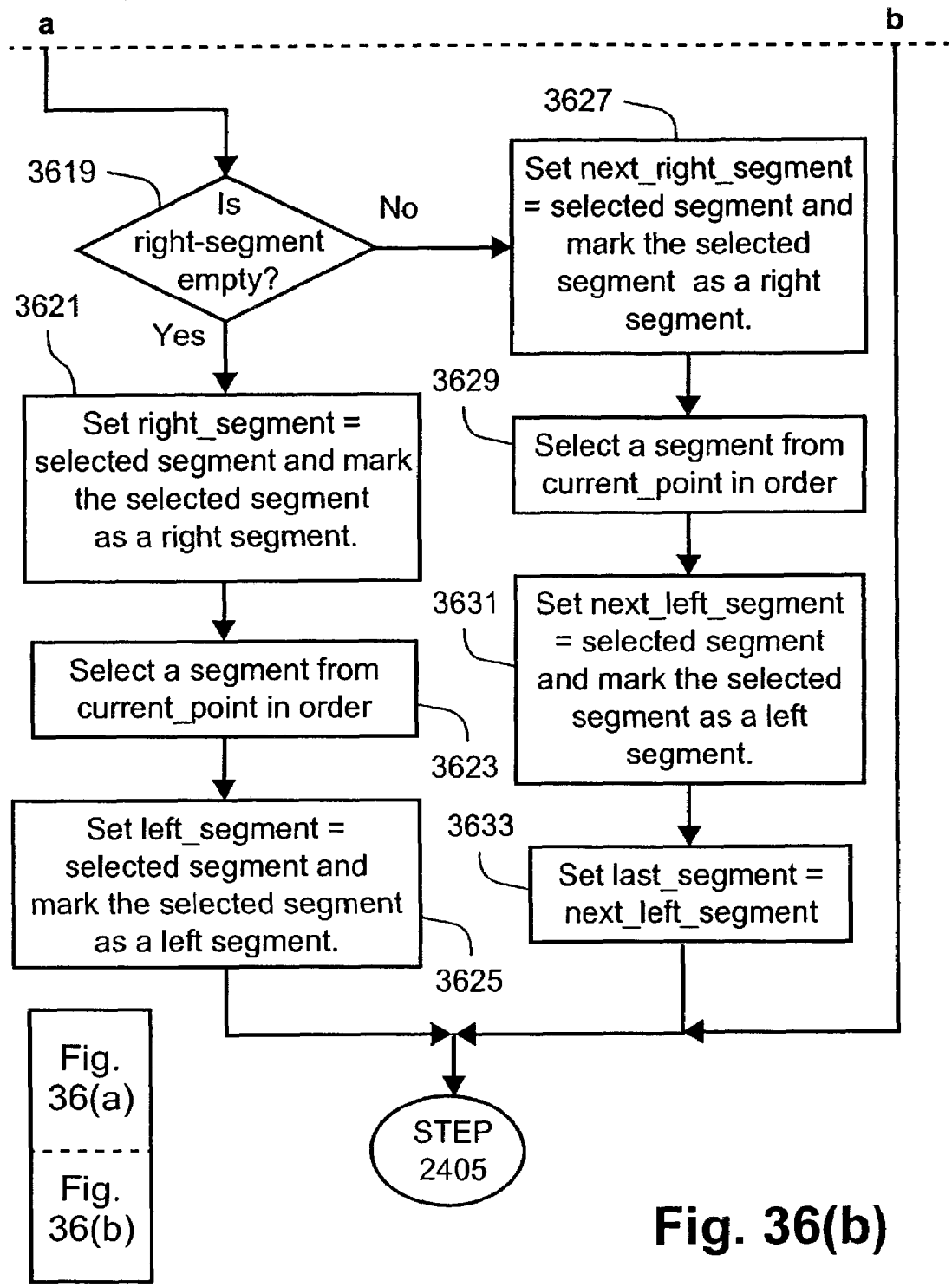
FIG. 36 is a flow chart showing a Select Border Segment process for determining whether a segment is marked as a left or right segment.

For a local minimum point, all segments are new (i.e. all segments start at the current bandline). The global flag (i.e. g_flag) is used to determine whether the first segment is marked as a left or right segment. Subsequent segments are marked by alternating the left/right markings. Each pair of left and right segments for a current point will form an edge in the simple outline path resulting from the methods described herein. The process 2400 begins at step 2401, where a segment is selected by the processor 305 from the current point (i.e. the point selected at step 2303), in order of decreasing leftness. At the next step 2403, a select border segment process 3600, as seen in FIG. 36, is executed for the current point in order to determine whether the first segment is marked as a left or right segment and for marking subsequent segments by alternating the left/right markings. The select border segment process will now be explained with reference to the flow chart 3600 of FIG. 36. The process 3600 is preferably implemented as an application program being resident on the hard disk drive 310 and being read and controlled in its execution by the processor 305.

The process 3600 begins at step 3601, where a test is executed by the processor 305 to determine if the g_flag is set to RIGHT. If the result of step 3601 is true then the process 3600 proceeds to step 3602, where a test is executed to determine if the left_segment buffer is empty. If the result of step 3602 is true, then the process 3600 proceeds to step 3605 where the left_segment buffer is set to contain the segment selected at step 2401 and the selected segment is marked as a left segment. At the next step 3607, the next segment from the current point (i.e. the point selected at step 2303) is selected by the processor 305 in order of decreasing leftness. The process 3600 continues at the next step 3609, where the right_segment buffer is set to contain the segment selected at step 3607, the segment selected at step 3607 is marked as a right segment and the process 3600 concludes and proceeds to step 2405 of the process 2400.

If the result of step 3602 is false then the process 3600 proceeds to step 3611, where the next_left_segment buffer is set to contain the segment selected at point 2101 and the selected segment is marked as a left segment. At the next step 3613, the next segment from the current point (i.e. the point selected at step 2303) is selected by the processor 305 in order of decreasing leftness. The process 3600 continues at the next step 3615, where the next_right_segment buffer is set to contain the segment selected at step 3613, and the segment selected at step 3613 is marked as a right segment. At the next step 3617, the last_segment pointer is set to point to the next_right_segment buffer and the process 3600 concludes and proceeds to step 2405 of the process 2400.

If the result of step 3601 is false then the process 3600 proceeds to step 3619, where a test is executed by the processor 305 to determine if the right_segment buffer is empty. If the result of step 3619 is true, then the process 3600 proceeds to step 3621 where the right_segment buffer is set to contain the segment selected at step 2101 and the selected segment is marked as a right segment. At the next step 3623, the next segment from the current point (i.e. the point selected at step 2303) is selected by the processor 305 in order of decreasing leftness. The process continues at the next step 3625, where the left_segment buffer is set to contain the segment selected at step 3623, the segment at step 3623 is marked as a right segment, and the process 3600 concludes and proceeds to step 2405 of the process 2400.

If the result of step 3619 is false then the process 3600 proceeds to step 3627, where the next_right_segment buffer is set by the processor 305 to contain the segment selected at step 2401 and the selected segment is marked as a right segment. At the next step 3629, the next segment from the current point (i.e. the point selected at step 2303) is selected by the processor 305 in order of decreasing leftness. The process 3600 continues at the next step 3631, where the next_left_segment buffer is set to contain the segment selected at step 3629, and the segment selected at step 3629 is marked as a left segment. At the next step 3633, the last_segment pointer is set to point to the next_left_segment buffer, and the process 3600 concludes and proceeds to step 2405 of flow chart 2405.

Returning to the process 2400, after the process 3400 has been executed for the current point (i.e. current_point) at step 2403, the process 2400 proceeds to step 2405. At step 2405, if both the next_right_segment and the next_left_segment buffers are not empty, then the process 2400 proceeds to step 2407. If the result of step 2405 is false then the process 2400 proceeds directly to step 2409, where a test is executed to determine if there are any more segments at the current point. At step 2407, the edge creation process 3300 is executed by the processor 305 for the current point and the process 2400 proceeds to step 2409. As with paths configured in accordance with the non-zero winding rule, four border segments (i.e. two left and two right segments) are preferably buffered before the process 3500 is executed at step 2407. The process 2400 continues at the next step 2409, where if there are more segments at the current point then the process of flow chart 2400 returns to step 2401. Otherwise the process of flow chart 2400 proceeds to step 2411, where a test is executed to determine if the left_segment and the right_segment are both not empty. If the result of step 2411 is true, then the process proceeds to step 2413, where a new edge is created with the left_segment and the right_segment. Otherwise, the process of flow chart 2400 concludes and proceeds to step 2311 of flow chart 2300.

Returning to the process 2300, if the first segment from the point selected at step 2303, ends at the current bandline or if the previous point has any horizontal segment that ends on the current point at step 2304, then the current point (i.e. current_point) is classified as a combo point and the process 2300 proceeds to step 2305. At step 2305, the combo point process 2500 for an input path configured with the odd-even winding fill rule is executed on the point selected at step 2303. The combo point process 2500 for an input path configured with the odd-even winding fill rule will be explained in the following paragraph with reference to the flow chart of FIG. 25. The process 2300 continues at step 2311, where if there are any more points left in the active segment table stored in memory 306 then the process returns to step 2303. Otherwise, the process 2300 concludes and proceeds to step 609 of the process 600.

The combo point process 2500 is preferably implemented as an application program being resident on the hard disk drive 310 and being read and controlled in its execution by the processor 305. In the combo point process 2500 for an input path configured with the odd-even winding fill rule, the first ending segment (labelled as first_ending segment) and the last ending segment (labelled as last_ending_segment) of the current point are first identified by the processor 305. The first_ending_segment buffer will contain the first horizontal segment that starts from the immediate previous point and ends on the current point if a horizontal segment exists. New vertices are inserted into each respective edge of each segment between and including the first_ending_segment and the last_ending_segment, closed edges (i.e. symbolised by the right and left segment of the edge ending on the current point) are identified and the segments of the closed edges are removed from the current point. The process 2500 begins at step 2501, where a test is executed to determine if the previous point has a horizontal segment starting from it. If the result of step 2501 is true, then the process proceed to step 2502, where the first_ending_segment buffer is set to contain the first horizontal segment starting from the previous point and the process 2500 proceeds to step 2505. Otherwise, the process 2500 proceeds to step 2503 where the first_ending_segment buffer is set to contain the first ending segment of the current point. The process 2500 continues at step 2505 where the last_ending_segment buffer is set to contain the last ending segment of the point selected at step 2303. At the next step 2507, for all of the segments between and including the segments of the first_ending_segment and the last_ending_segment buffers, a node with a vertex defined by the point ($x_{cur}$, $y_{bucket}$) is inserted into the left/right wing of the edges for all segments between the first and the last segment depending on whether the respective segment is marked as left or right. The process 2500 continues at step 2509 where each pair of ending segments which belong to the same edge are removed by the processor 305.

At the next step 2511 of the process 2500, a test is executed by the processor 305 to determine if any segment starts at the current point after the last_ending_segment. If the result of step 2511 is false, then the process 2500 proceeds directly to step 2513 where all remaining ending segments are removed from the current point, and the process 2500 concludes and proceeds to step 2311 of the process 2300. Otherwise, the process 2500 proceeds to step 2515 where a connecting segment and edge creation process is executed on the current segment and the process of flow chart 2500 then proceeds to step 2513. The connecting segment and edge creation process 2600 is executed by the processor 305 on any segment starting from the current point after the last_ending_segment.

Figure 26:
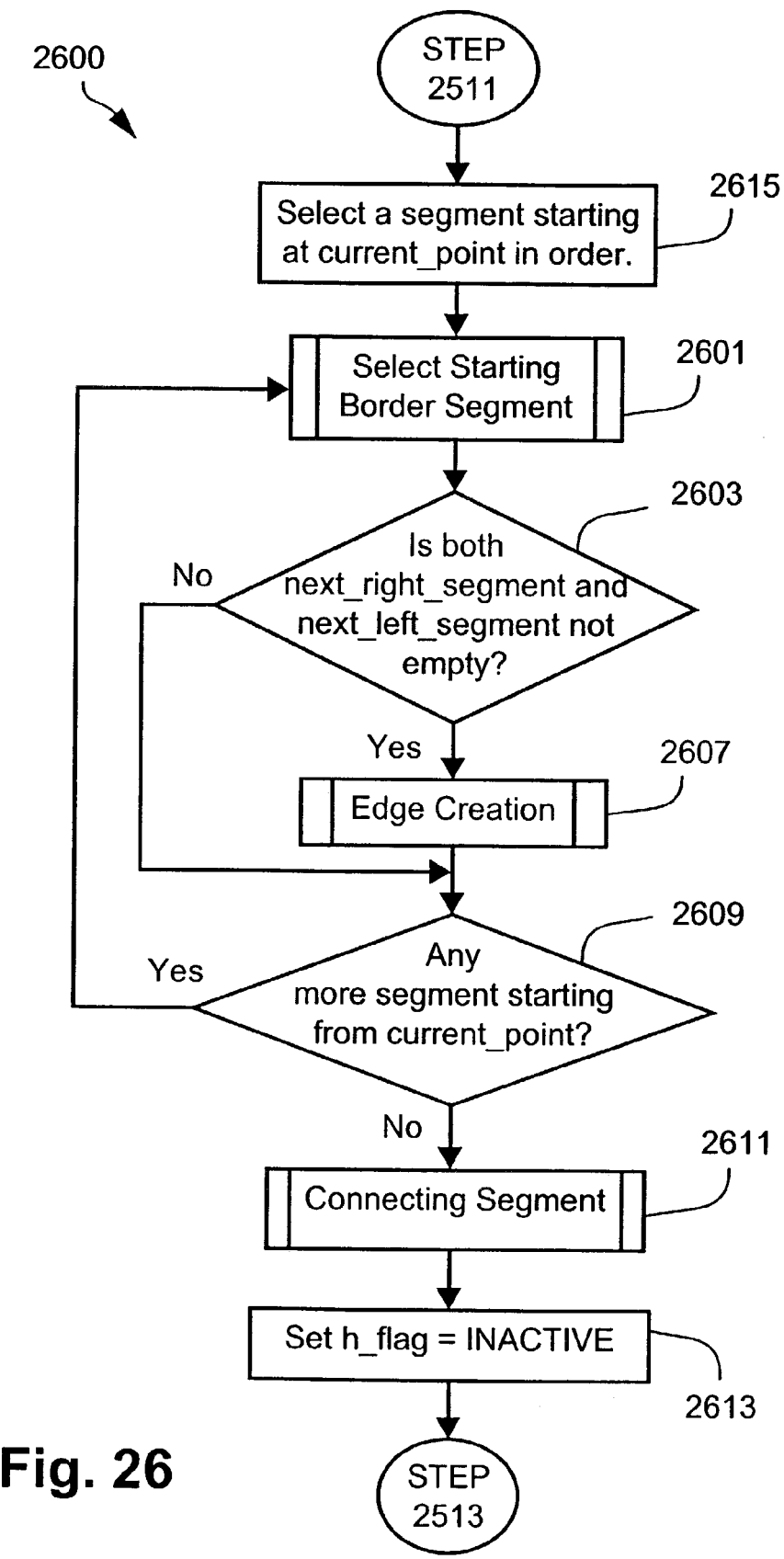
FIG. 26 is a flow chart showing a Connecting Segment and Edge Creation process for creating edges.

FIG. 26 is a flow chart showing the Segment Connection and Edge Creation process 2600. The process 2600 is preferably implemented as an application program being resident on the hard disk drive 310 and being read and controlled in its execution by the processor 305. The process 2600 begins at step 2615, where a segment starting at the current point (i.e. current_point) is selected by the processor 305. At the next step 2601, a select starting border segment process 2700 is executed by the processor 305 on the segment selected at step 2615. The select starting border segment process 2700 processes any segment starting from the current point after the last_ending_segment and classifies these segments into left or right border segments. The select starting border segment process will be explained in further detail in the following paragraph with reference to the flow chart 2700 of FIG. 27. At the next step 2603 of the process 2600, if both the next_right_segment and the next_left_segment buffers are not empty, then the process 2600 proceeds to step 2607. If the result of step 2603 is false then the process 2600 proceeds directly to step 2609, where a test is executed by the processor 305 to determine if there are any more segments at the current point. At step 2607, the edge creation process 3500 is executed by the processor for the current point and the process proceeds to step 2609. As with paths configured in accordance with the non-zero winding rule, four border segments (i.e. two left and two right segments) are preferably buffered in memory 306 before the process 3600 is executed at step 2607. The process 2600 continues at step 2609, where if there are more segments at the current point then the process returns to step 2601. Otherwise the process 2600 proceeds to step 2611, where the connecting segment process 3300 is executed for the current point to connect any left over segments to the first_ending_segment, similar to the process 2200. At the next step 2613, the h_flag is set to INACTIVE and the process 2600 concludes.

Figure 27B:
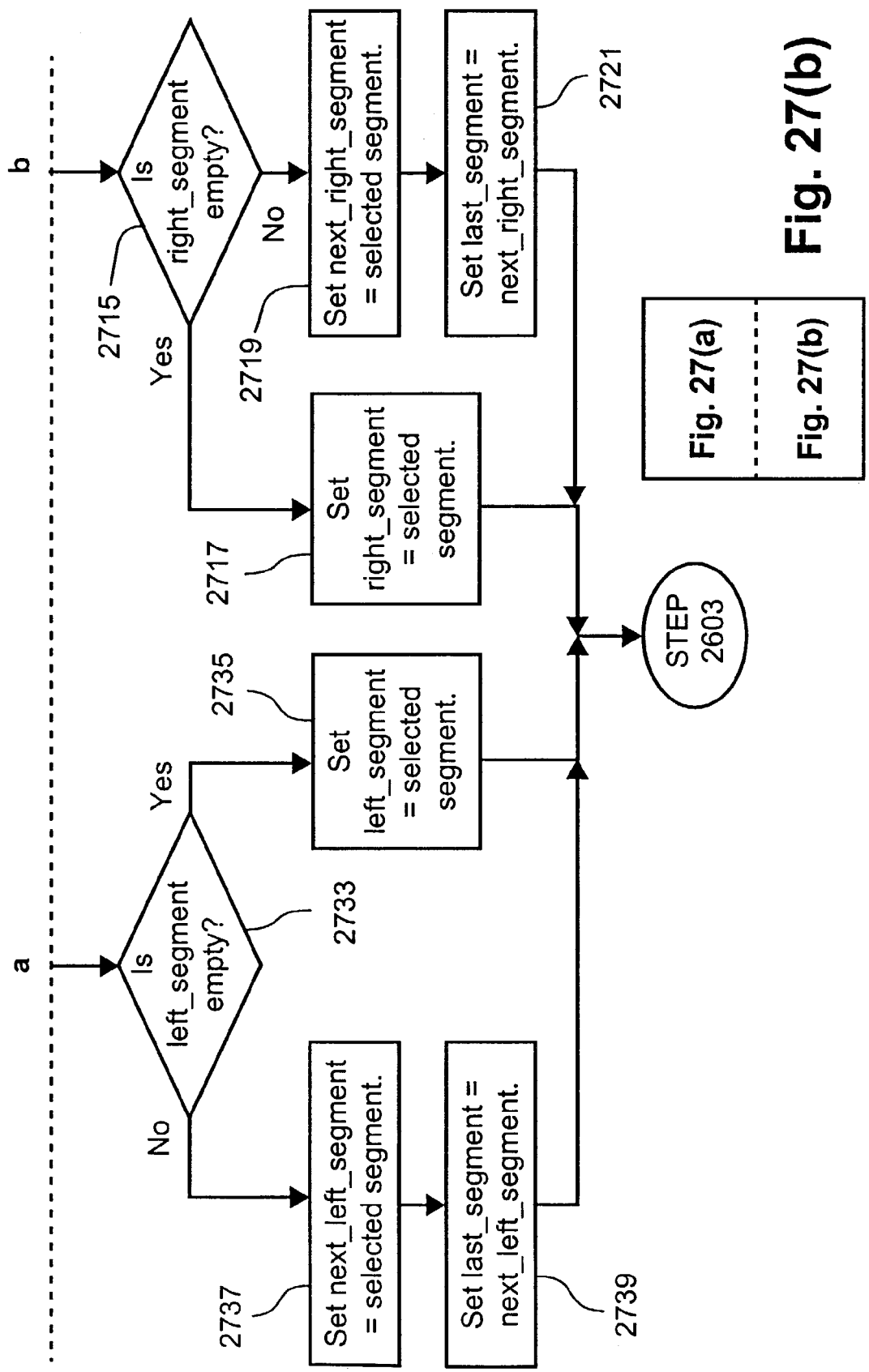
FIG. 27 is a flow chart showing a Select Starting Border Segment process for classifying any segment starting from a point after a last ending segment.

FIG. 27 is a flow chart showing the select starting border segment process 2700 which processes any segment starting from the current point after the last ending segment and classifies these segments into left or right border segments. The process 2700 is preferably implemented as an application program being resident on the hard disk drive 310 and being read and controlled in its execution by the processor 305. The process 2700 begins at step 2701, where if the current segment selected at step 2201 is a horizontal segment, then the process proceeds to step 2702. At step 2702, if the horizontal flag (i.e. h_flag) is set to INACTIVE then the process proceeds to step 2703, where the h_flag is set by the processor 305 to be equal to the g_flag. If the horizontal flag is ACTIVE at step 2702, then the process proceeds to step 2705. At step 2705, if the h_flag is set to RIGHT, then the process 2700 proceeds to step 2707 where the current segment is marked as a left segment. At the next step 2709, the h_flag is set to RIGHT. Alternatively, if the h_flag is not set to RIGHT at step 2705, then the process 2700 proceeds to step 2711 where the selected segment is marked as a right segment. At the next step 2713, the h_flag is set to RIGHT.

After step 2713, the process 2700 proceeds to step 2715. At step 2715 if the right_segment buffer is empty, then the process 2700 proceeds to 2717 where the right_segment buffer is set by the processor 305 to contain the current segment (i.e. the segment selected at step 2201). Alternatively, if the right_segment buffer is not empty, then the process 2700 proceeds to 2719 where the next_right_segment buffer is set to contain the selected segment. At the next step 2721, the last_segment pointer is set to point to the next_right_segment buffer. After step 2721, the process 2700 concludes and proceeds to step 2603 of the process 2600.

If the current segment selected at step 2601 is not a horizontal segment at step 2701, then the process 2700 proceeds to step 2723. At step 2723, if the global flag (i.e. g_flag) is set to RIGHT then the process proceeds to step 2725, where the current segment is marked as a left segment by the processor 305. At the next step 2727, the g_counter is set to LEFT. If the global flag is not set to RIGHT at step 2723, then the process 2700 proceeds to step 2729, where the current segment is marked as a right segment. At the next step 2731, the g_counter is set to RIGHT in the process 2700 proceeds to step 2715.

After step 2727, the process 2700 proceeds to step 2733, where if the left_segment buffer is empty, then the left_segment buffer is set to contain the current segment at the next step 2735. After step 2735, the process 2700 concludes and proceeds to step 2603 of the flow chart 2600. If the left_segment buffer is not empty at step 2733, then the next_left_segment buffer is set to contain the current segment at the next step 2737. At the next step 2739, the last_segment pointer is set to point to the next_left_segment buffer. After step 2739, the process 2700 concludes and proceeds to step 2603 of the process 2600.

Returning to the process 600 of FIG. 6(a), after the segment assignment and edge creation process 2300 has been executed on the current bucket at step 607, the process 600 proceeds to step 609. At step 609, an intersection detection process is executed for the current bucket. In this regard, intersection of two or more segments can only occur in an area between the upper and lower bandline of a current bucket. All intersection points are a result of two segments crossing each other. Intersection points where more than two segments cross each other are regarded as a plurality of intersection points one on top of each other (i.e. coincident intersection points).

Intersection points are processed in the order of their occurrence in time. An intersection occurs earlier than another intersection if:
 (i) the y-position of the earlier intersection point is smaller (i.e. closer to the first bandline of the space in which the path is defined) and/or
 (ii) the intersection point is detected first (i.e. if the intersection point is exactly the same).

Figure 28A:
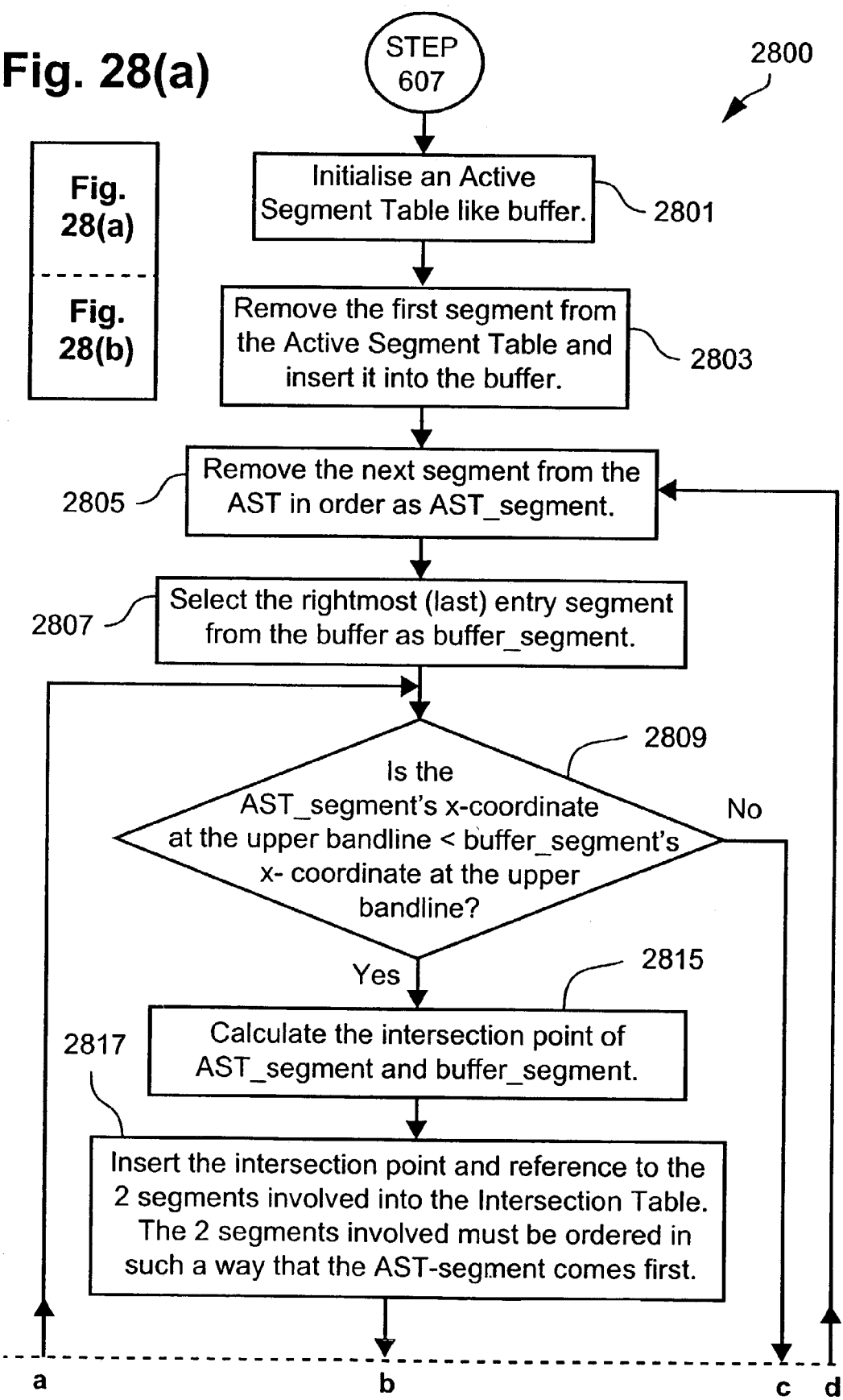
FIG. 28 is a flow chart showing an Intersection Detection process for detecting intersecting segments.
Figure 28B:
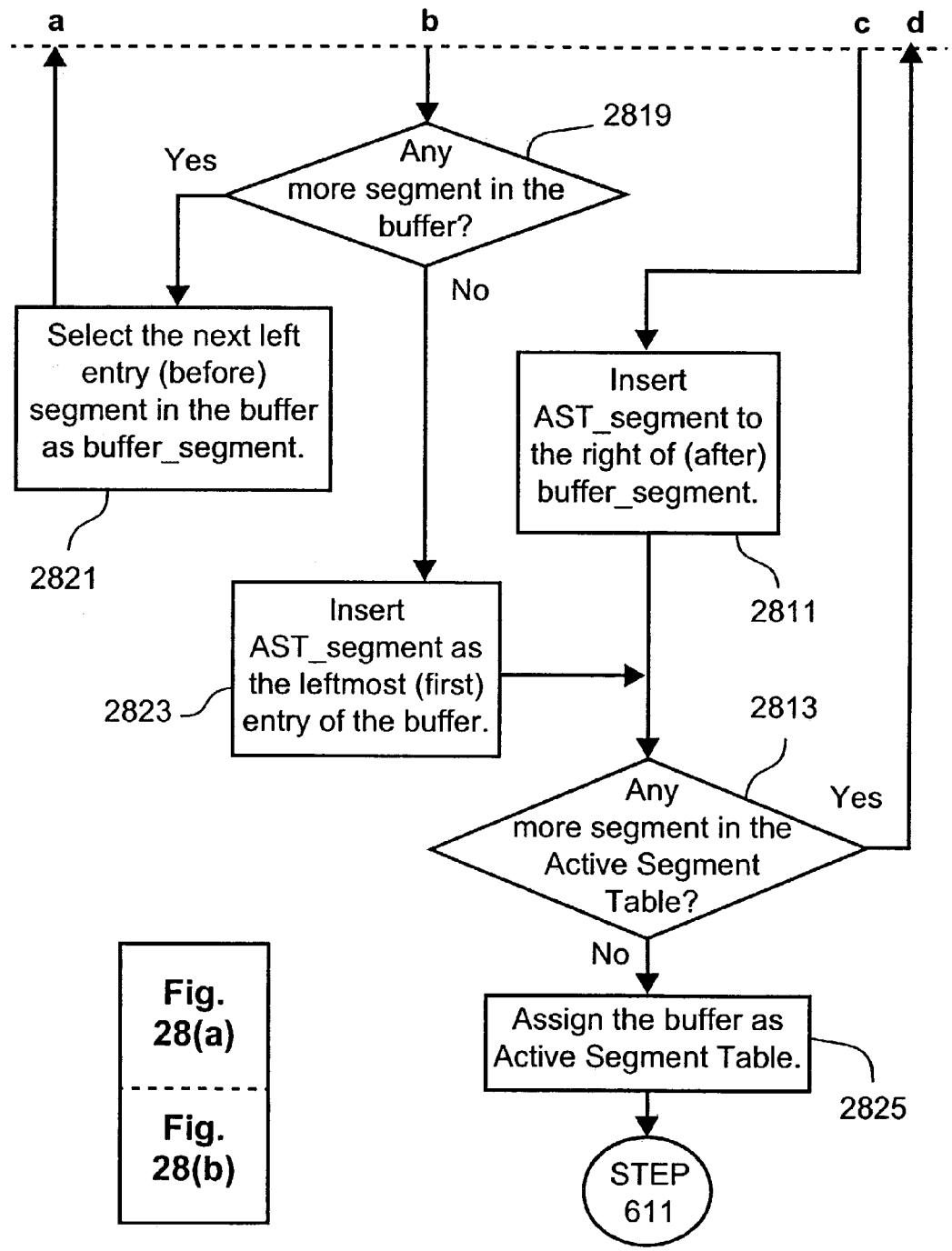

FIG. 28 is a flow chart showing the intersection detection process 2800 for detecting intersecting segments. The process 2800 is preferably implemented as an application program being resident on the hard disk drive 310 and being read and controlled in its execution by the processor 305. The process 2800 begins at step 2801, where a buffer configured similarly to the active segment table is initialised with the first segment from the active segment table. In the following steps 2803 to 2825 of the process 2800, the remaining segments are removed from the active segment table one at a time to perform a comparison of the x-coordinate at the upper bandline with those of the segments in the buffer. The comparison starts from the right most (i.e. last) segment of the buffer. The segment removed from the active segment table intersects the segment in the buffer if the x-coordinate of removed segment at the upper bandline is smaller than the x-coordinate of the segment in the buffer. The comparison finishes when a segment removed from the active segment table no longer intersects the segment in the buffer and the removed segment is inserted to the right of (i.e. after) the segment in the buffer that it did not intersect.

At step 2805, a segment is removed from the active segment table and inserted into the buffer by the processor 305. The process continues at the next step 2805, where the next segment is removed from the active segment table in order of decreasing leftness and is preferably assigned the label AST_segment. At the next step 2807, the right most (i.e. last) entry segment of the buffer is selected by the processor 305 and is preferably assigned the label buffer_segment. The process 2800 continues at step 2809, where if the x-coordinate of the AST_segment at the upper bandline is less than the x-coordinate of the buffer_segment at the upper bandline, then the process 2800 proceeds to step 2815. Otherwise, the process 2800 proceeds to step 2811 where the AST_segment is inserted by the processor 305 to the right of (i.e. after) the buffer_segment. At the next step 2813, if there are any more segments in the active segment table then the process 2800 returns to step 2805. Otherwise, the process 2800 proceeds to step 2825.

At step 2815, the intersection point of the segments contained in the AST_segment buffer and the buffer_segment buffer is calculated by using any known calculation method. The process 2800 continues at the next step 2817, where the intersection point and a reference to both of the AST_segment buffer and the buffer_segment buffer are inserted into an intersection table (IT). The intersection point and the reference in the intersection table must be sorted due to the requirement to process intersection points in the manner described above. The AST_segment and buffer_segment must be ordered in the intersection table such that the segment removed from the active segment table comes first (i.e. the left most segment after the intersection point comes first). At the next step 2819, if there are more segments in the buffer, then the process 2800 proceeds to step 2821 where the next left entry segment in the buffer is selected by the processor 305 and assigned as the buffer segment. Otherwise, the process 2800 proceeds to step 2823 where the AST segment is inserted by the processor 305 as the left most entry of the buffer. The process 2800 then returns to step 2813. At step 2825, the buffer is assigned as the active segment table (i.e. the buffer replaces the AST).

Returning to the process 600 of FIG. 6(*a*), after the intersection detection process 2800 has been executed on the current bucket at step 609, the process 600 proceeds to step 611. At step 611, an intersection processing process 2900 is executed by the processor 305 on the segments of the current bucket whereby segments that belong to edges are swapped or new edges are created. In the intersection processing process 2900, intersections for paths configured using the odd-even winding fill rule and paths configured using the non-zero winding rule, are processed differently.

Figure 29A:
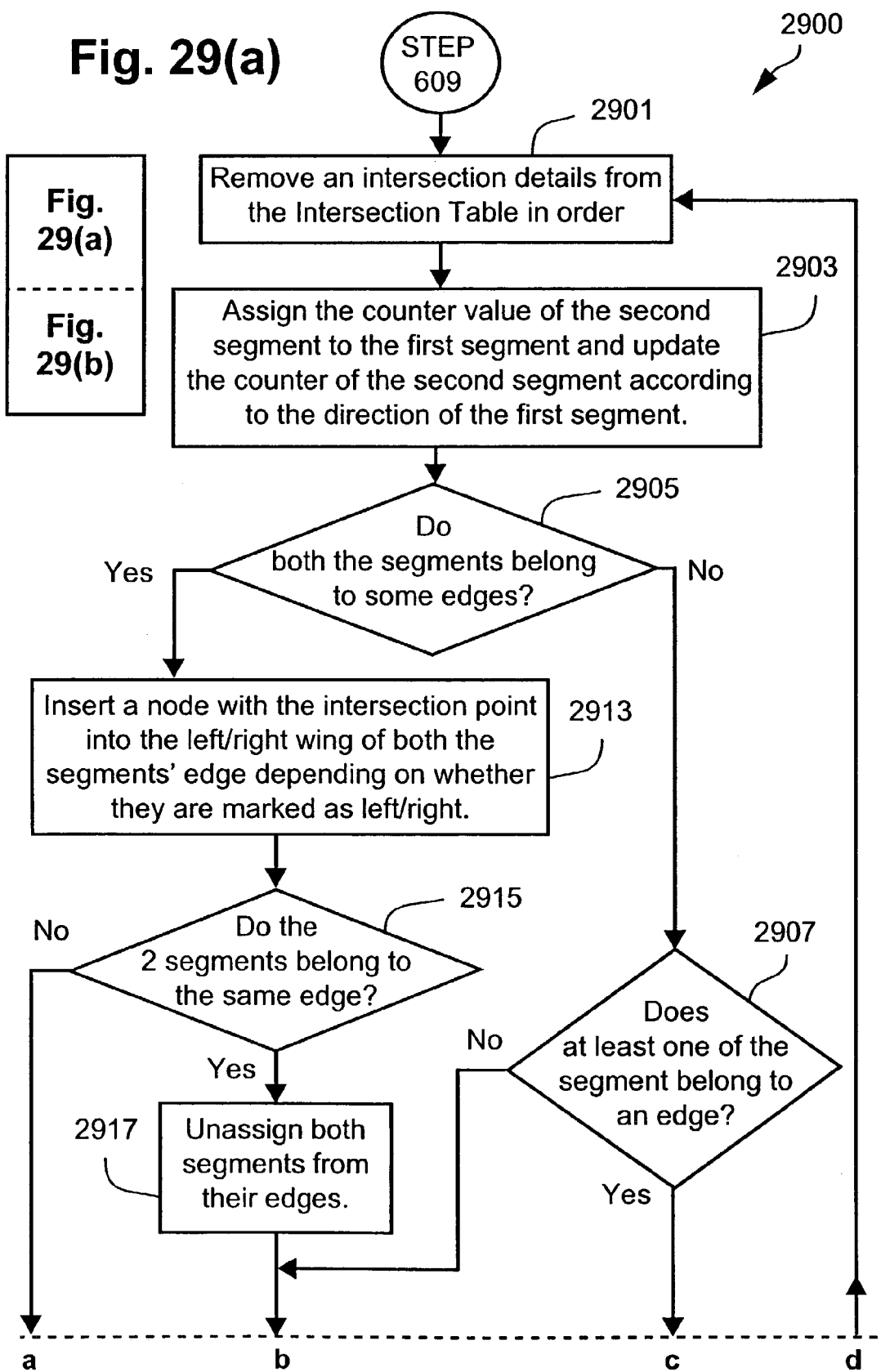
FIG. 29 is a flow chart showing an Intersection Processing process for input paths configured using the non-zero winding fill rule.
Figure 29B:
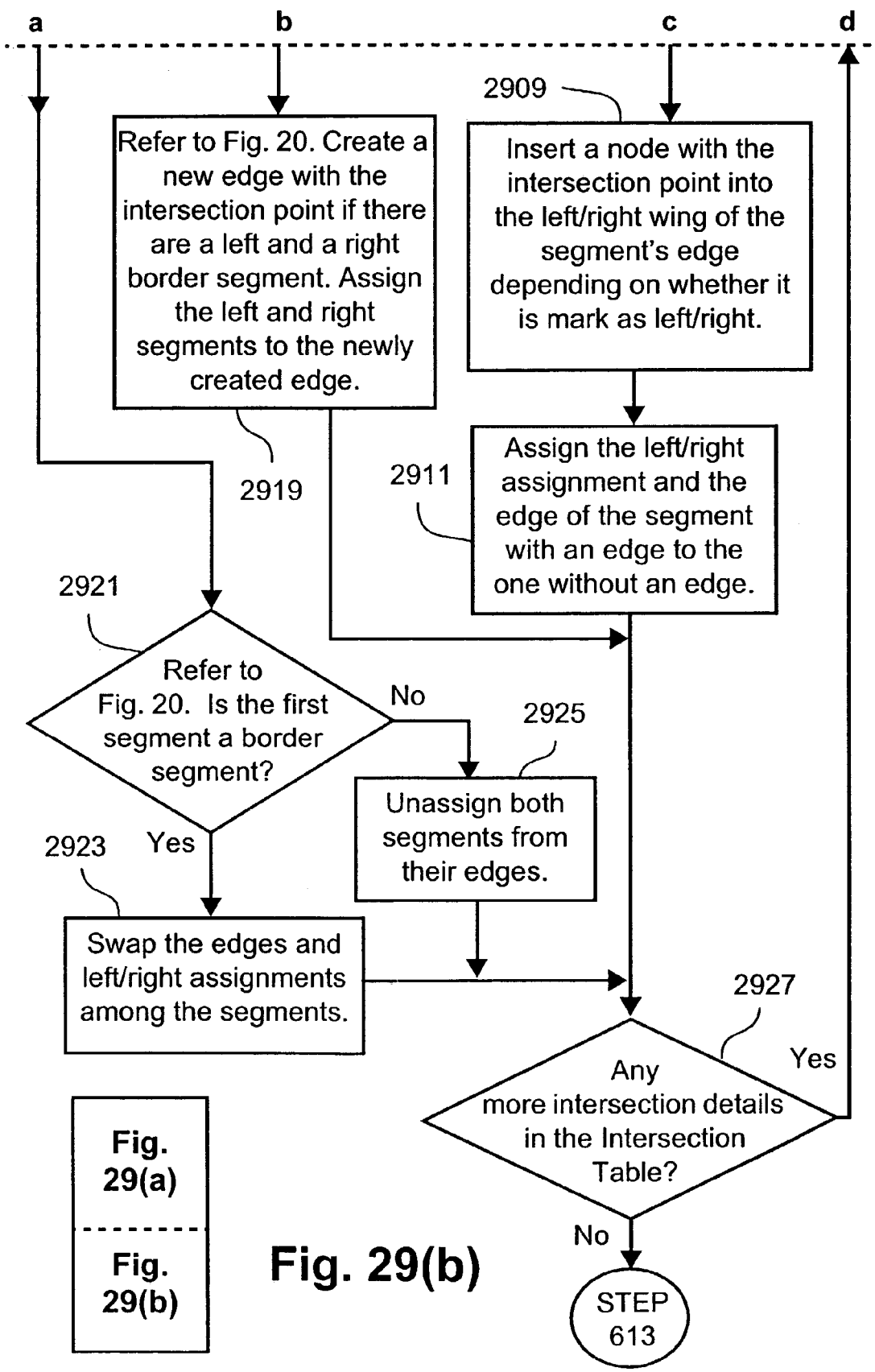

FIG. 29 is a flow chart 2900 showing the intersection processing process 2900 for input paths configured using the non-zero winding fill rule. The process 2900 is preferably implemented as an application program being resident on the hard disk drive 310 and being read and controlled in its execution by the processor 305. Intersections are processed one at a time. The process 2900 begins at step 2901, where intersection details for the current band are removed from the intersection table stored in memory 306 in the order that the intersection details were sorted in the intersection table. As discussed above, the intersection details include the intersection point and a reference to the segments that intersect at the intersection point. At the next step 2903, the counter values associated with the intersecting segments are updated whereby the first intersecting segment (i.e. the left most segment after the intersection point) inherits the counter value of the counter associated with the second intersecting segment. Thus, the value of the counter associated with the second intersecting segment is assigned to the first intersecting segment. Further, the counter associated with the second intersecting segment is updated according to the direction of the first segment.

At steps 2913 to 2925 of the process 2900, if both the intersecting segments belong to edges, then new vertices are created by the processor 305 for both of the respective edges. Further, if both of the intersecting segments belong to the same edge then the assignment of the segments to the edge is removed and a new edge is created out of the intersecting segments. Otherwise, the corresponding edges of the intersecting segments and their left/right assignments are interchanged if the first intersecting segment is a border segment while both of the intersecting segments are unassigned from their respective edges if the first intersecting segment is a non-border segment.

The process 2900 continues at step 2905, where if both of the first and second segments belong to edges, then the process proceeds to step 2913. At step 2913, a node with the intersection point is inserted by the processor 305 into the left/right wing of both of the edges associated with the intersecting segment depending on whether the segments are marked as left or right. At the next step 2915, if the first and second intersecting segments belong to the same edge then the process proceeds to step 2917. At step 2917, both the first and second intersecting segments are unassigned from the respective edge. The process 2900 continues at step 2919, where a new edge starting from the intersection point is created by the processor 305 if there is a left and a right border segment. Further, the left and right segments are assigned to the newly created edge, and the process 2900 proceeds to step 2927.

If the first and second intersecting segments do not belong to the same edge at step 2915, then the process 2900 proceeds to step 2921, where a test is executed by the processor to determine if the first segment is a border segment. As discussed above with reference to FIG. 17, the first segment is a border segment depending on both the direction of the segment and the value of the counter associated with the segment. If the first segment is a border segment at step 2921, then the process 2900 proceeds to step 2923 where the edges associated with each of the first and second segments are interchanged along with the left/right assignments of the segments. Otherwise, the process 2900 proceeds to step 2925 where both the first and second segments are unassigned from their respective edges. The process 2900 then proceeds to step 2927, where if there are any more intersection details in the intersection table then the process 2900 returns to step 2901.

If both of the first and second intersecting segments do not belong to edges at step 2905, then the process 2900 proceeds to step 2907. At step 2907, if neither of the intersecting segments belong to an edge then the process 2900 proceeds directly to step 2919, where a new edge is created out of the intersecting segments depending upon whether the intersecting segments are border segments. If at least one of the segments belongs to an edge at step 2907, then the process 2900 proceeds to steps 2909 and 2911 as shown in FIG. 29. At steps 2909 and 2911, the edge assignments and the left/right assignments of the particular intersecting segment belonging to an edge, are assigned to the intersecting segment that does not belong to an edge. Also, at step 2909, a new vertex is inserted in the edge by the processor 305. The new vertex takes the value of the intersection point. The process 2900 concludes at step 2927 when there are no more intersection details in the intersection table, and proceeds to step 613 of the process 600.

Figure 46A:
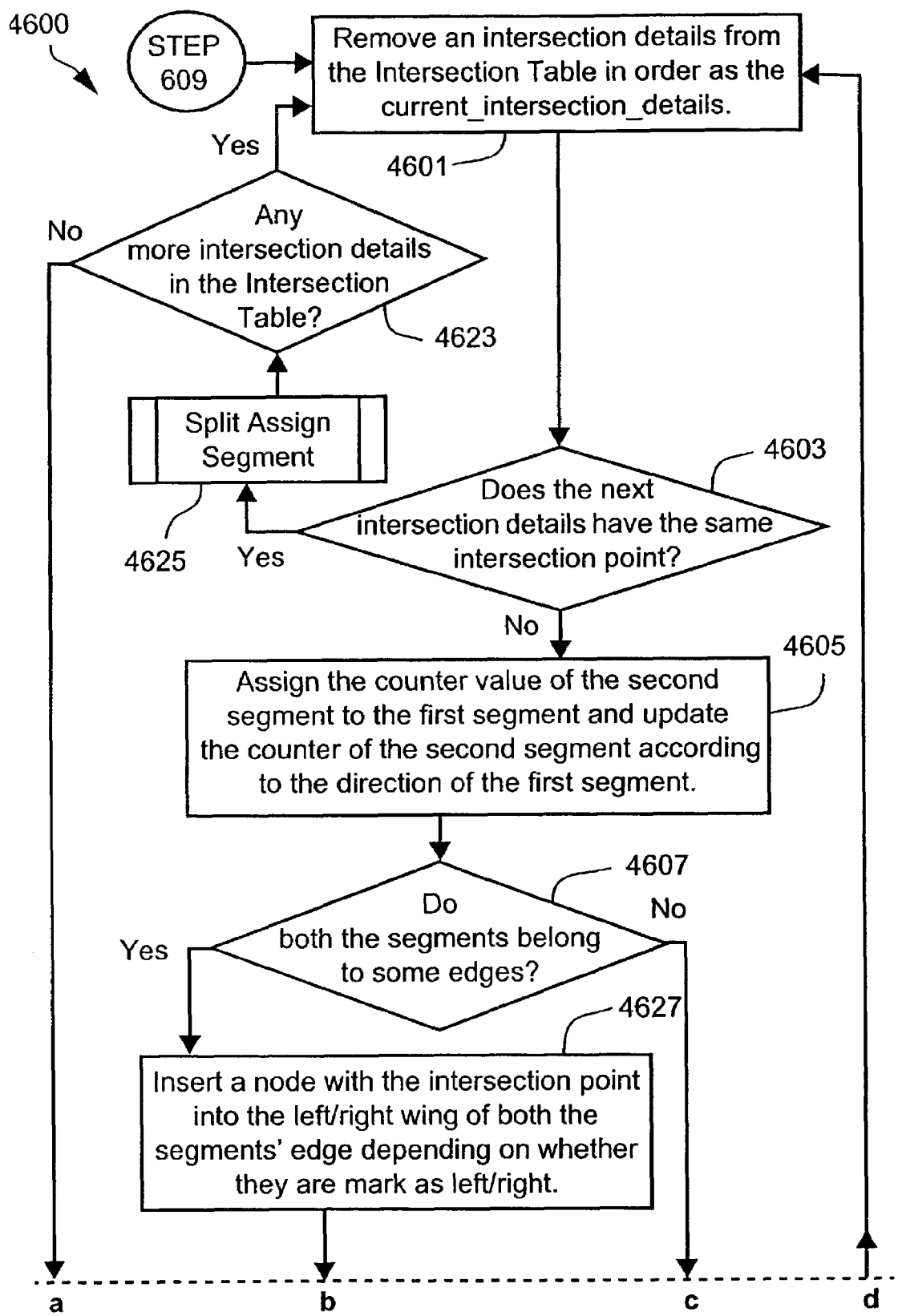
FIGS. 46(*a*), (*b*) and (*c*) show a flow chart illustrating a further Intersection Processing process for input paths configured using the non-zero winding fill rule.
Figure 46B:
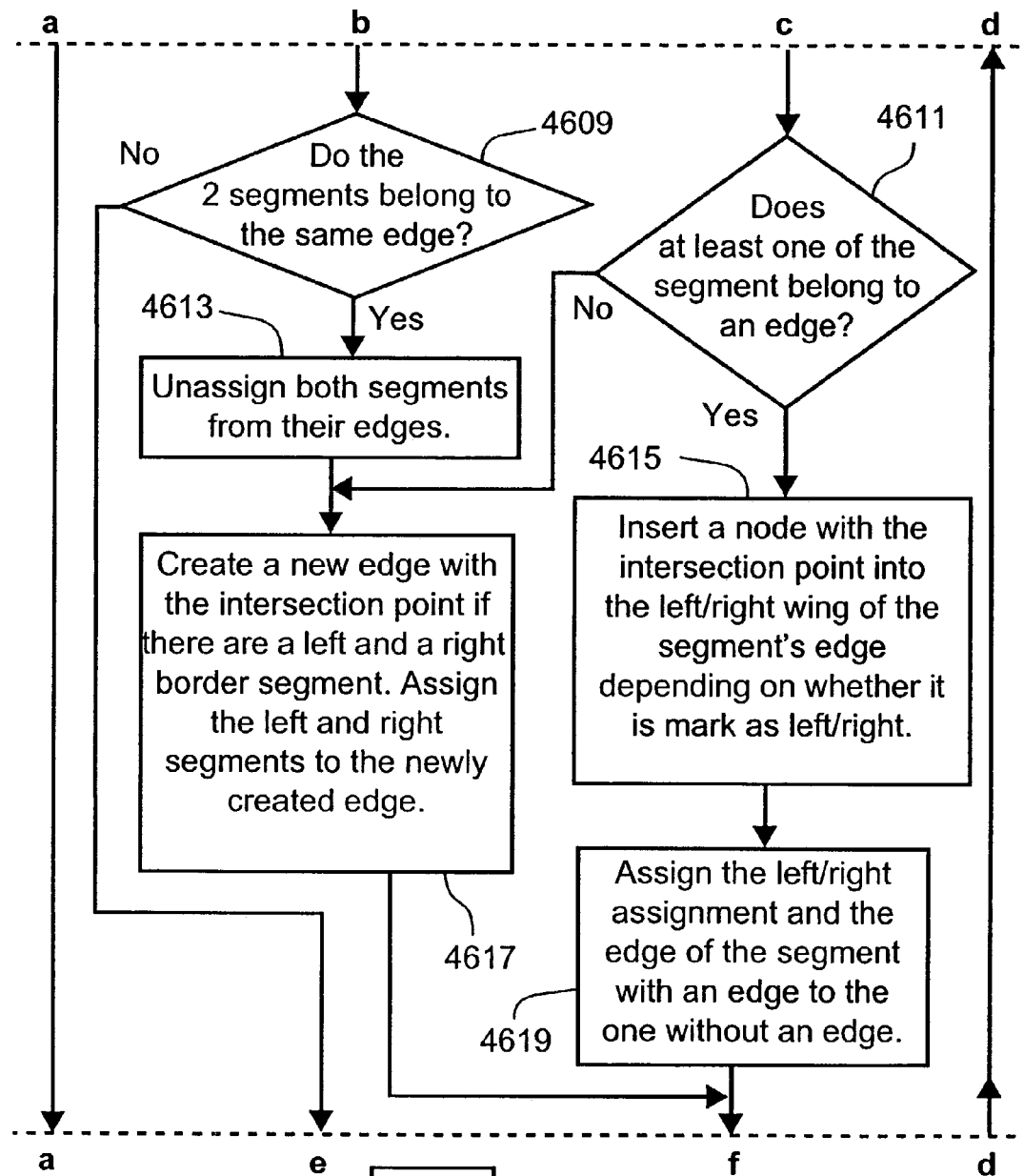
Figure 46C:
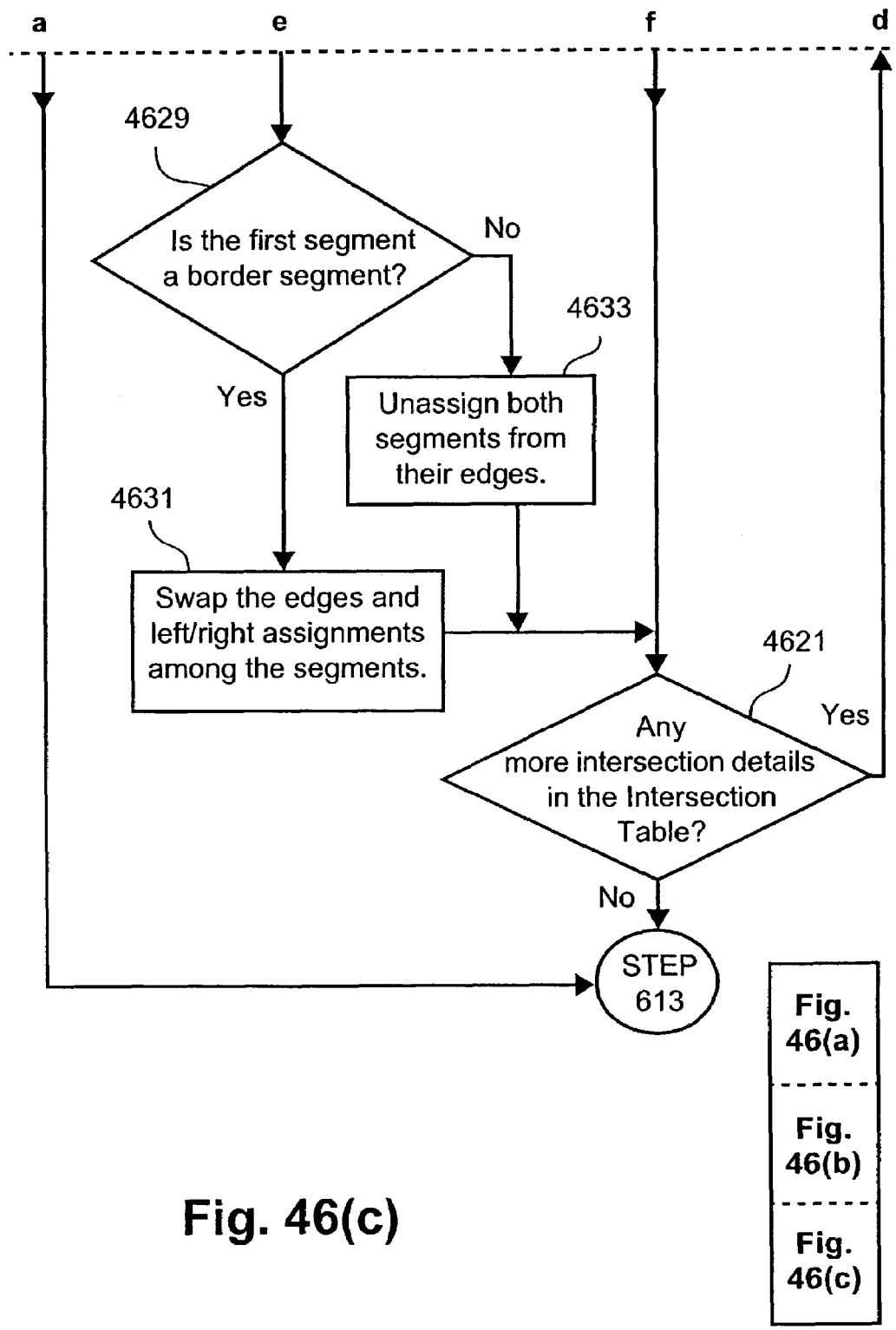

FIGS. 46(*a*), (*b*) and (*c*) show a flow chart illustrating a further Intersection Processing process 4600 for input paths configured using the non-zero winding fill rule. The main difference of the process 4600 from the process 2900 described above is the manner in which intersection points involving more than two segments are handled. In the process 4600, all segments that cross an intersection point where more than two segments intersect are first split. Then all starting border segments are connected to ending border segments whenever possible. For those segments that are left over (i.e. starting border segments which are not connected to any ending border segments), new edges are created. Prior to splitting, all segments are assumed to be held in a suitable buffer in their existing order.

The process 4600 treats an intersection point involving more than two segments as a combo point. However, priority is given to connecting any left over border segments to the first ending border segment before attempting to create new edges out of starting border segments. The steps of the process 4600 are preferably implemented as software resident on the hard disk drive 310 and being read and controlled in their execution by the processor 305.

Figure 47:
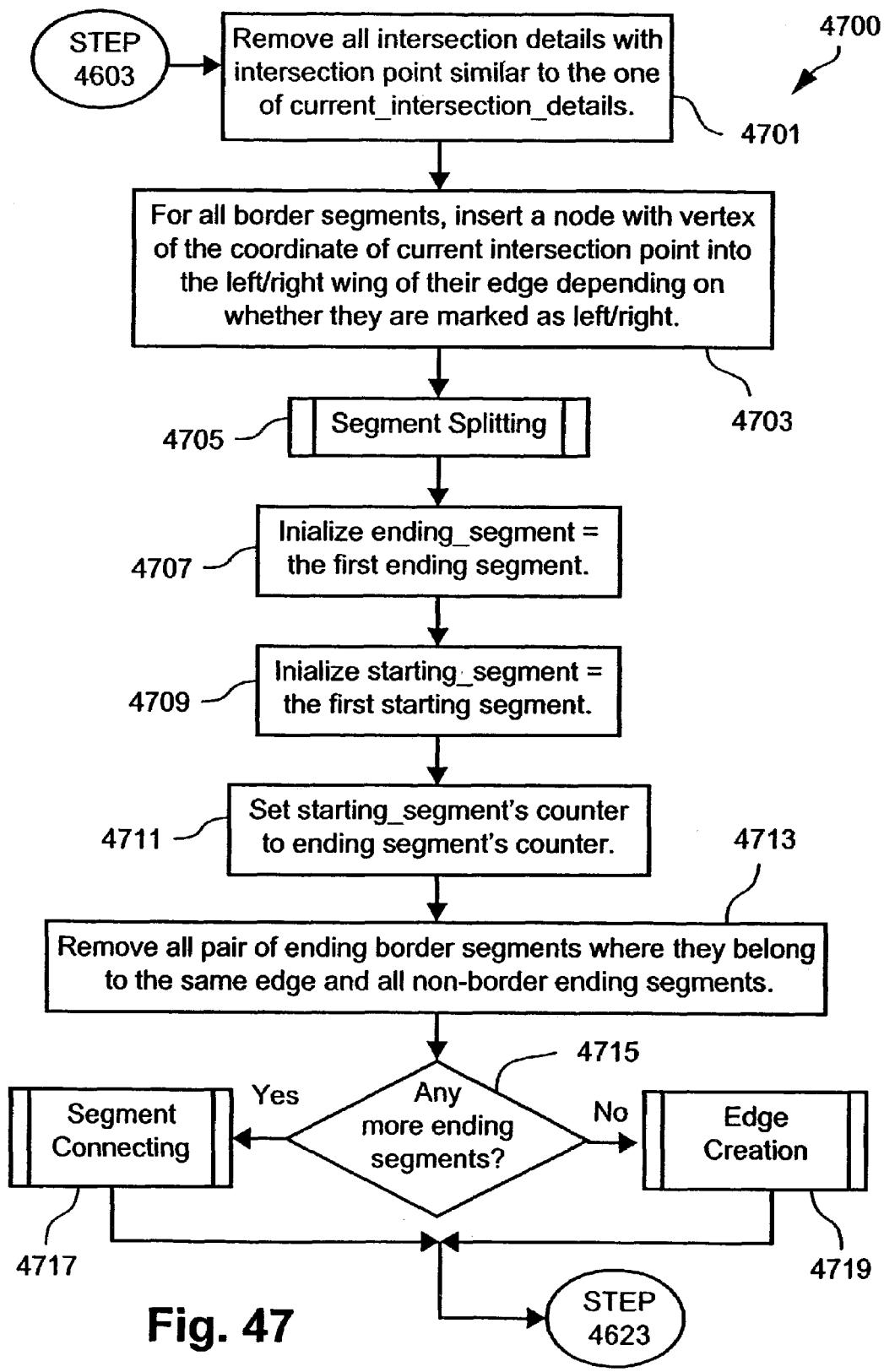
FIG. 47 is a flow chart showing a Split Assign Segment process performed during the process of FIGS. 46(*a*), (*b*) and (*c*)

The process 4600 begins at step 4601, where intersection details for the current band are removed from the IT in the order that the intersection details were sorted in the IT, and are preferably assigned the label current_intersection_details. As discussed above, the intersection details include the intersection point and a reference to the segments which intersect at the intersection point. At the next step 4603, if the intersection details have the same intersection point then the process 4600 proceeds to step 4625. At step 4625, a Split Assign Segment process 4700, as seen in FIG. 47, is performed for the current intersection point. The Split Assign Segment process 4700 will be explained in more detail below with reference to the flow chart of FIG. 47. If there are any more intersection details in the IT at step 4623, then the process 4600 returns to step 4601. Otherwise, there are no more intersection details in the IT (ie. Intersection Table), and the process 4600 proceeds to step 613 of the method 600. Then at the next step 4605, the counter values associated with the intersecting segments are updated whereby the first intersecting segment (ie. the left most segment after the intersection point) inherits the counter value of the counter associated with the second intersecting segment. Thus, the value of the counter associated with the second intersecting segment is assigned to the first intersecting segment. Further, the counter associated with the second intersecting segment is updated according to the direction of the first segment. The process 4600 continues at step 4607 where if both of the first and second intersecting segments belong to edges, then the process 4600 proceeds to step 4627. Otherwise, the process 4600 proceeds to step 4611. At step 4627, a node with the intersection point is inserted into the left/right wing of both of the edges associated with the intersecting segments depending on whether the segments are marked as left or right. At the next step 4609, if the first and second intersecting segments belong to the same edge then the process 4600 proceeds to step 4613. At step 4613, both the first and second intersecting segments are unassigned from their respective edges. The process continues at step 4617, where a new edge starting from the intersection point is created if there is a left and a right border segment. Further, the left and right segments are assigned to the newly created edge, and the process 4600 proceeds to step 4621.

If the first and second intersecting segments do not belong to the same edge at step 4609, then the process 4600 proceeds to step 4629, where a test is performed to determine if the first segment is a border segment. As discussed above with reference to FIG. 20, the first segment is a border segment depending on both the direction of the segment and the value of the counter associated with the segment. If the first segment is a border segment at step 4629, then the process 4600 proceeds to step 4631 where the edges associated with each of the first and second segments are interchanged along with the left/right assignments of the segments. Otherwise, the process 4600 proceeds to step 4633 where both the first and second segments are unassigned from their respective edges. The process 4600 then proceeds to step 4621, where if there are any more intersection details in the IT then the process 4600 returns to step 4601.

If both of the first and second intersecting segments do not belong to edges at step 4607, then the process 4600 proceeds to step 4611. At step 4611, if neither of the intersecting segments belong to an edge then the process 4600 proceeds directly to step 4617, where a new edge is created out of the intersecting segments depending upon whether the intersecting segments are border segments. If at least one of the segments belongs to an edge at step 4611, the process 4600 proceeds to steps 4615 and 4619 as shown in FIG. 46. At steps 4615 and 4619, the edge assignments and the left/right assignments of the particular intersecting segment belonging to an edge, are assigned to the intersecting segment that does not belong to an edge. Also, at step 4615, a new vertex is inserted in the edge. The new vertex takes the value of the intersection point. The process 4600 concludes at step 4621 if there are no more intersection details in the IT (ie. Intersection Table), and the process 4600 proceeds to step 613 of the method 600.

Figure 48:
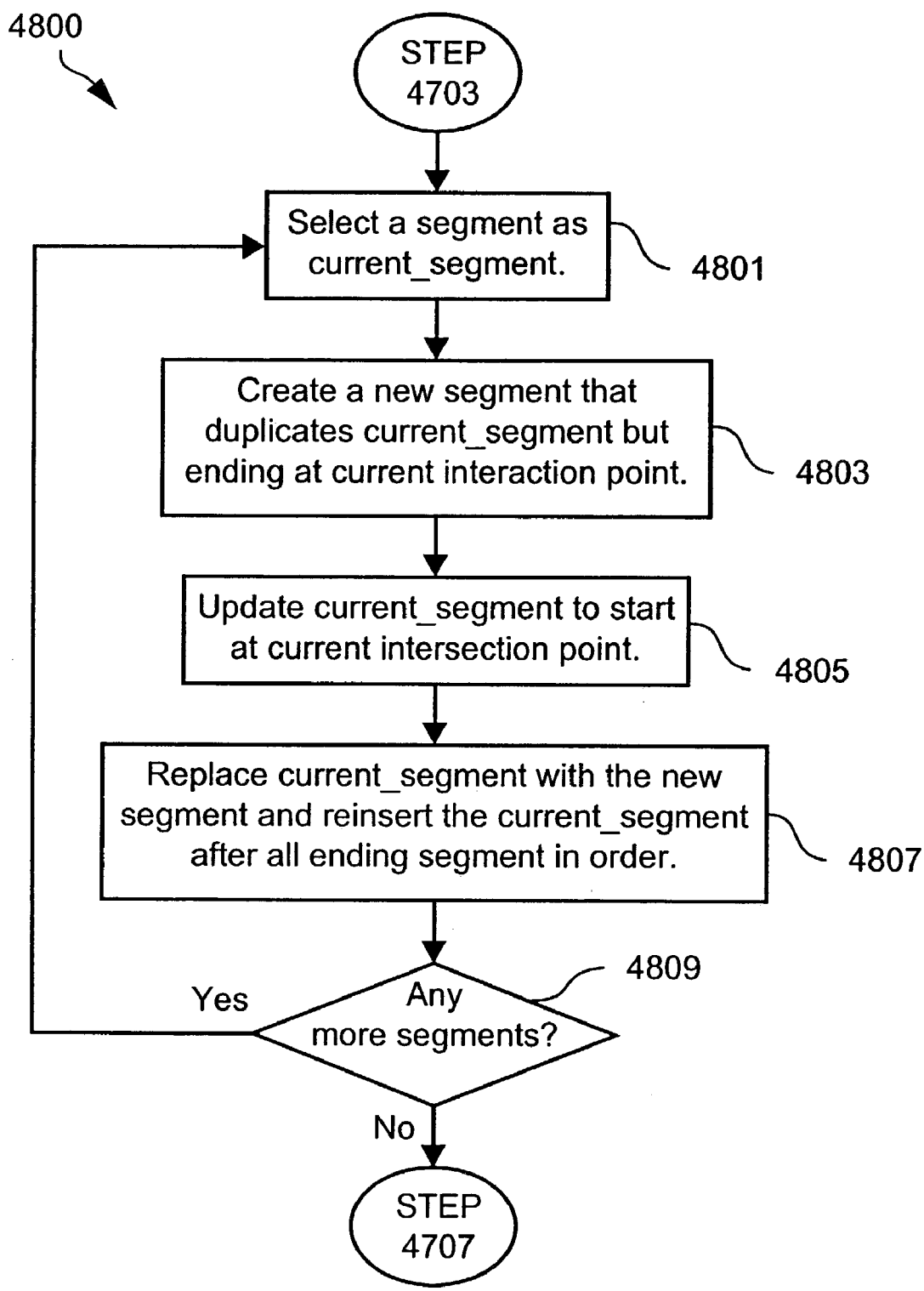
FIG. 48 is flow chart showing a Segment Splitting process performed during the process of FIGS. 46(*a*), (*b*) and (*c*)
Figure 49:
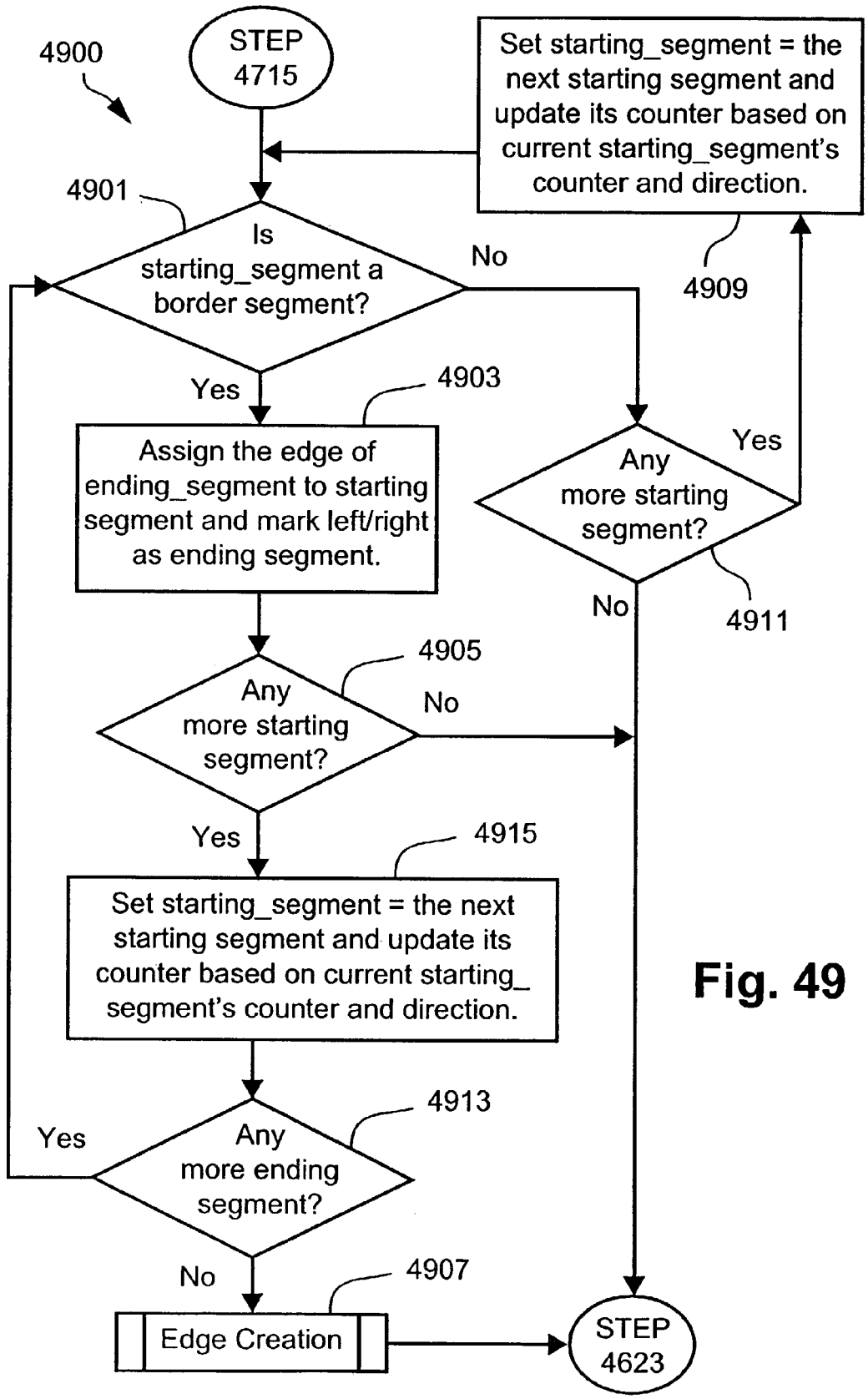
FIG. 49 is flow chart showing a Segment Connecting process performed during the process of FIGS. 46(*a*), (*b*) and (*c*)

The steps of the process 4700 are preferably implemented as software resident on the hard disk drive 310 and being read and controlled in their execution by the processor 305. The process 4700 begins at step 4701 where intersection details for the intersecting segments having an intersection point similar to the one represented by the label current_intersection_details are removed from the IT. Then at the next step 4703, a node with the intersection point is inserted into the left/right wing of both of the edges associated with the first and second intersecting segments depending on whether the segments are marked as left or right. At the next step 4705, a Segment Splitting process 4800, as seen in FIG. 48, is performed for the current point to separate the ending and starting segments on the intersection point. The Segment Splitting process 4800 will be explained below with reference to the flow chart of FIG. 48. Similarly to the processes described above, the steps of the process 4800 are preferably implemented as software resident on the hard disk drive 310 and being read and controlled in their execution by the processor 305. At the next 4707 of the process 4700, a buffer ending_segment is initialised to the first ending segment represented by the intersection details. The process 4700 continues the next step 4709 where a buffer starting_segment is initialised to the first starting segment represented by the intersection details. Then at the next step 4711 a counter associated with the starting_segment is set to the value of a counter associated with the ending_segment. The process 4700 continues at the next 4713, where all border segments belonging to the same edge and all non-border segments are removed. At the next step 4715, if there are any more unprocessed ending segments at the current intersection point then the process 4700 proceeds to 4717 where a Segment Connecting process 4900 is performed for the current point whereby for each border segment starting from the current point, new edges are created. The Segment Connecting process 4900 will be explained below with reference to the flow chart of FIG. 49. The steps of the process 3900 are preferably implemented as software resident on the hard disk drive 310 and being read and controlled in their execution by the processor 305.

If there are no more unprocessed ending segments at the current point at step 4715, then the process 4700 proceeds to 4719 where an Edge Creation process 5000 is performed for the current intersection point whereby for each border segment starting from the current intersection point, new edges are created. The Edge Creation process 4000 will be explained in further detail below with reference to FIG. 50. The steps of the process 5000 are preferably implemented as software resident on the hard disk drive 310 and being read and controlled in their execution by the processor 305.

The process 4800 begins at step 4801, where a first border segment is selected as the current_segment. Then at the next step 4803, a new segment that duplicates the segment in the current_segment buffer but which ends at the current intersection point, is created. The process 4800 continues at the next step 4805, where the current_segment buffer is updated to start at the current intersection point. At the next step 4807, the segment indicated by the current_segment buffer is replaced with the newly created segment and the current_segment is reinserted after all ending segments, in order. If there are any more border segments represented by the intersection details, at the next step 4809, then the process 4800 returns to step 4801. Otherwise, the process 4800 concludes and proceeds to step 4707 of the process 4700.

The process 4900 begins at step 4901 where if the segment indicated by the buffer starting_segment is a border segment then the process 4900 proceeds to step 4903. Otherwise, the process 4900 proceeds to step 4911. At step 4903, the edge of the segment indicated by the buffer ending_segment is assigned to the starting segment represented by the buffer starting_segment. Also at step 4903, the starting segment is marked as left or right depending on the ending segment. Then at the next step 4905, if there are any more segments at the current intersection point then the process 4900 proceeds to step 4915. Otherwise the process 4900 proceeds directly to step 4623 of the process 4600.

Figure 50:
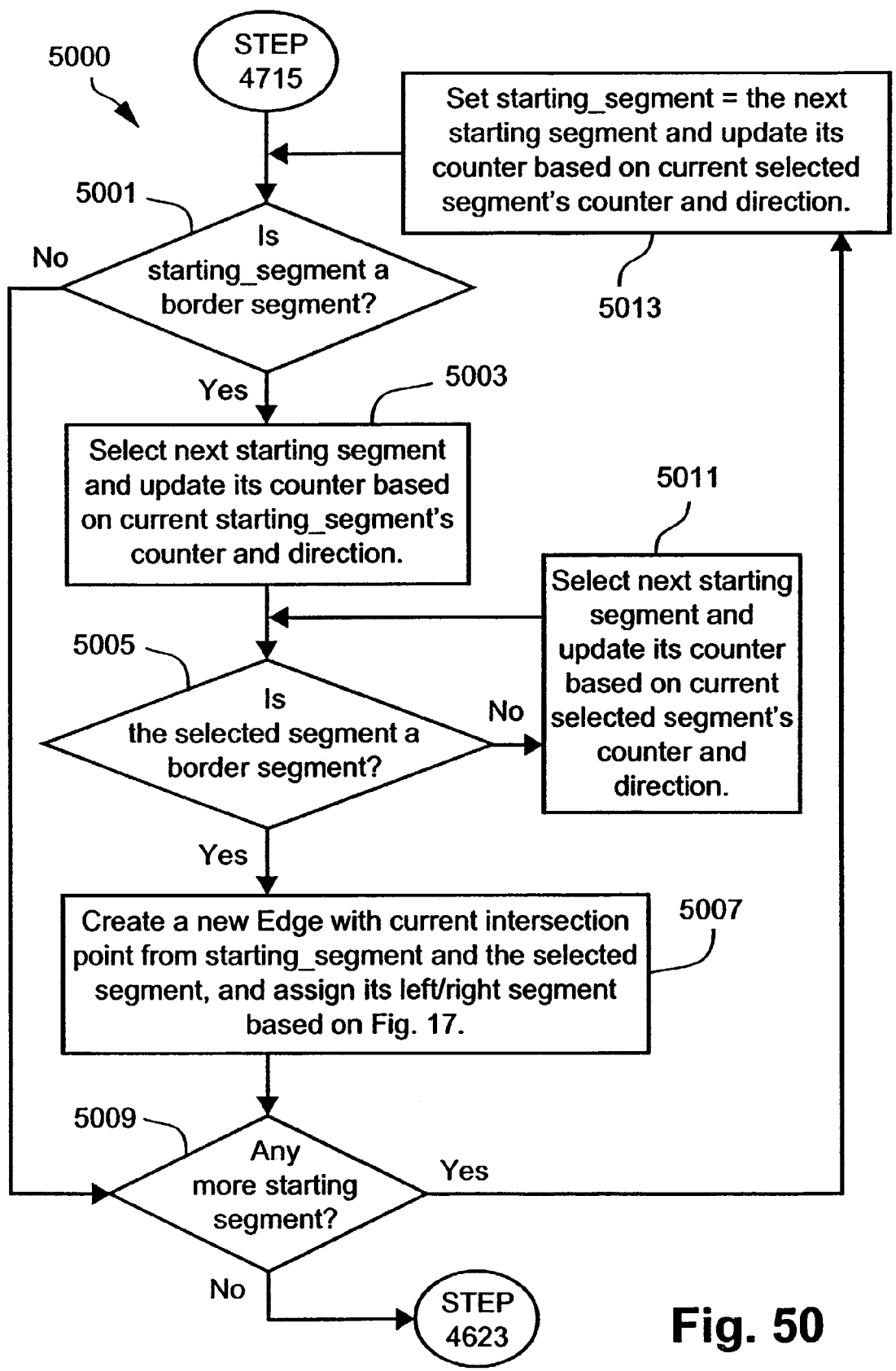
FIG. 50 is flow chart showing an Edge Creation process performed during the process of FIGS. 46(*a*), (*b*) and (*c*)

At step 4915 of the process 4900, the buffer starting_segment is set equal to the next starting segment at the current intersection point and the counter associated with the next starting segment is updated based on the counter and direction of the current starting segment, as described above. At the next step 4913, if there are any more ending segments at the current intersection point then the process 4900 returns to step 4901. Otherwise, the process 4900 proceeds to step 4907 where the Edge Creation process 5000 of FIG. 50 is performed for the current point.

At step 4911, if there are any more starting segments at the current intersection point, then the process 4900 proceeds to step 4909. Otherwise the process 4900 proceeds directly to step 4623 of the process 4600. At step 4909, the process 4900 proceeds to step 4909 where the starting_segment buffer is set equal to the next starting segment at the current intersection point and the counter associated with the next starting segment is updated based on the counter and direction of the current starting segment. The process 4900 returns to step 4901 after step 4909.

The process 5000 begins at step 5001 where if the segment indicated by the buffer starting_segment is a border segment then the process 5000 proceeds to step 5003. Otherwise, the process 5000 proceeds directly to step 5009. At step 5003, the next starting segment at the current intersection point is selected and the counter associated with the next starting segment is updated based on the counter and direction of the current starting segment. The process 5000 continues at the next step 5005, where if the selected segment is a border segment then the process 5000 proceeds to step 5007. Otherwise, the process 5000 proceeds to step 5011 before returning to step 5005.

At step 5011 of the process 5000, the next starting segment at the current point is selected and the counter associated with the next starting segment is updated based on the counter and direction of the current starting segment. The process 5000 continues at the next step 5007, where a new edge starting from the current intersection point is created from the starting_segment and the segment selected at step 5003. Further, the segments of the newly created edge are assigned as left and right segments based on the criteria given in FIG. 20, and the process 5000 proceeds to step 5009. If there are any more starting segments at the current intersection point, at step 5009, then the process 5000 proceeds to step 5013. Otherwise the process 5000 proceeds to step 4623 of the process 4600.

At the next step 5013 of the process 5000 the starting_segment buffer is set equal to the next starting segment at the current intersection point and the counter associated with the next starting segment is updated based on the counter and direction of the current starting segment.

Figure 30:
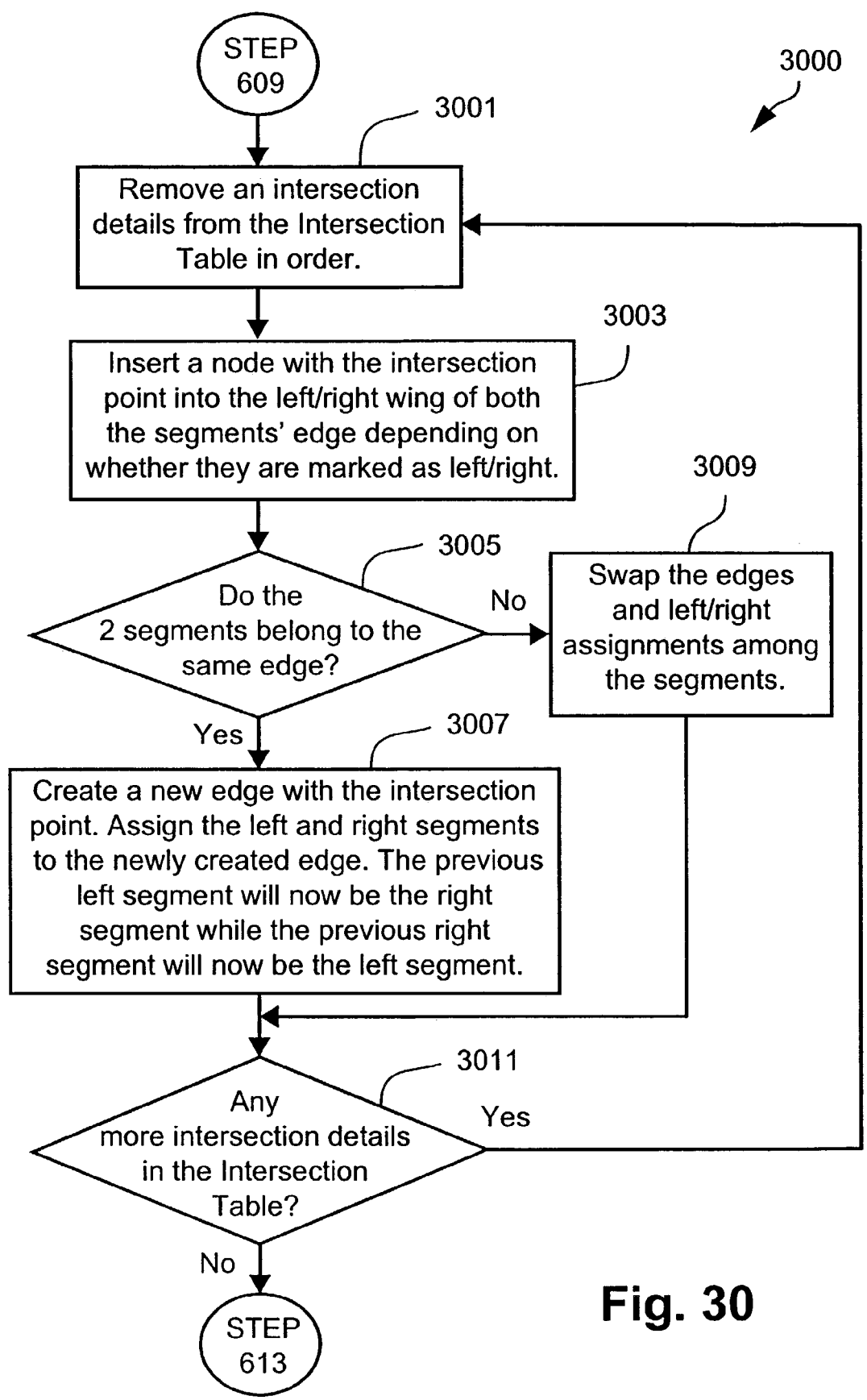
FIG. 30 is a flow chart showing an Intersection Processing process for input paths configured using the odd-even winding fill rule.

FIG. 30 is a flow chart showing the intersection processing process 3000 for input paths configured using the odd-even winding fill rule. The process 3000 is preferably implemented as an application program being resident on the hard disk drive 310 and being read and controlled in its execution by the processor 305. As with the process of 2900, intersections are processed one at a time. At steps 3001 to 3011 of the process 3000, new vertices are inserted into both edges for the intersecting segments at the intersection point. If the intersecting segments belong to the same edge, a new edge is created out of the intersecting edges. Otherwise, the corresponding edges of the intersecting segments and the corresponding left/right assignments are interchanged. The process 3000 begins at step 3001 where intersection details for the intersecting segments are removed from the intersection table. At the next step 3003, a node with the intersection point is inserted by the processor 305 into the left/right wing of both of the edges associated with the intersecting segments depending on whether the segments are marked as left or right. The process 3000 continues at step 3005, where if both of the intersecting segments belong to the same edge, then a new edge is created at the intersection point with the intersecting segments. Further, the left and right intersecting segments are assigned to the newly created edge such that the segment that was previously left is now right while the segment that was previously right is now the left segment. At the next step 3011, if there are any more intersection details in the intersection table, then the process 3000 returns to step 3001.

If both of the intersecting segments do not belong to the same edge at step 3005, the edges associated with each of the first and second intersecting segments are interchanged along with the left/right assignments of the segments. The process 3000 concludes at step 3011, when there are no more intersection details in the intersection table, and proceeds to step 613 of the process 600.

Figure 32:
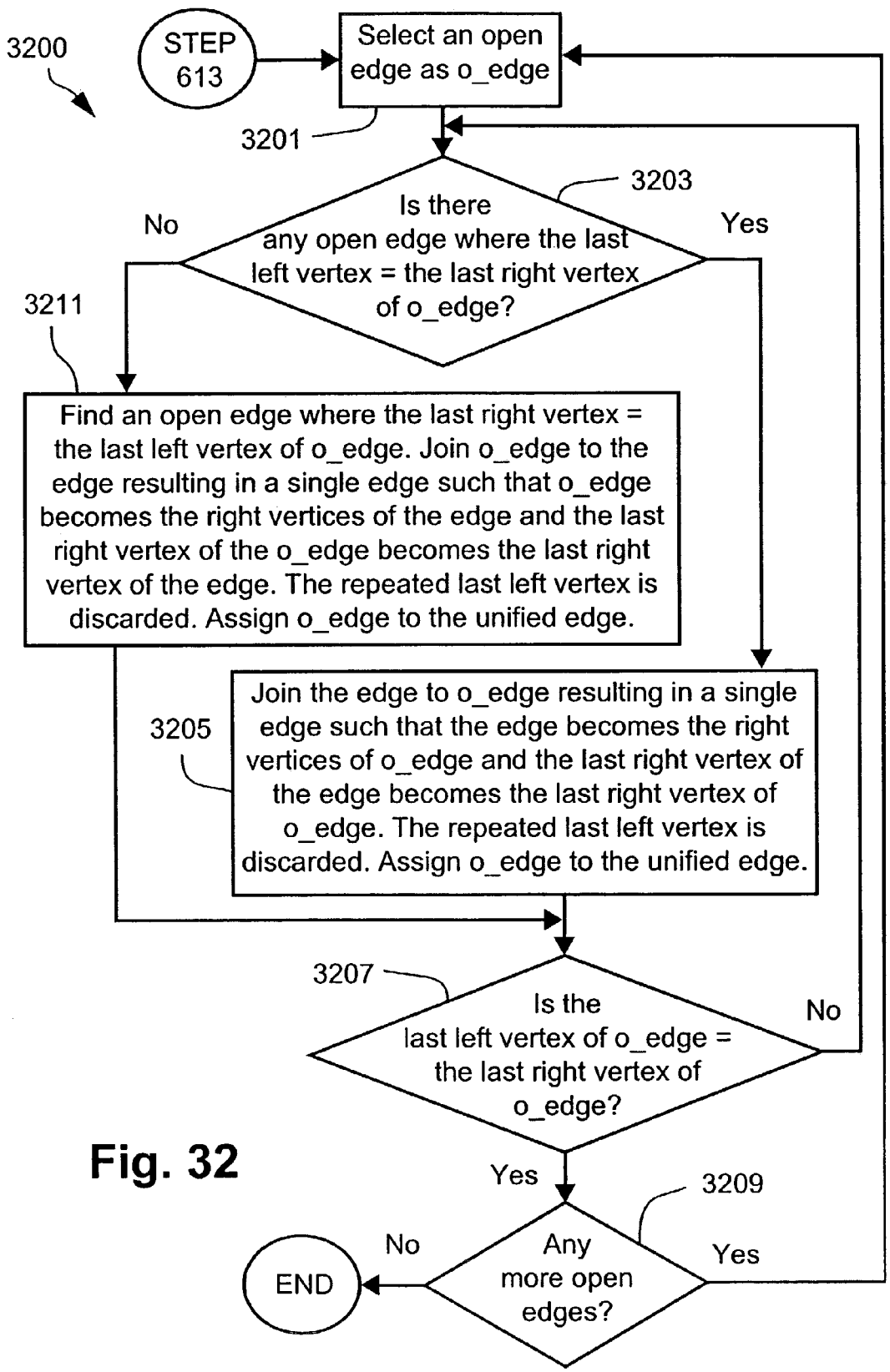
FIG. 32 is a flow chart showing a Merging Edges process for merging all open edges to form a simple outline path.
Figure 33:
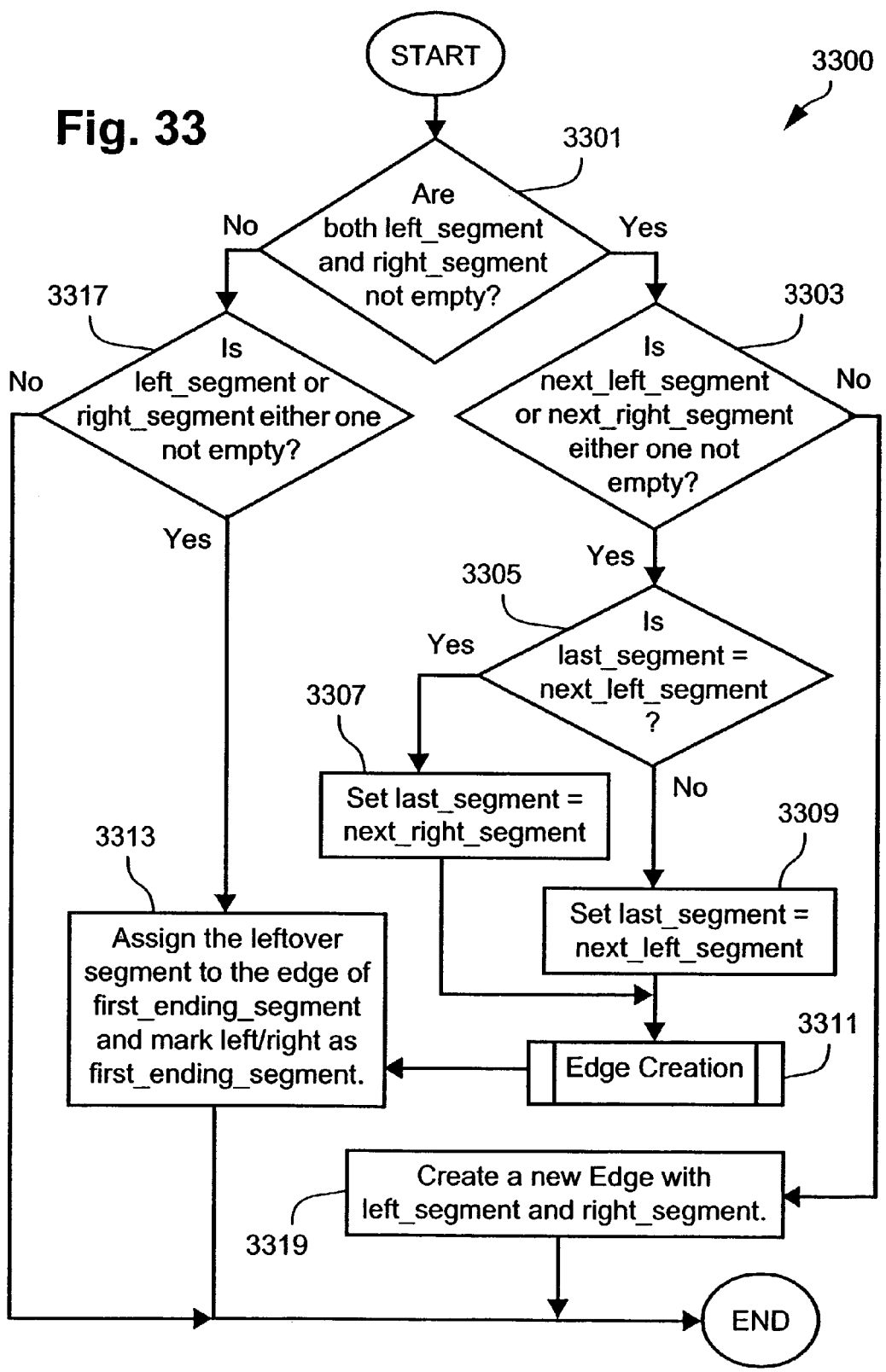
FIG. 33 is a flow chart showing a Connecting Segment process for connecting border segments.

Returning to the process 600 of FIG. 6(*a*), after the intersection processing process has been executed on the intersecting segments for the current bucket at step 611, the process 600 proceeds to step 613. At step 613, if there are any buckets left in the segment table then the process 600 returns to step 603. Otherwise, the process proceeds to step 615 where any open edges, resulting from the processes of steps 601 to 613, are merged by a merging edges process 3200, as seen in FIG. 32, at step 615 to form closed edges which will constitute the simple outline path. An edge is considered open if its last left vertex is not equal to its last right vertex edges are merged by joining different sets of vertices, where the vertices of a left assigned edge are joined with the vertices of a right assigned edge. In accordance with the methods described herein, only left vertices can be joined with right vertices and vice versa.

FIG. 51 is a flow chart showing a further Intersection Processing process 5100 for input paths configured using the odd-even winding fill rule. The main difference of the process 5100 from the process 3000 described above is the manner in which intersection points involving more than two segments are handled. Similarly to the process 3000 described herein, the steps of the process 5100 are preferably implemented as software resident on the hard disk drive 310 and being read and controlled in their execution by the processor 305. In the process 5100, all segments that cross an intersection point where more than two segments intersect are first split. Then all starting border segments are connected to ending border segments wherever possible. For those segments that are left over, new edges are created for starting border segments which are not connected to any ending border segments. Prior to splitting, all segments are assumed to be held in a suitable buffer in their existing order.

Figure 52A:
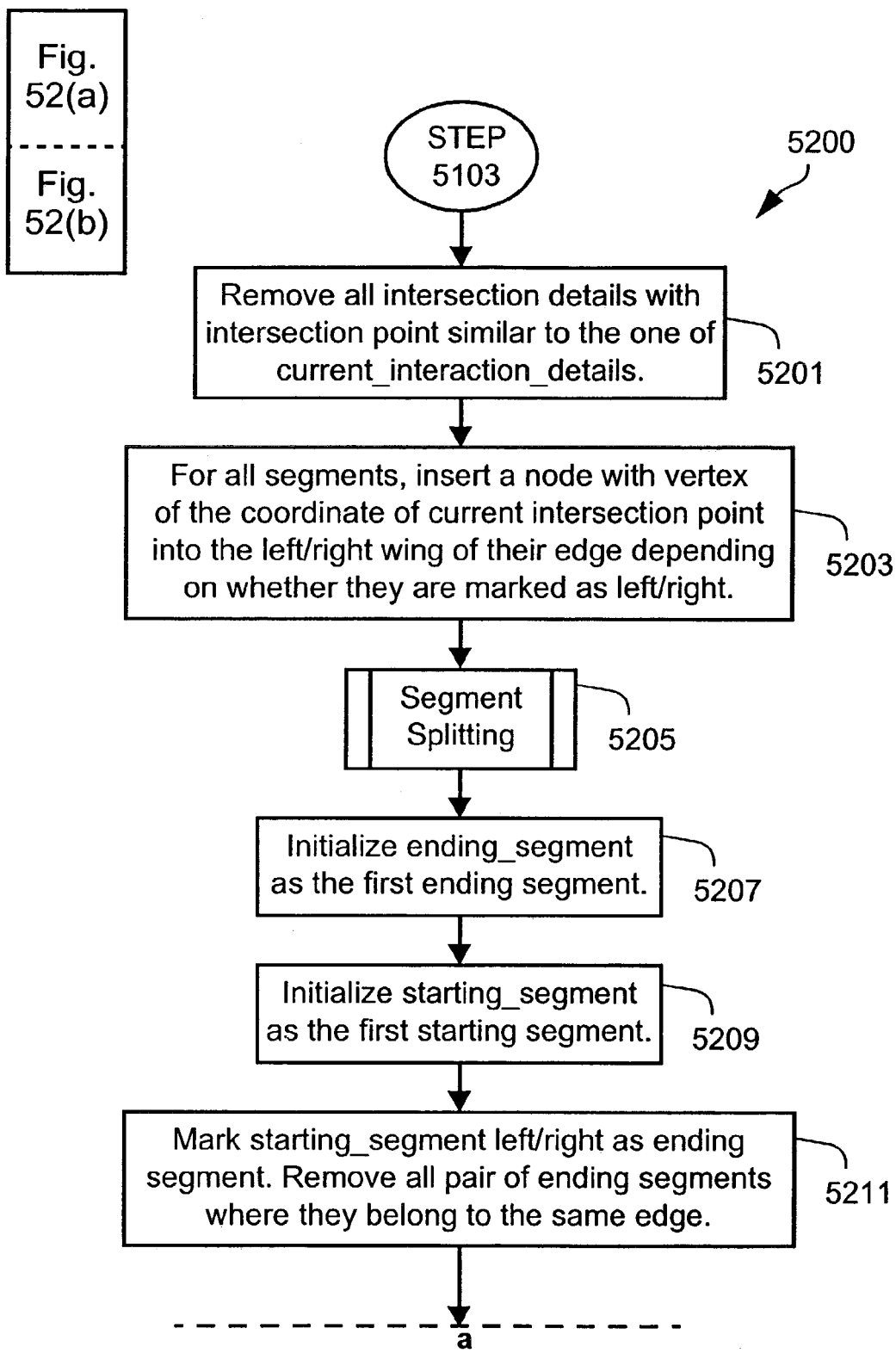
FIGS. 52(*a*) and (*b*) show a flow chart illustrating a Split Assign Segment process performed during the process of FIG. 51.
Figure 52B:
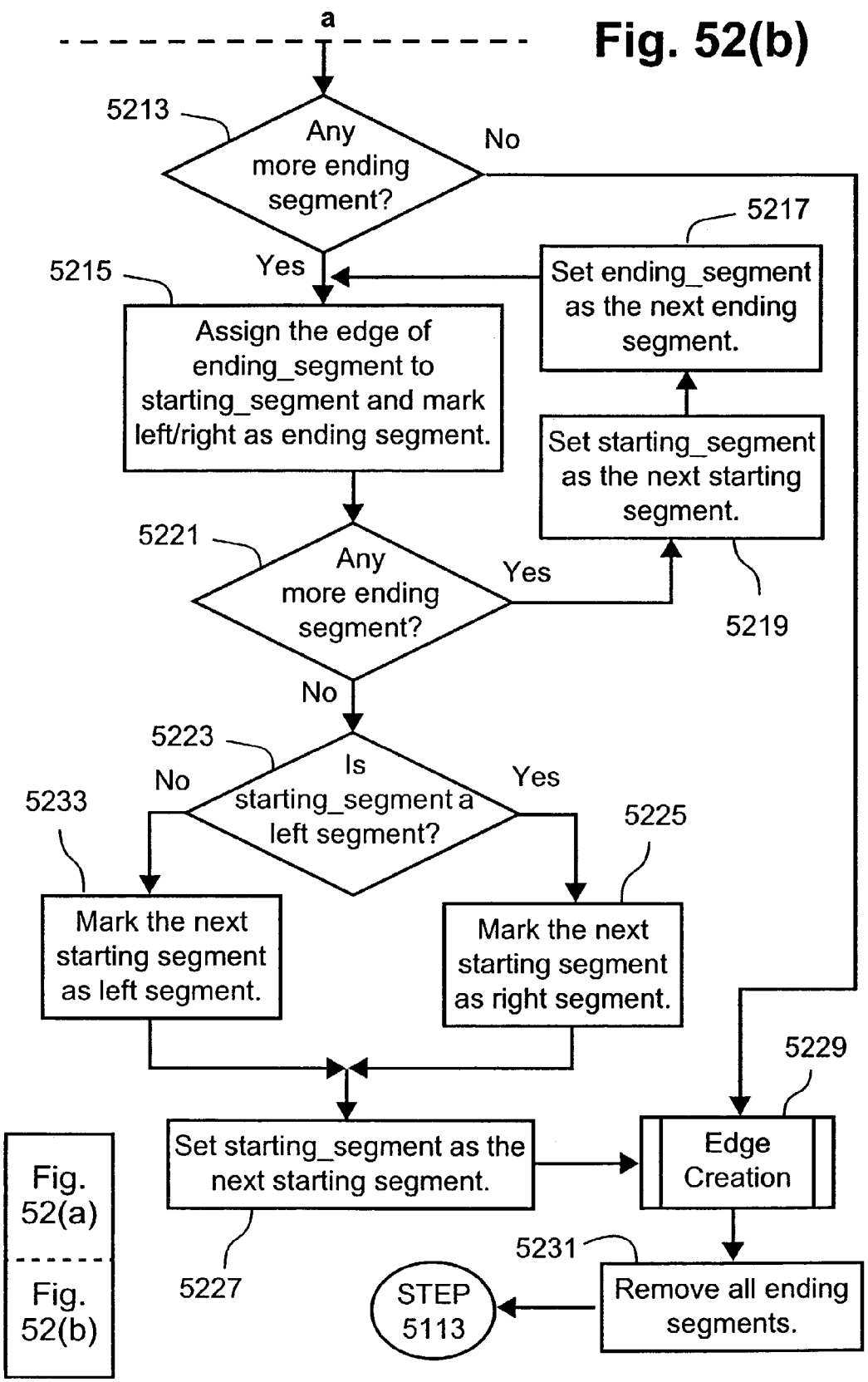

The process 5100 begins at step 5101 where intersection details for the intersecting segments are removed from the IT in order, and are preferably assigned the label current_intersection_details. Then at the next step 5103, if the intersection details have the same intersection point then the process 5100 proceeds to step 5115. Otherwise the process 5100 proceeds to step 5105. At step 5115, a Split Assign Segment process 5200, as seen in FIGS. 52(a) and (b), is performed for the current intersection point and the process 5100 proceeds to step 5113. The Split Assign Segment process 5200 will be explained below with reference to FIGS. 52(a) and (b). At step 5105, a node with the intersection point is inserted into the left/right wing of both of the edges associated with the intersecting segments depending on whether the segments are marked as left or right. At the next step 5107, if the two intersecting segments belong to the same edge then the process 5100 proceeds to step 5109. Otherwise, the process 5100 proceeds to step 5111 where the edges and the left and right assignments associated with the segments are interchanged. At step 5109, a new edge starting from the current intersection point is created from the intersecting segments. Further, the left and right intersecting segments are assigned to the newly created edge, and the process 5100 proceeds to step 5113. The previous left segment will now be the right segment while the previous right segment will now be the left segment. If there are any more segments in the IT at step 5113, then the process 5100 returns to step 5101. Otherwise, the process proceeds to step 613 of the method 600.

The steps of the process 5200 are preferably implemented as software resident on the hard disk drive 310 and being read and controlled in their execution by the processor 305. The process 5200 begins at step 5201, where intersection details for the intersecting segments having an intersection point similar to the one represented by the label current_intersection_details, are removed from the IT. Then at the next step 5203, a node having a vertex being the coordinate of the current intersection point is inserted into the left/right wing of both of the edges associated with the intersecting segments depending on whether the segments are marked as left or right. At the next step 5205, the Segment Splitting process 4800 is performed for the current intersection point to separate the ending and starting segments on the point. At the next 5207, an ending_segment buffer is initialised to the first ending segment represented by the intersection details. The process 5200 continues the next step 5209 where a starting_segment buffer is initialised to the first starting segment represented by the intersection details. Then at the next step 5211, the left and right segments of the first starting segment are marked as the ending segment and all pairs of ending segments belonging to the same edge are removed from the IT.

If there are any more ending segments, at the next step 5213, then the process 5200 proceeds to step 5215. Otherwise the process 5200 proceeds to step 5229. At step 5215, the edge of the segment indicated by the buffer, ending_segment, is assigned to the starting segment represented by the buffer, starting_segment. Also at step 5215, the starting segment is marked as left or right depending on the counter associated with the ending segment. If there are any more ending segments, at the next step 5221, then the process proceeds to step 5219. Otherwise the process 5200 proceeds to step 5223. At step 5219, the starting_segment buffer is set to the next starting segment at the current point. Then at step 5117, the ending segment buffer is set to the next ending segment at the current point and the process 5200 returns to step 5215.

At the next step 5223 of the process 5200, if the segment represented by the buffer, starting_segent, is a left segment then the process 5200 proceeds to step 5225, where the next starting segment is marked as a right segment. Otherwise the process 5200 proceeds to step 5233 where the next starting segment is marked as a left segment. The process 5200 continues at the next segment 5227, where the starting_segment buffer is set to the next starting segment at the current intersection point.

Figure 53:
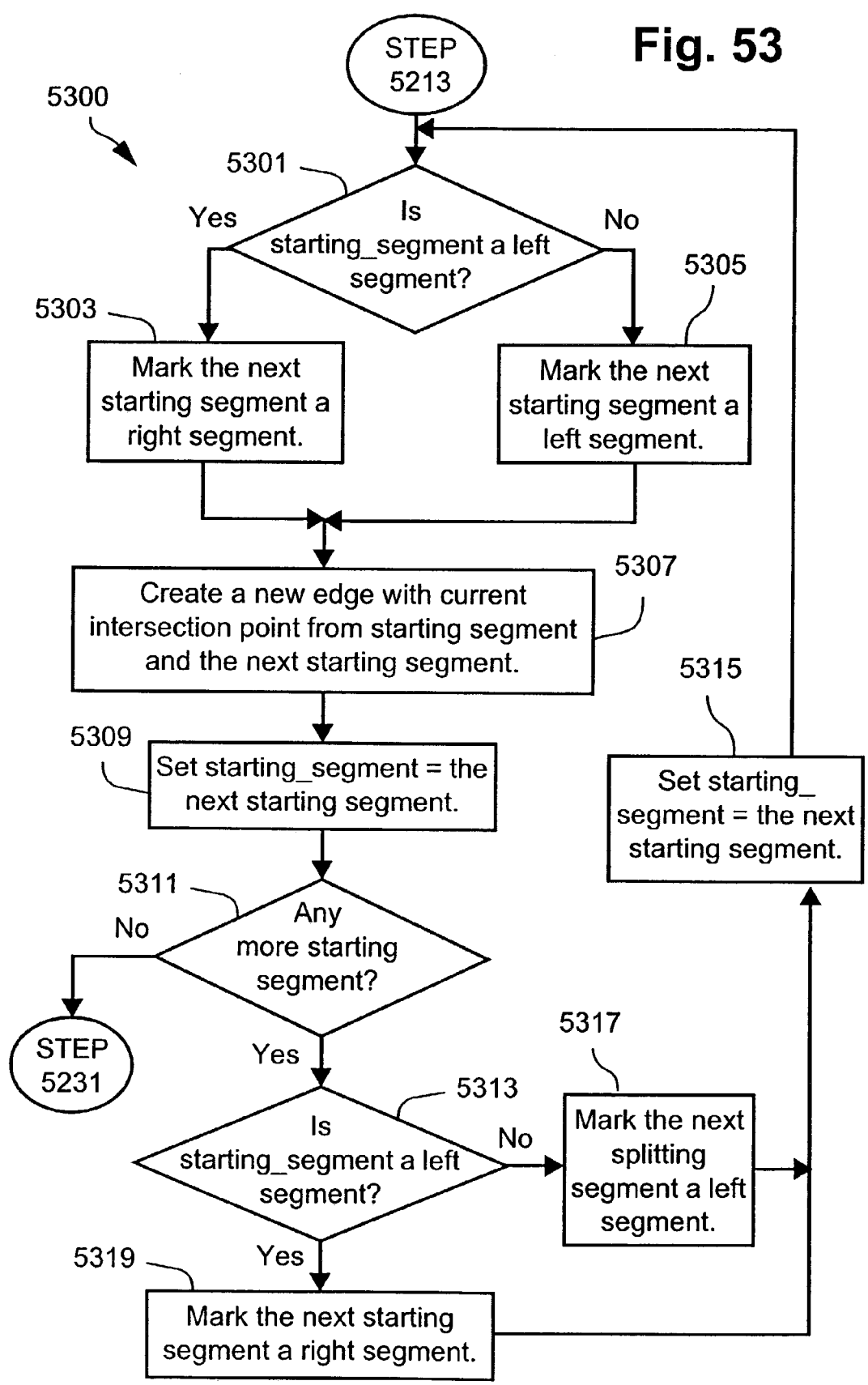
FIG. 53 is flow chart showing an Edge Creation process performed during the process of FIG. 51.

At step 5229 an Edge Creation process 5300, as seen in FIG. 53, is performed for the current point whereby for each border segment starting from the current point, new edges are created. The Edge Creation process 5300 will be explained in further detail below with reference to FIG. 53. The steps of the process 5300 are preferably implemented as software resident on the hard disk drive 310 and being read and controlled in their execution by the processor 305. The process 5200 concludes at the next step 5213, where all ending segments are removed from the IT and the process 5200 proceeds to step 5113.

The process 5300 begins at step 5301, where if the segment represented by the starting_segment buffer is a left segment, then the process 5300 proceeds to step 5303. Otherwise the process 5300 proceeds to step 5305, where the next starting segment is marked as a left segment. At step 5303, the next starting segment is marked as a right segment. Then at step 5307, a new edge starting from the current intersection point is created from the starting segment and the next starting segment, and the process 5300 5300 proceeds to step 5309. At step 5309, the starting_segment buffer is set to the next starting segment.

If there are any more starting segments at the current point, at the next step 5311, then the process 5300 proceeds to step 5313. Otherwise the process 4300 proceeds to step 5213 of the process 5200. At step 5313, if the segment in the buffer, starting_segment, is a left segment then process 5300 proceeds to step 5319. Otherwise the process 5300 proceeds to step 5317, where the next starting segment at the current intersection point is marked as a left segment. At step 5319, the next starting segment is marked as a right segment. Then at the next step 5315, the starting_segment buffer is set equal to the next starting segment and the process 5300 returns to step 5301.

FIG. 32 is a flow chart showing the merging edges process 3200 for merging all open edges to form a simple outline path. The process 400 is preferably implemented as an application program being resident on the hard disk drive 310 and being read and controlled in its execution by the processor 305. The process 3200 begins at step 3201 where a first open edge is selected by the processor 305. The open edge is preferably assigned the label o_edge. The process continues at steps 3203 to 3207 where a suitable edge is selected by the processor 305 for merging with the edge (i.e. o_edge), by comparing the coordinates of the vertices for each of the edges resulting from steps 301 to 313. As discussed above, only left edge vertices can be joined with right edge vertices and vice versa. Therefore, the process 3200 continues at step 3203, where a test is executed by the processor 305 to determine if there is any open edge having a last left vertex which is equal to the last right vertex of the edge, o_edge, by comparing the coordinates of the vertices for each of the edges. If the result of step 3203 is false, then the process 3200 proceeds to step 3211, where a search is executed by the processor 305 to select an open edge having a last right vertex which is equal to the last left vertex of the edge, o_edge. The edge resulting from the search of step 3211 is logically joined to the edge, o_edge, resulting in a single edge such that the left vertice of o_edge becomes the right vertice of the edge selected at step 3211 and the last right vertex of o_edge becomes the last right vertex of the selected edge. The repeated last left vertex is discarded and the label o_edge is assigned to the resulting edge. Otherwise, if the result of step 3203 is true, then the process proceeds to step 3205, where the edge found at step 3203 is joined to the edge, o_edge, resulting in a single unified edge. Again, the repeated last left vertex resulting from the joining of the edges is discarded and the label o_edge is assigned to the resulting edge.

The process 3200 continues at step 3207, where if the last left vertex of o_edge is equal to the last right vertex of o_edge, then the process 3200 proceeds to step 3209. Otherwise, the process 3200 returns to step 3203. At step 3209 if there are any more open edges, then the process returns to step 3201. The process 3200 concludes when all open edges resulting from steps 601 to 613 of the process 600 are joined to form a simple outline path, and the process 600 concludes.

Figure 31A:
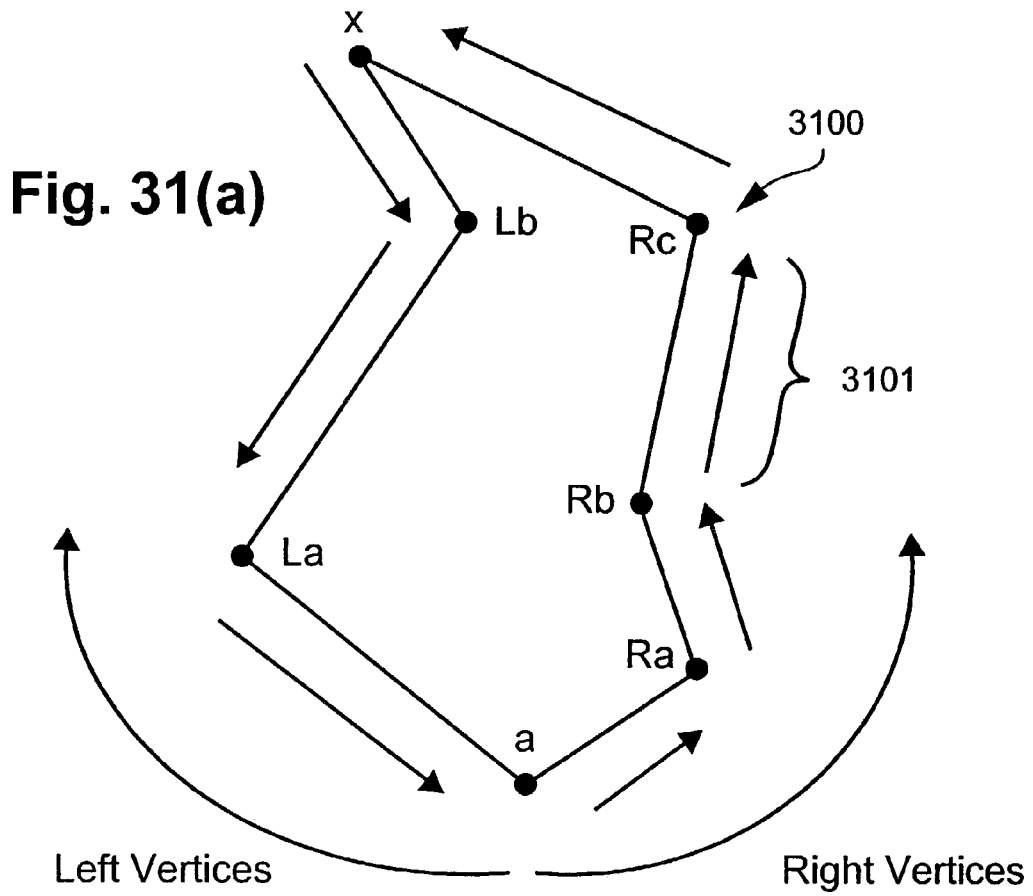
FIG. 31(a) shows an example path made up of seven edges.
Figure 31B:
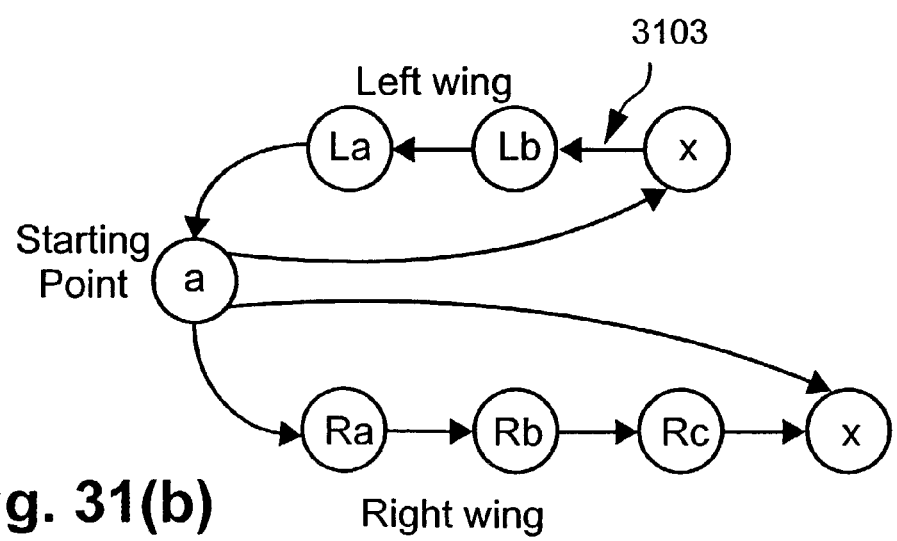
FIG. 31(b) is a conceptual block diagram showing all of the vertices of the path of FIG. 31(a) labelled.

Edges are preferably traversed in a single direction during the edge merging process 3200 at step 615. For example, FIG. 31(a) shows a path 3100 made up of seven edges (eg. 3101). The right and left vertices are indicated as shown by the arrows referenced as "Left Vertices" and "Right Vertices". The vertices of the right edges are referenced with an R and the vertices of the left edges are referenced with an L, as shown in FIG. 31(a). FIG. 31(b) shows a conceptual block diagram with all of the vertices (eg. La) of the path 3100. As shown in FIG. 31(b) the edges of the path 3100 are preferably traversed from the edges' left wing to the edges' right wing in the direction indicated by the arrows (eg. 3103). This establishes a convention where the interior of an edge is always on the left-hand side, if the edge is traversed according to the direction of the edge, and results in uniform edge orientation.

Figure 37:
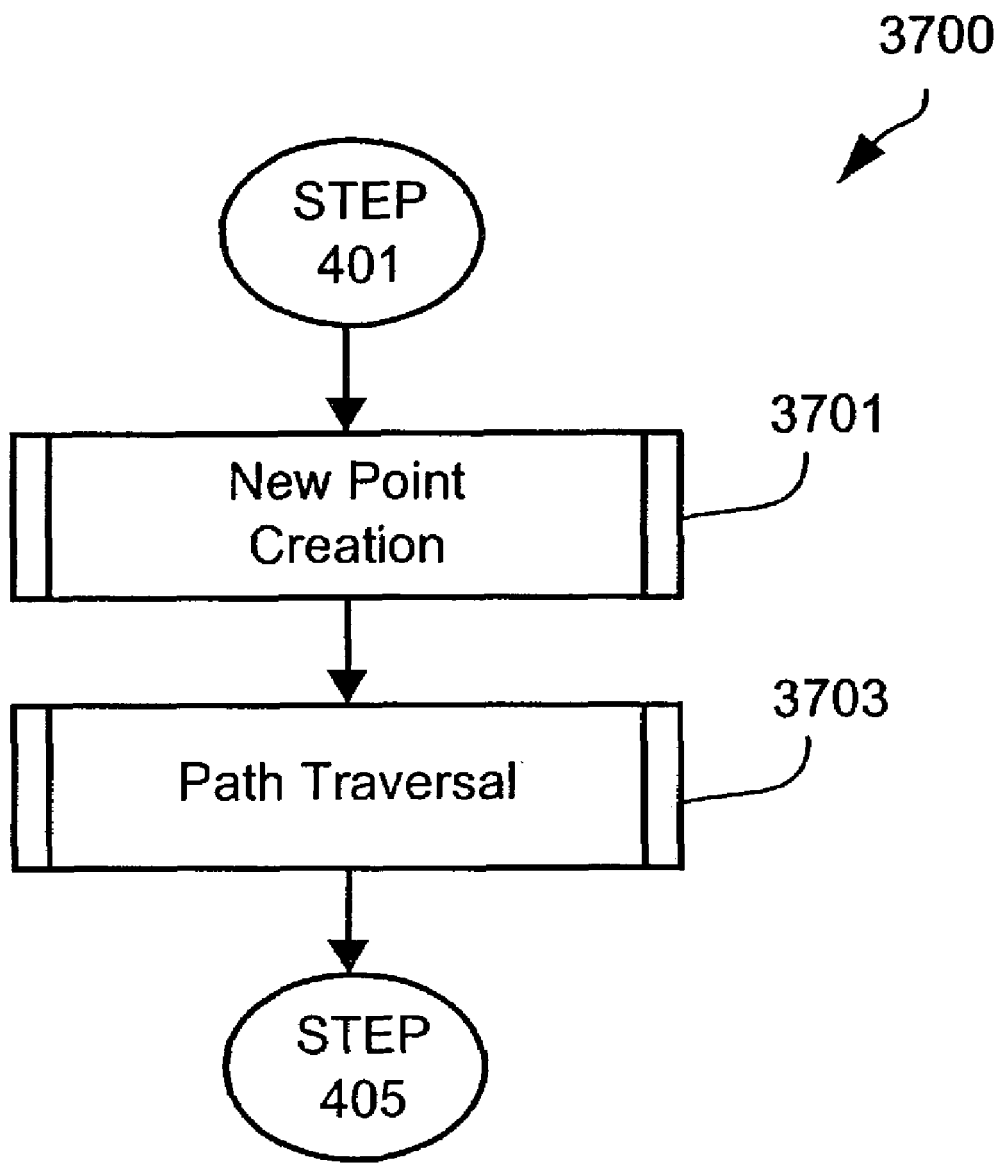
FIG. 37 is a flow chart showing a Simple Path Intersection process as executed on two simple outline paths.
Figure 38:
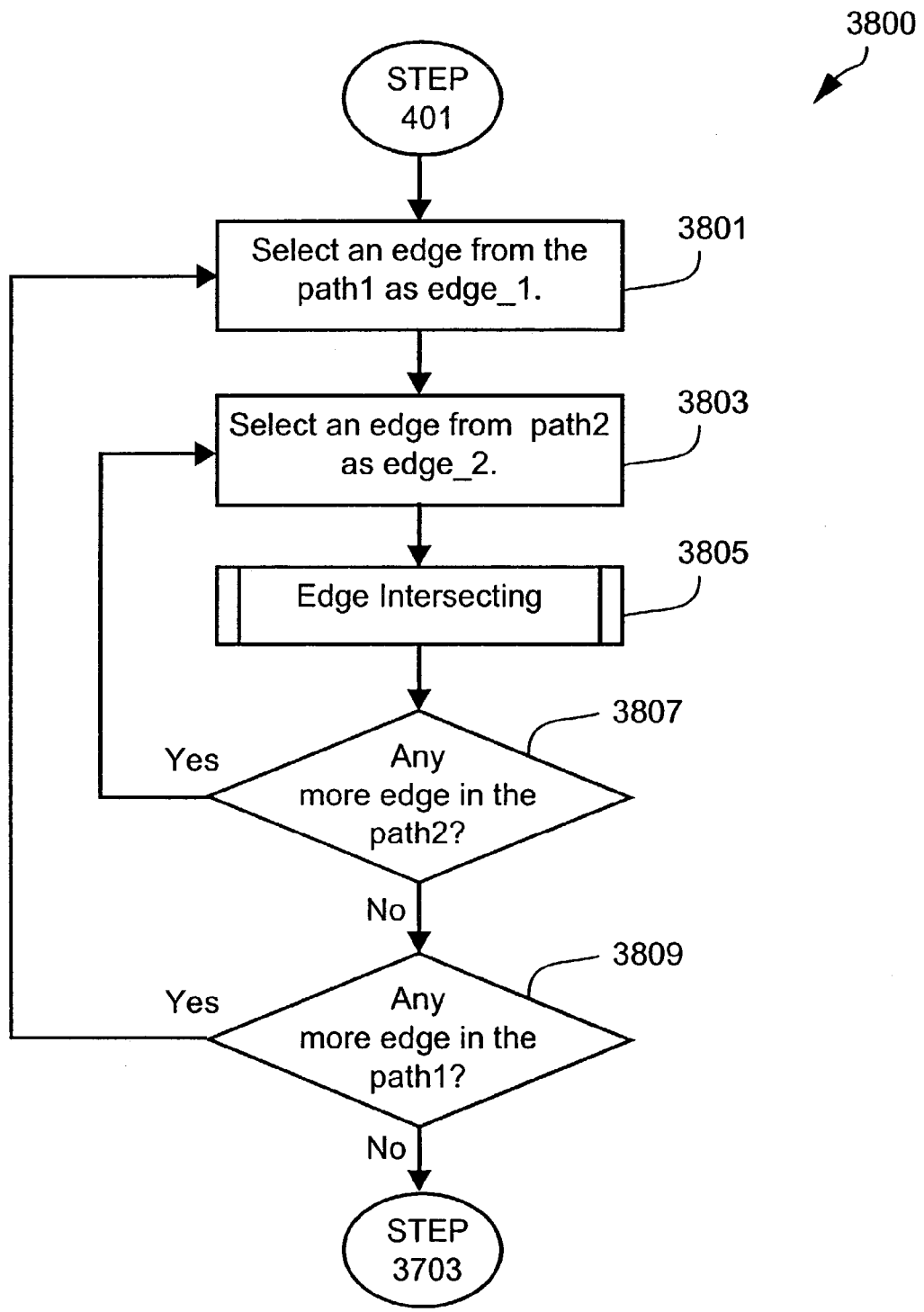
FIG. 38 is a flow chart showing a New Point Creation process.

Returning now to the process 400 of FIG. 4, FIG. 37 is a flow chart showing the simple path intersection process 3700 as executed on the two simple outline paths resulting from step 401. The process 3700 is preferably implemented as an application program being resident on the hard disk drive 310 and being read and controlled in its execution by the processor 305. The process 3700 begins at step 3701, where a new point creation process 3800, as seen in FIG. 38, is executed on the two simple outline paths. In the new point creation process 3800, all of the edges of one of the paths (preferably assigned the label Path1) are intersected with all of the edges of the other path (preferably assigned the label Path2). The new point creation process 3800 will be explained in more detail below with reference to the flow chart of FIG. 38.

Figure 39:
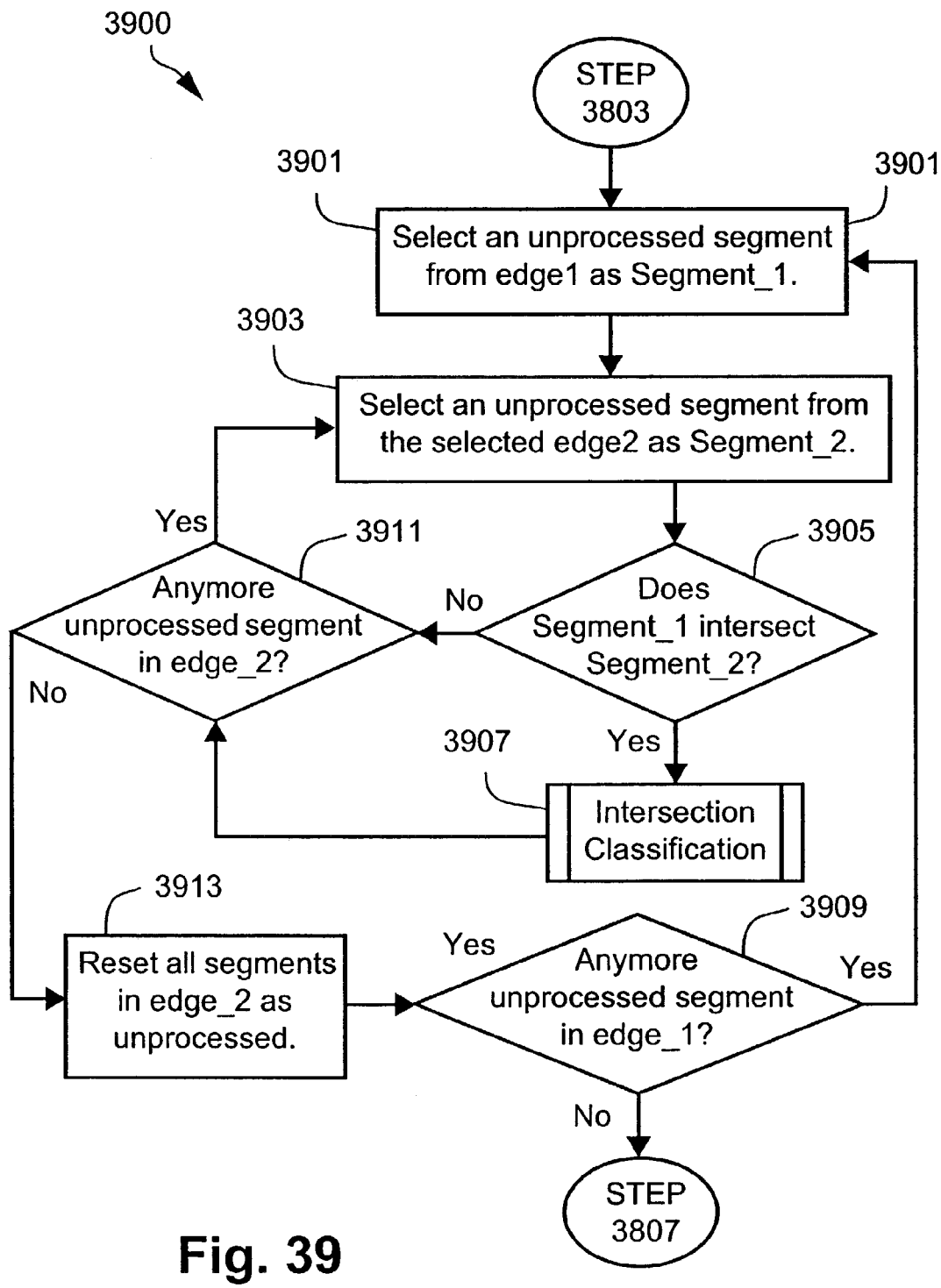
FIG. 39 is a flow chart showing an Edge Intersection process.
Figure 40A:
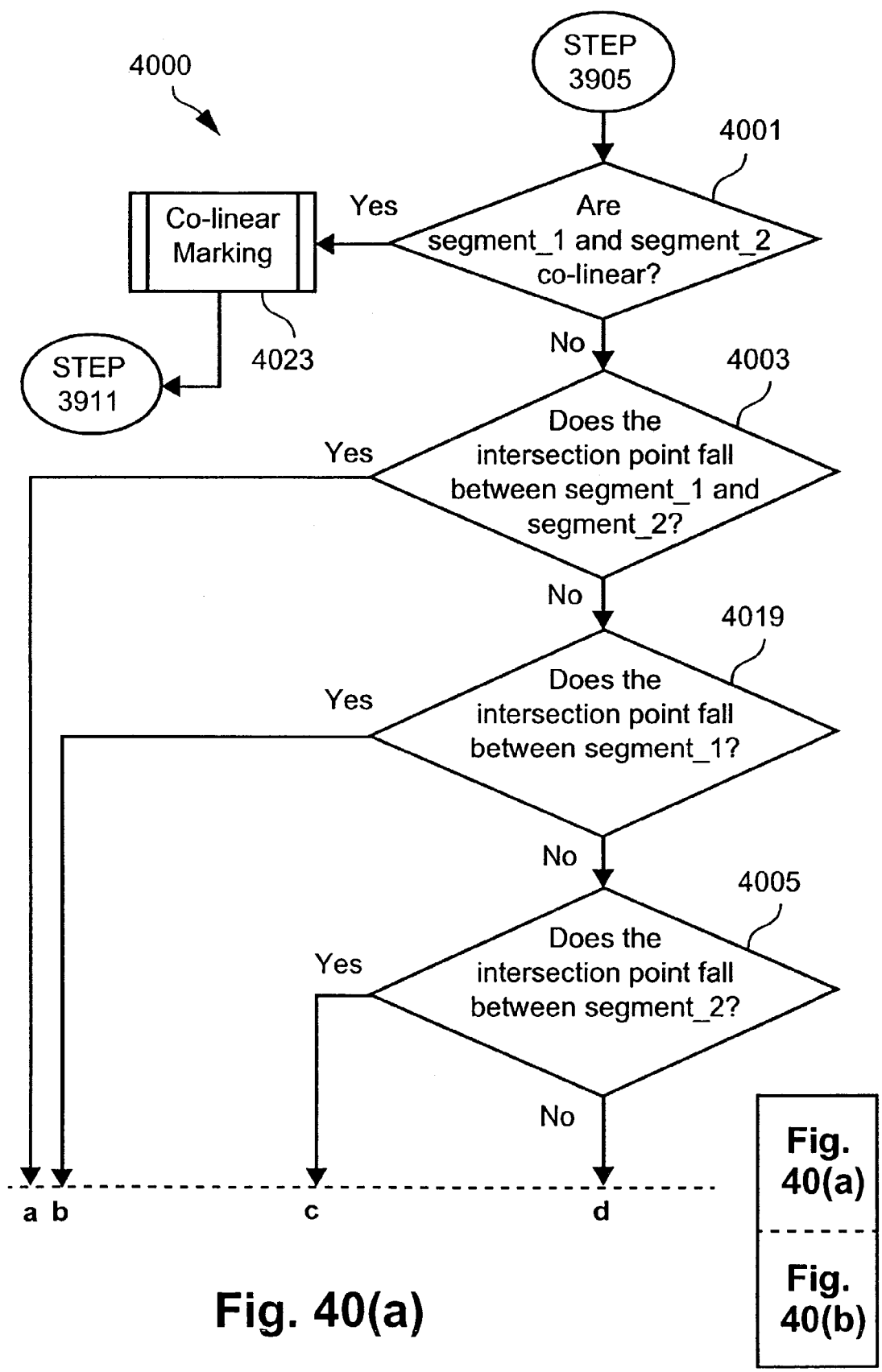
FIG. 40 is a flow chart showing an Intersection Classification process.
Figure 40B:
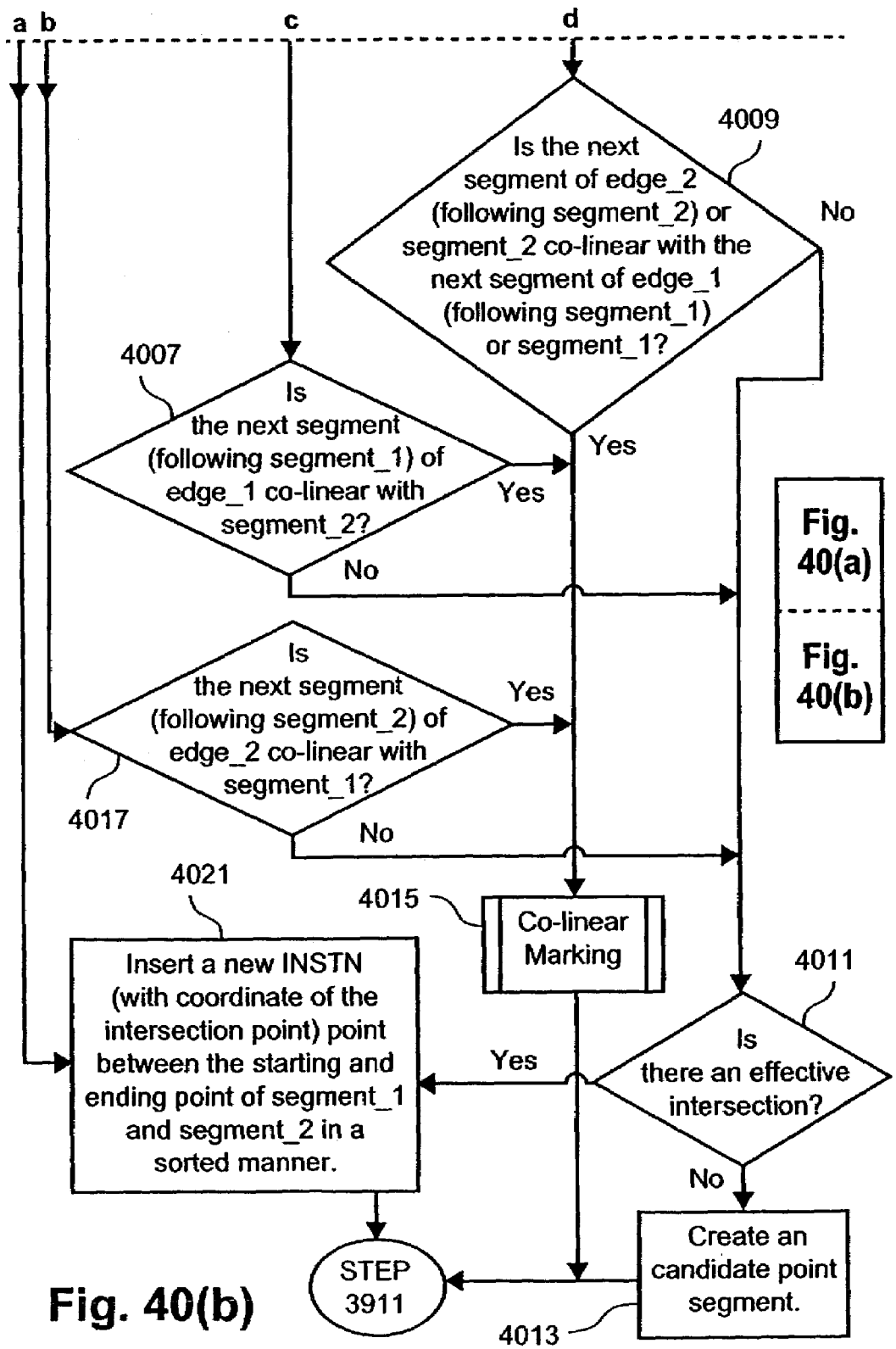
Figure 41A:
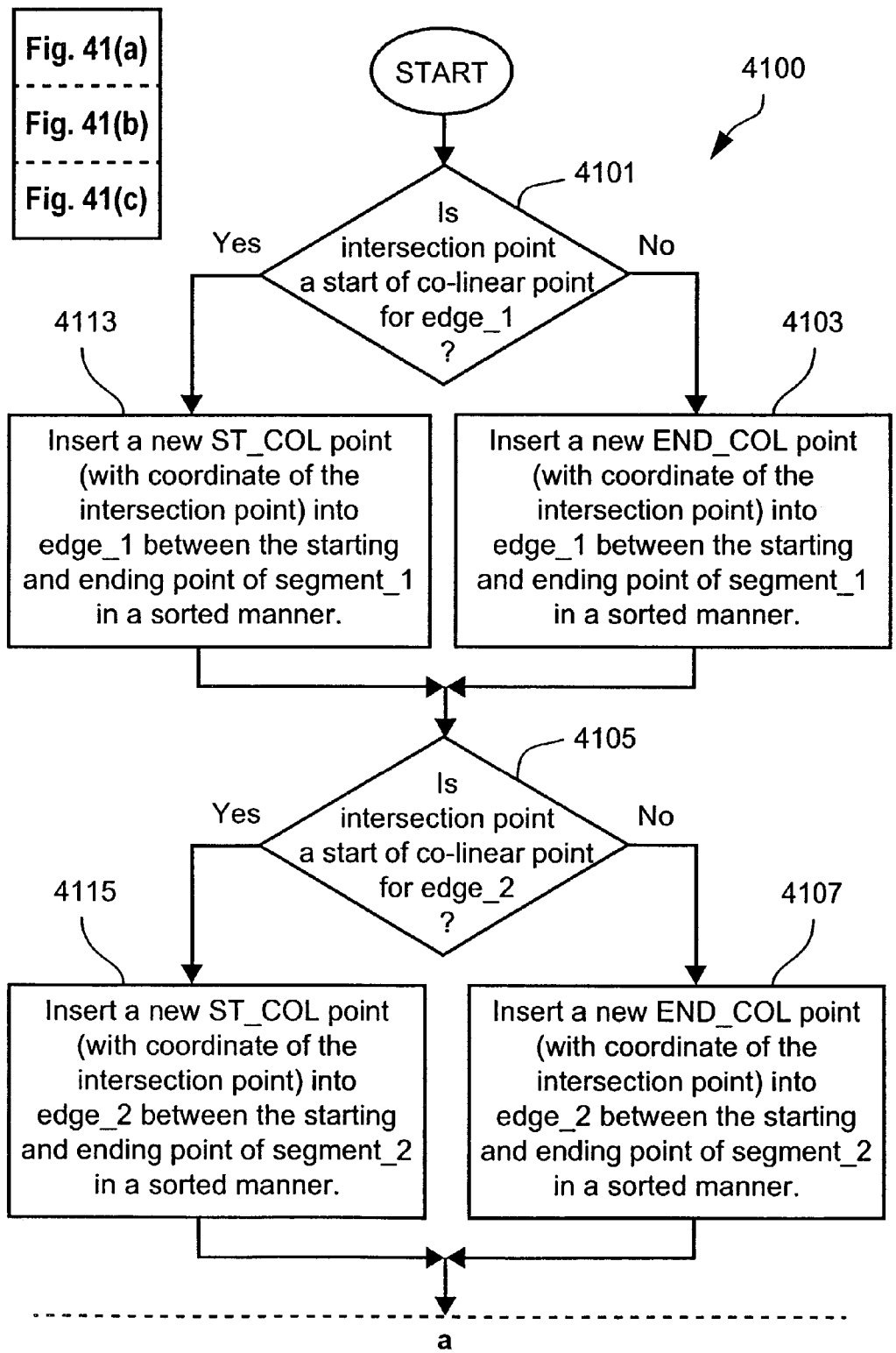
FIG. 41 is a flow chart showing a Co-linear Marking process.
Figure 41B:
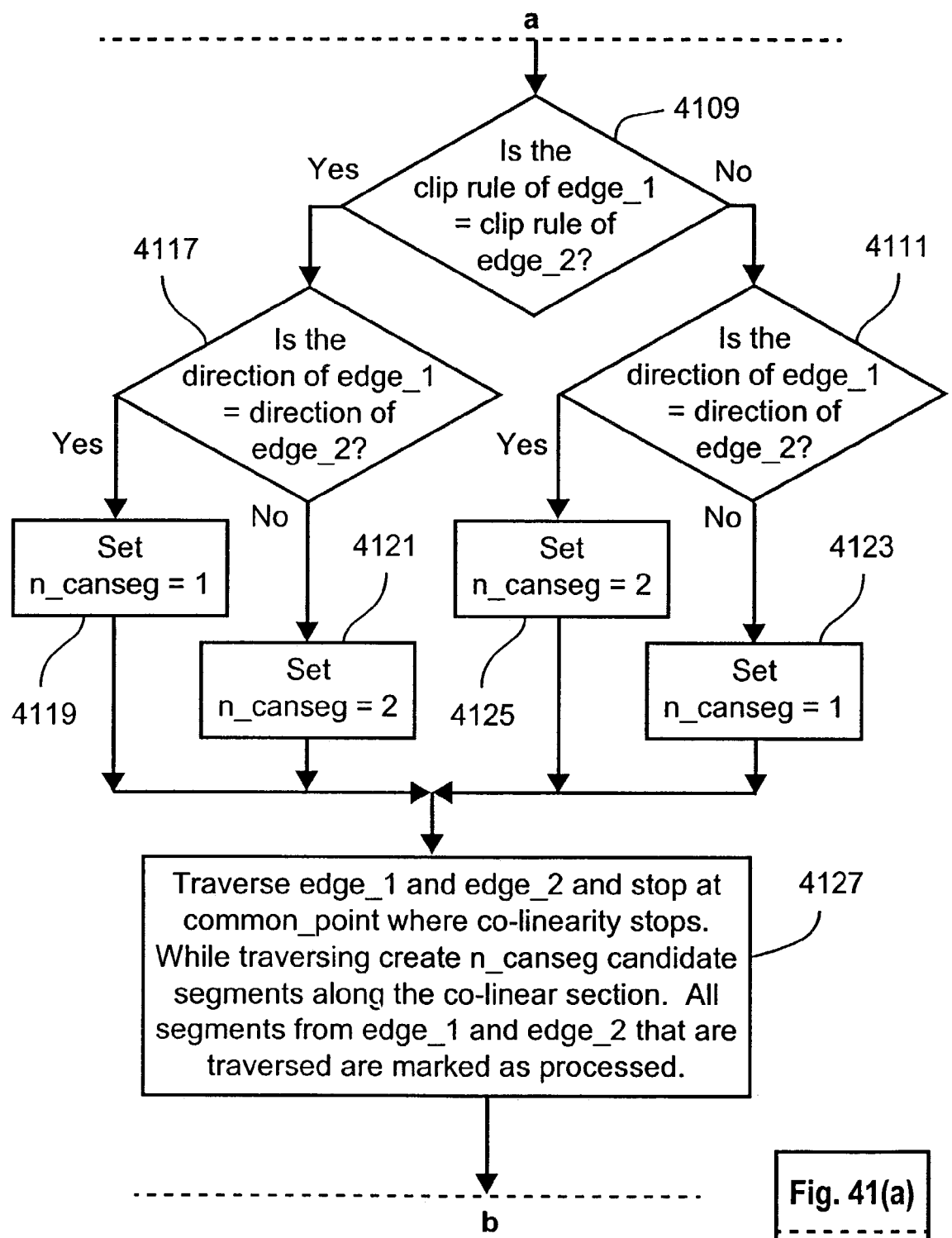

The process 3800 is preferably implemented as an application program being resident on the hard disk drive 310 and being read and controlled in its execution by the processor 305. The process 3800 begins at step 3801, where an edge from Path1 is selected by the processor 305 and assigned the label edge_1. At the next step 3803, an edge is selected by the processor 305 from Path2 and is assigned the label edge_2. Then at step 3805 an edge intersection process 3900, as seen in FIG. 39, is executed where segments from edge_1 are intersected with segments from edge_2. The edge intersection process 3900 as executed at step 3805 will be explained in more detail below with reference to the flow chart of FIG. 39. At the next step 3807, of the process 3800 if there are anymore edges in the path being processed then the process 3800 returns to step 3803. Otherwise, the process 3800 proceeds to step 3809. At step 3809, if there are anymore edges in Path1 then the process 3800 returns to step 3801. Otherwise, the process 3800 proceeds to step 3703 of the process 3700 where a path traversal process 4400 is executed on Path1 and Path2. The path traversal process 4400 will be explained in more detail below with reference to the flow chart of FIG. 44.

The edge intersection process 3900 is preferably implemented as an application program being resident on the hard disk drive 310 and being read and controlled in its execution by the processor 305. The edge intersection process 3900 begins at step 3901 where an unprocessed segment from edge_1 is assigned the label segment_1. At the next step 3903, an unprocessed segment is selected by the processor 305 from the selected edge_2 and is assigned the label segment_2. If segment_1 intersects segment_2 at the next step 3905, then the intersection point of the segments is classified in an intersection classification process 4000 at step 3907. The intersection point can be calculated using any suitable method. The intersection classification process 4000 will be explained in more detail with reference to the flow chart 4000 of FIG. 40. If segment_1 does not intersect segment_2 at step 3905 then the process 3900 proceeds to step 3911. If there are anymore unprocessed segments in edge_2 at step 3911 then the process 3900 returns to step 3903 otherwise, the process 3900 proceeds to step 3913. At step 3913 all segments in edge_2 are reset by the processor 305 as unprocessed. The process 3900 proceeds to step 3909 where if there are anymore unprocessed segments in edge_1 then the process 3900 returns to step 3901. Otherwise, the process 3900 continues at step 3807 of the process 3800.

The intersection classification process 4000 is preferably implemented as an application program being resident on the hard disk drive 310 and being read and controlled in its execution by the processor 305. In the intersection classification process 4000, an intersection point is classified as an INSTN point, a ST_COL point or an END_COL point. An INSTN point represents a pure intersection point while a ST_COL point and an END_COL point represent the start of a co-linear point and the end of a co-linear point, respectively. A new INSTN point having the same co-ordinates as the intersection point of segment_1 and segment_2 is determined by the processor 305. The new INSTN point is inserted into edge_1 and edge_2 between the starting and ending point of segment_1 and segment_2, respectively, if segment_1 and segment_2 are not co-linear with each other and their intersection point falls between segment_1 and segment_2. If segment_1 and segment_2 are co-linear, the intersection point of segment_1 and segment_2 are classified as ST_COL or END_COL points in a co-linear marking process 4100 which will be described below with reference to the flow chart 4100 of FIG. 41.

In the event that segment_1 ends on segment_2 or segment_2 ends on segment_1, a new INSTN point is inserted into edge_1 and edge_2 if there is an "effective intersection", as will be described below. Otherwise, a candidate point segment having the same co-ordinates as the intersection point is created and added to a candidate segment list.

The term effective intersection will be described in detail below with reference to FIGS. 42(a) and 42 (b). If the next segment of edge_1 (i.e. following segment_1) is co-linear with segment_2 for the case where segment_1 ends on segment_2 or, if the next segment of edge_2 (i.e. following segment_2) is co-linear with segment_1 for the case where segment_2 ends on segment_1, then the intersection point of segment_1 and segment_2 is classified into a ST_COL or END_COL point in the co-linear marking process 4100 of FIG. 41.

Figure 42A:
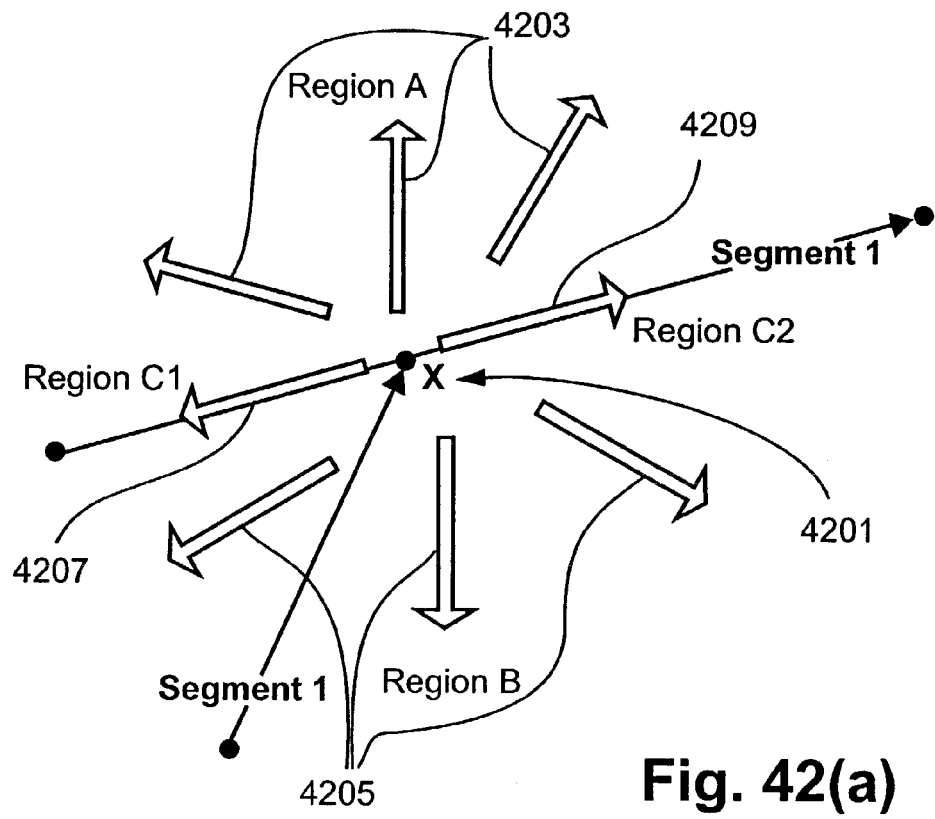
FIGS. 42(*a*) and 42(*b*) show an example of an effective intersection point.

As seen in FIG. 42(a), point 4201 is an "effective intersection" if the next segment of edge_1 (i.e. following segment_1) falls on region A (i.e. indicated by the arrows 4203). In contrast, there is no effective intersection at the point 4201 if the next segment of edge_1 (i.e. following segment_1) falls in region B (i.e. indicated by the arrows 4205. Further, if the next segment of edge_1 (i.e. following segment_1) falls in region C1 (i.e. indicated by the arrow 4207), then the intersection point is classified as a ST_COL point with respect to edge_1 and an END_COL point with respect to edge_2. If the next segment of edge_1 (i.e. following segment_1) falls in region C2 (i.e. indicated by the arrow 4209), the intersection point is classified as a ST_COL point with respect to edge_1 and edge_2.

Figure 42B:
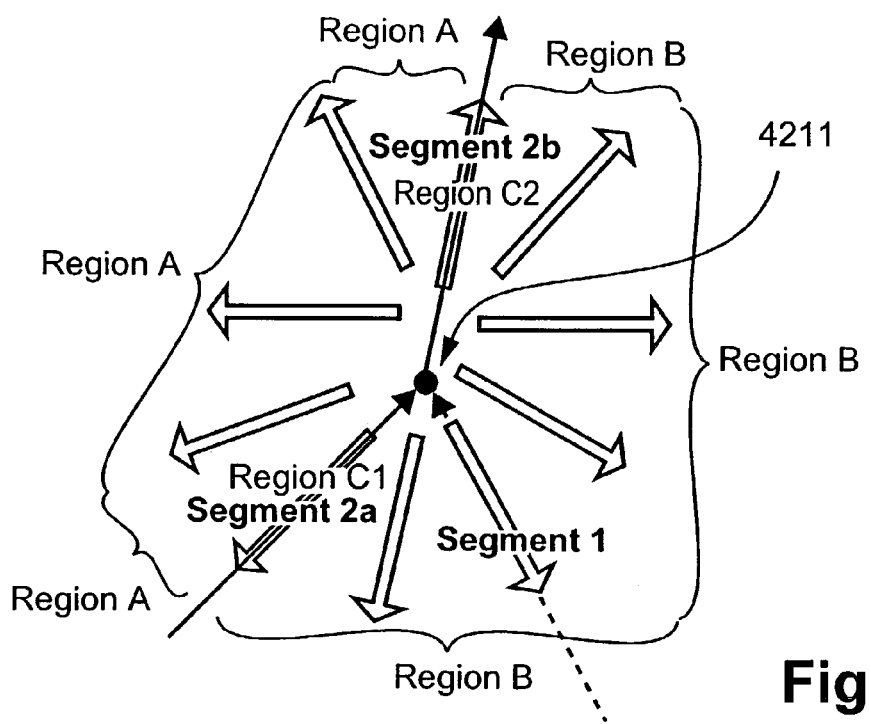

As seen in FIG. 42(b), point 4211 is classified as an effective intersection point if the next segment of edge_1 (i.e. following segment 1) falls on region A (i.e. as indicated in FIG. 42(b)). If the next segment of edge_1 (i.e. following segment 1) falls on region B (i.e. as indicated in FIG. 42(b)) the point 4211 is not classified as an effective intersection. In contrast, if the next segment of edge_1 (i.e. following segment 1) falls on region C1 (i.e. as indicated in FIG. 42(b)) the point 4211 is classified as a ST_COL point with respect to edge_1 and an END_COL point with respect to edge_2. If the next segment of edge_(i.e. following segment_1) falls in region C2 (i.e. as indicated in FIG. 42(b)), the intersection point 4211 is classified as an ST_COL point with respect to edge_1 and edge_2.

The process 4000 is preferably implemented as an application program being resident on the hard disk drive 310 and being read and controlled in its execution by the processor 305. The process 4000 begins at step 4001, where if segment_1 and segment_2 are co-linear then the process 4000 proceeds to step 4023 where the co-linear marking process 4100 is executed by the processor 305 on segment_1 and segment_2 and the process 4000 continues at step 3911 of the process 3900. The co-linear marking process 4100 classifies an intersection point into an ST_COL or an END_COL point. At the next step 4003, if the intersection point of segment_1 and segment_2 falls between segment_1 and segment_2 then the process 4000 continues at the next at 4021. Otherwise, the process 4000 proceeds to step 4019. At step 4021, a new INST point having the same coordinates as the intersection point, is inserted by the processor 305 between the starting and ending point of segment_1 and segment_2 and the process 4000 continues at step 3911 of the process 3900. At step 4019, if the intersection point does not fall between segment_1, then the process 4000 proceeds to step 4017. Otherwise, the process 4000 continues at step 4005. At step 4017, if the next segment (i.e. following segment_2) of edge_2 is co-linear with segment_1 then the process 4000 proceeds to step 4015 where the co-linear marking process 4100 of flow chart 4100 is executed by the processor 305 on segment_1 and segment_2. The process 4000 continues at step 3911 of the process 3900 after step 4015. If the next segment of edge_2 is not co-linear with segment_1 at step 4017 then the process 4000 continues at the next step 4011. At step 4011 if there is an effective intersection, as defined above, then the process 4000 returns to step 4021. Otherwise, the process 4000 proceeds to step 4013 where a candidate point segment is created and the process 4000 continues at step 3911.

At step 4005, if the intersection falls between segment_2 then the process 4000 proceeds to step 4007. Otherwise, the process 4000 proceeds to step 4009. At step 4007 if the next segment (i.e. following segment_1) of edge_1 is co-linear with segment_2 then the process 4000 continues at the next at 4015. Otherwise, the process 4000 proceeds to step 4011. At step 4009, if the next segment of edge_2 (i.e. following segment_2) or segment_2 is co-linear with the next segment of edge_1 (i.e. following segment_1) or segment_1 then the process 4000 proceeds to step 4015. Otherwise, the process 4000 proceeds to step 4011.

In the co-linear marking process 4100 of flow chart 4100, all new points (i.e. INSTN point, ST_COL point or END_COL point) that are inserted into edges between segments, are sorted in ascending order. The process 4100 is preferably implemented as an application program being resident on the hard disk drive 310 and being read and controlled in its execution by the processor 305. The edges are sorted based on their alpha values where an alpha value is defined as the distance between a new point and the starting point of the segment scaled to a value between 0 and 1 inclusive with respect to the length of the segment. For points with equivalent alpha value, the new point will be inserted after the existing points. However, among points with equivalent alpha values, a ST_COL point is always inserted before an END_COL point, which is always inserted at the end of an edge. All new points are inserted between a current segment except in the case where the starting point of a current segment is the starting point of a current edge and the new point being inserted is classified as an ST_COL point with co-ordinates exactly equivalent to the starting point of the current segment. Such a new ST_COL point is inserted before the starting point of the current edge.

Figure 43:
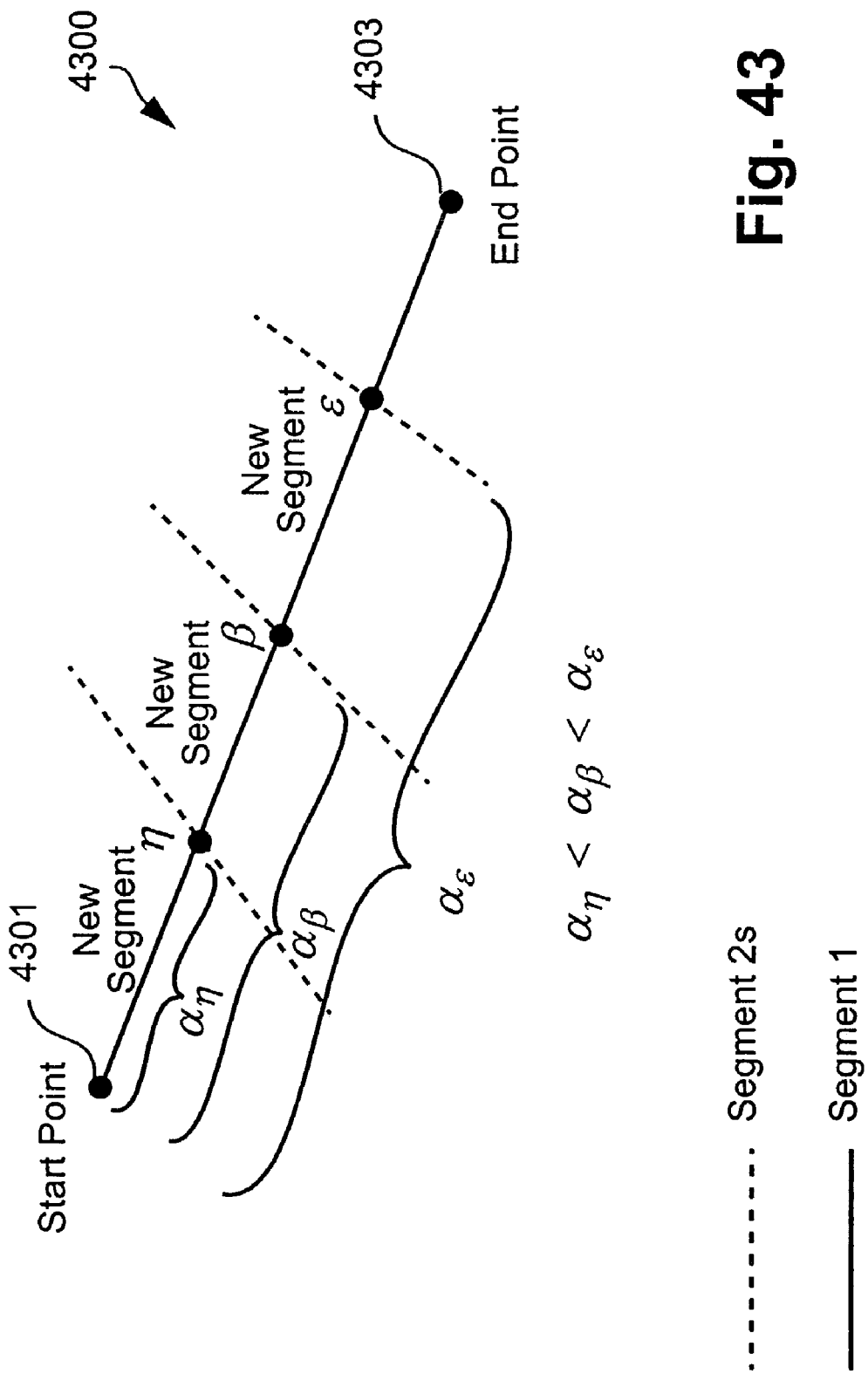
FIG. 43 shows a segment being split by an intersection point into two segments.

New points are sorted in the manner described above in order to enable new segments and co-linear segments to be clearly identified. Conceptually, an intersection point splits an existing segment into two segments, as seen by the example of FIG. 43 for the segment having a start point 4301 and an end point 4303.

As described above, the co-linear marking process 4100 classifies an intersection point into an ST_COL or an END_COL point. In the co-linear marking process 4100, a new ST_COL point is created and inserted into segment_1 of edge_1 if the intersection point represents the start of a co-linear point for edge_1. Otherwise, an END_COL point is created. A similar process is repeated for segment_2 of edge_2. Subsequently, edge_1 and edge_2 are traversed to identify a common point where co-linearity between the edges ends. The common point is then classified into a ST_COL or an END_COL point for both edge_1 and edge_2 based on the classification of the intersection point earlier.

Also, while traversing edge_1 and edge_2 during the process 4100, candidate segments are created and added to the candidate segment list. The number of candidate segments being created per pair of co-linear segments depends on the interior of edge_1 and edge_2. If the interior of edge_1 and edge_2 coincide, then a candidate segment is created. Otherwise, two candidate segments are created. The interior of edge_1 and edge_2 are considered to coincide if clip rules associated with edge_1 and edge_2 and their direction, are similar, and if their associated clip rules (as described above with reference to Table 1) and direction are different. Otherwise the interior of edge_1 and edge_2 are not considered to coincide.

The co-linear marking process 4100 begins at step 4101 where if the intersection point represents the start of a co-linear point for edge_1 then the process 4100 proceeds to step 4113. Otherwise, the process 4100 proceeds to step 4103. At step 4113, a new ST_COL point having the co-ordinates of the intersection point is inserted into the edge_1 between the starting and ending point of segment_1 in a sorted manner (i.e. as described above), and the process 4100 proceeds to step 4105. At step 4103 a new END_COL having the co-ordinates of the intersection point is inserted into edge_1 between the starting and ending point of segment_1 in a sorted manner and the process 4100 proceeds to step 4105. At step 4105 if the intersection point represents the start of a co-linear point for edge_2 then the process 4100 proceeds step 4115. Otherwise, the process 4100 proceeds to step 4107. At step 4115, a new ST_COL point having the co-ordinates of the intersection point is inserted into the edge_2 between the starting and ending point of segment_2 in a sorted manner, and the process proceeds to step 4109. At step 4107 a new END_COL point having the co-ordinates of the intersection point is inserted into edge_2 between the starting and ending point of segment_1 in a sorted manner and the process 4100 proceeds to step 4109.

At step 4109 if the clip rule (see Table 1) of edge_1 is equal to the clip rule of edge_2 then the process 4100 proceeds to step 4117. Otherwise, the process 4100 proceeds to step 4111. At step 4117, if the direction of edge_1 is equal to the direction of edge_2 then the process 4100 proceeds to step 4119 where a flag 'n canseg' stored in memory 601 is set equal to one by the processor 305. Otherwise, the process 4100 proceeds to step 4121 where the flag is set equal to two and the process 4100 continues to the next step 4127. As will be described below, the flag n_canseg stored in memory is used at step 4127 to determine the number of candidate segments to be created. At step 4111, if the direction of edge_1 is equal to the direction of edge_2 then the process 4100 proceeds to step 4125 where the flag 'n_canseg' is set equal to two. Otherwise, the process 4100 proceeds to step 4123 where the flag is set equal to one and the process 4100 continues to the next step 4127.

At step 4127, edge_1 and edge_2 are traversed until the point (i.e. common_point) where co-linearity stops is determined by the processor 305. During the traversal of edge_1 and edge_2 one or two candidate segments (i.e. depending on the value of the flag n_canseg) are created along the co-linear section of the edges. Each of the segments from each_1 and edges_2 that are traversed during the process 4100 of step 4127 is marked by the processor 305. The process of flow chart 4100 continues at the next step 4129, where if the intersection point represents the start of a co-linear point for edge_1 then the process 4100 proceeds to step 4131. Otherwise, the process 4100 proceeds to step 4133. At step 4131, a new END_COL point having the co-ordinates of the common_point is inserted into edge_1 between the starting and ending point of the segment where co-linearity stops, in a sorted manner (i.e. as described above), and the process proceeds to step 4135. At step 4133, a new ST_COL point having the co-ordinates of the common_point is inserted into edge_1 between the starting and ending point of the segment where co-linearity stops, in a sorted manner and the process 4100 proceeds to step 4135.

At step 4135, if the intersection point represents the start of a co-linear point for edge_2 then the process 4100 proceeds step 4137. Otherwise, the process 4100 proceeds to step 4139.

At step 4137, a new END_COL point having the co-ordinates of the common_point is inserted into the edge_2, by the processor 305, between the starting and ending point of the segment where co-linearity stops, in a sorted manner (i.e. as described above), and the process 4100 concludes. At step 4139, a new ST_COL point having the co-ordinates of the common_point is inserted, by the processor 305, into edge_2 between the starting and ending point of the segment where co-linearity stops, in a sorted manner and the process of flow chart 4100 concludes.

Figure 44:
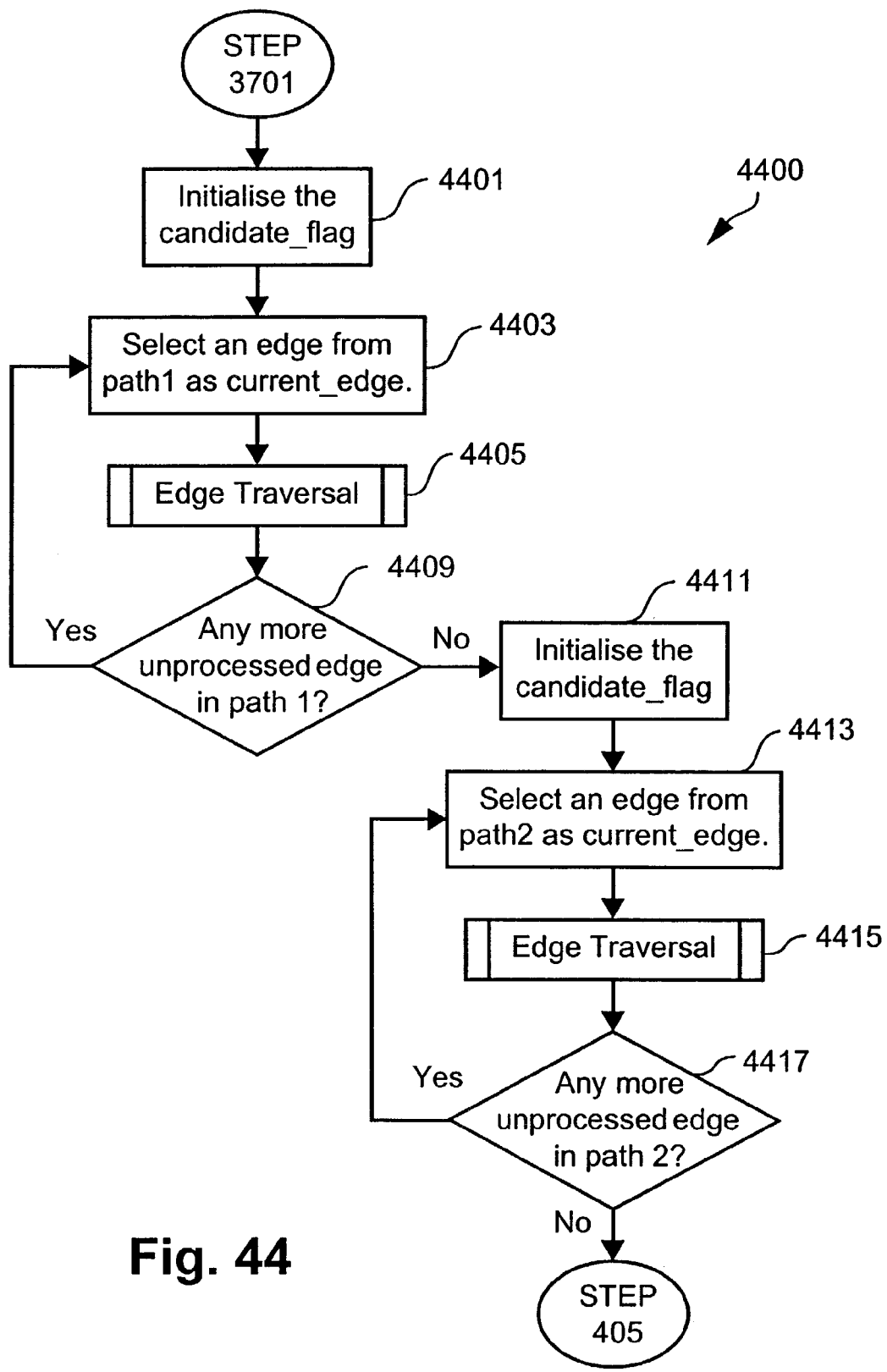
FIG. 44 is a flow chart showing a Path Traversal process.
Figure 45A:
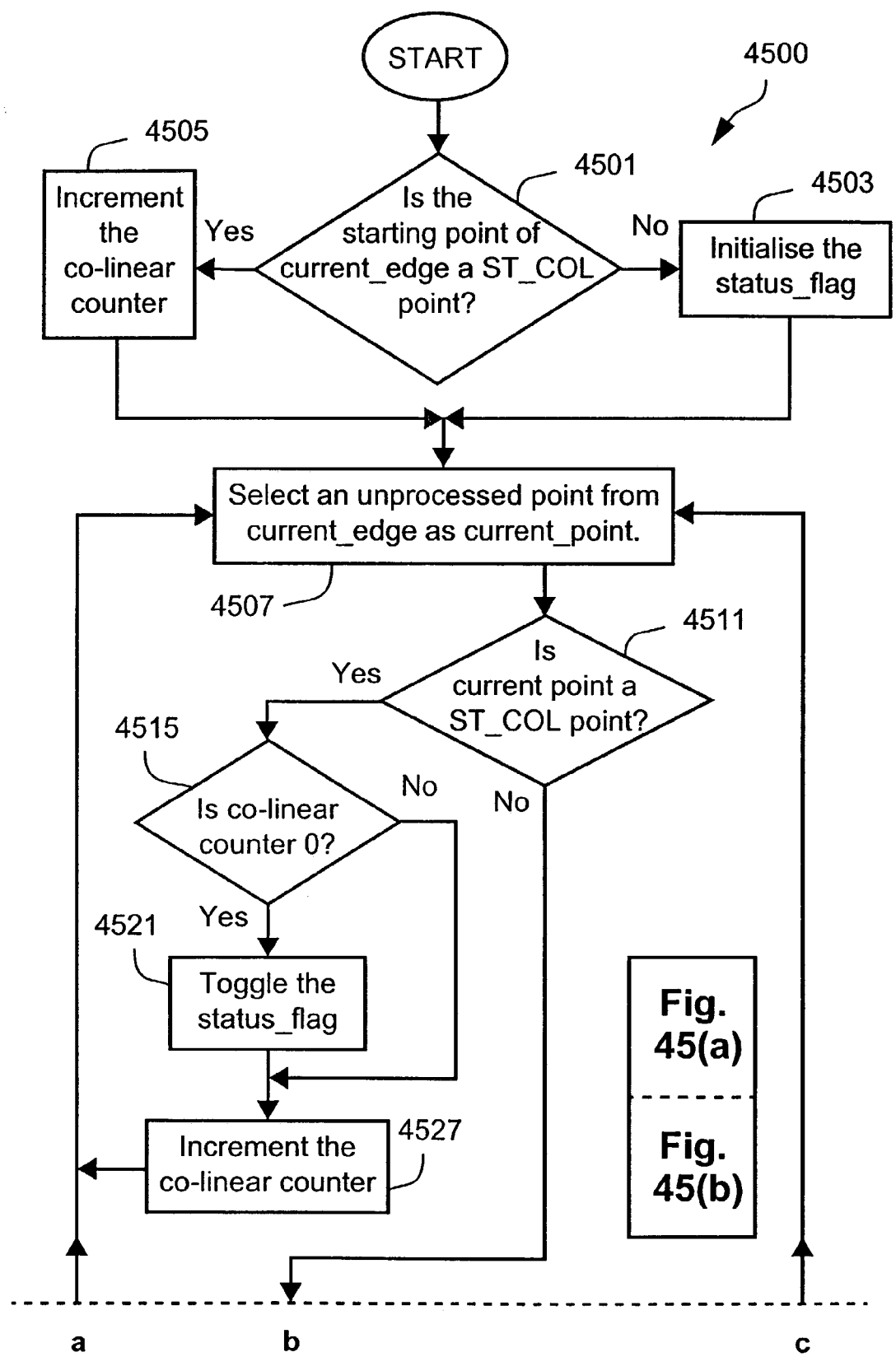
FIG. 45 is a flow chart showing an Edge Traversal process.
Figure 45B:
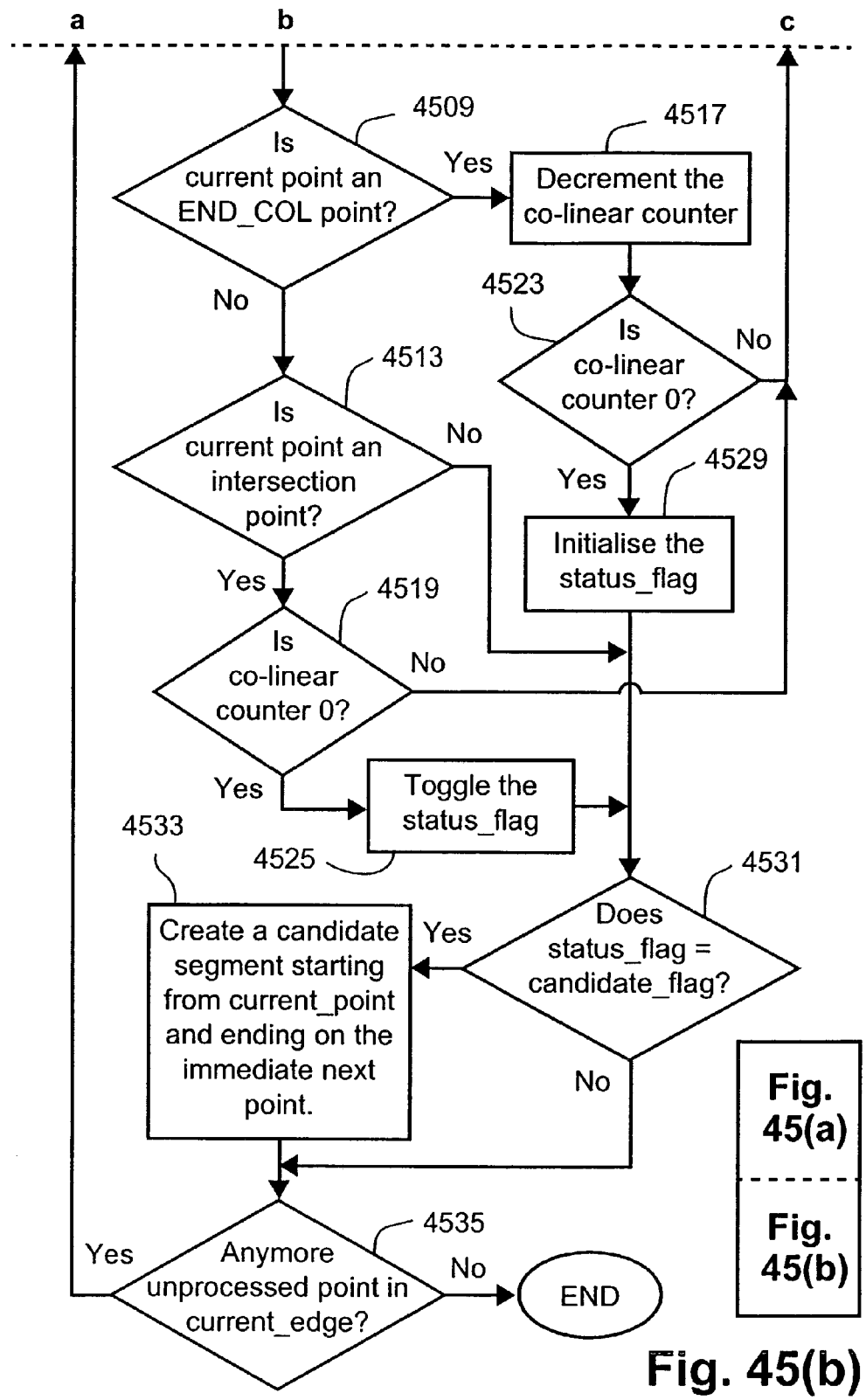

Returning to the simple path intersection process of flow chart 3700, following step 3701 the process 3700 proceeds to step 3703 where a path traversal process 4400 is executed, by the processor 305, as seen by the flow chart of FIG. 44. The path traversal process 4400 is preferably implemented as an application program being resident on the hard disk drive 310 and being read and controlled in its execution by the processor 305. The path traversal process 4400 traverses all edges in Path1 and Path2. During the process 4400, a candidate flag (preferably assigned the label candidate_flag), which is effective for an entire path, is initialised before any edges in a particular path are traversed. The candidate flag is initialised according to the clip rule for the path, which as described above influences, the resulting set operation executed on the paths. The process 4400 begins at step 4401 where the candidate_flag is initialised. At the next step 4403 an edge is selected by the processor 305 from Path1 and is assigned as the current_edge. The process 4400 continues at the next have 4405, where an edge traversal process 4500 is executed by the processor 305 to examine all of the points in the current_edge in order to determine whether the points are inside or outside the interior of the opposite path. The edge traversal process 4500 will be explained below with reference to the flow chart of FIG. 45. At the next step 4409 of the process 4400, if there are anymore unprocessed edges in Path 1 then the process 4400 returns to step 4403. Otherwise, the process 4400 proceeds to step 4411 where the candidate_flag is initialised for the edges of Path 2. At the next step 4413, an edge is selected by the processor 305 from Path2 and is assigned as the current_edge. The process 4400 continues at the next have 4415, where the edge traversal process 4500 is executed to examine all of the points in the current_edge in order to determine whether the points are inside or outside the interior of the opposite path. At the next have 4417, if there are anymore unprocessed edges in Path2 then the process 4400 returns to step 4413, and the process 4400 proceeds to step 405 of the process 400.

The edge traversal process 4500 is preferably implemented as an application program being resident on the hard disk drive 310 and being read and controlled in its execution by the processor 305. In the edge traversal process 4500, if a current point is classified as an ST_COL point, then a co-linear counter, stored in memory 306, which is used to prevent candidate segments from being output is incremented. A status flag (preferably assigned the label status_ flag) is toggled if prior to the co-linear counter being incremented the value of the counter is zero. However, if the current point is classified as an END_COL point then the co-linear counter is decremented and if its value is zero then the status_flag is reinitialised. A candidate segment is created when the status flag matches the candidate flag. The process 4500 begins at step 4501 where if the starting point of the current_edge is classified as a ST_COL point then the process 4500 proceeds to step 4505. Otherwise, the process proceeds to step 4503. At step 4505 the co-linear counter is incremented, the status_flag is set to the candidate_flag and the process 4500 proceeds to step 4507.

At step 4503 the status_flag is initialised. At the next step 4507 an unprocessed point from the current_edge is selected by the processor 305 as the current_point. At the next step 4511 if the current_point is classified as an ST_COL point then the process 4500 proceeds to step 4515. Otherwise, the process 4500 proceeds to step 4509. At step 4515 if the co-linear counter is equal to zero then the process 4500 proceeds to step 4521 where the status_flag is toggled. Otherwise the process 4500 proceeds directly to step 4527 where the co-linear counter is incremented and the process 4500 returns to step 4507.

At step 4509 if the current_Point is classified as an END_COL point then the process 4500 proceeds to step 4517 where the co-linear counter is decremented by the processor 305. Otherwise, the process 4500 proceeds to step 4513. At the next step 4523, if the co-linear counter stored in memory 306 is not equal to zero then the process returns to step 4507. Otherwise, the process 4500 proceeds to step 4529 where the status_flag is initialised.

At step 4513 if the current_point is classified as an intersection point then the process 4500 proceeds to step 4519. Otherwise, the process 4500 proceeds to step 4513. At step 4519 if the co-linear counter is equal to zero then the process 4500 proceeds to step 4525 where the status_flag is toggled. Otherwise, the process 4500 returns to step 4507.

At step 4531, if the status_flag is equal to the candidate_flag then the process 4500 proceeds to step 4533. Otherwise, the process 4500 proceeds directly to step 4535. At step 4533, a candidate segment is created starting from the current_point ending on the immediate next point. If there are anymore unprocessed points in the current_edge at step 4535, then the process 4500 returns to step 4507. Otherwise, the process 4500 concludes.

Returning to the flow chart 400, following the simple path intersection process 3700 of step 403 the process 400 concludes at the next step 405.

At step 405, an outline construction process is executed in order to form the resulting outline path from the candidate segments created during the simple path intersection process of step 403. The outline construction process is similar to the simple outline conversion process of step 401. The only difference is that the intersection detection process of step 609 and the processing intersection process of step 611, and all related sub-steps, are not executed by the processor 305 for the outline construction process. Instead, steps 609 and 611 are replaced in the process of step 405 with a single step to update the active segment table in accordance with the next bandline. Further, the fill rule associated with the paths can be assumed to be either the odd-even winding fill rule or the non-zero winding fill rule for the outline construction process.

The methods described above only require paths to be comprised of closed edges (i.e. polygons) and are able to process paths where edges can represent polygons of arbitrary complexity with no restrictions on the location of each edge being processed. In particular, degenerate paths with partial or full co-linear segments, segments starting and/or ending on another segment, segments starting and/or ending on the starting or ending vertex of another segment, and segments which are coincident with intersection points of the degenerate cases, can all be processed in accordance with the methods described above.

The methods described above can also process paths which are configured in accordance with either the odd even winding fill rule or the non-zero winding fill rule. A person skilled in the relevant art would appreciate that only minor modifications need to be made to the methods described above in order to process paths configured in accordance with other fill rules known in the art. Further, the methods described above are very accurate since the methods do not move or perturb any vertex when processing degenerate paths (i.e. all vertices are processed in their original position).

Finally, the methods described above are considerably simpler and faster than conventional path processing methods. The methods described above produce an outline path, which is much less restrictive then the input paths from which the outline paths resultant. Therefore, only a minimal amount of adaptation, if any, is required during downstream processing of the input paths. Further, speed gains are realised in such downstream processing since the resulting outline path is simple.

The foregoing describes only some embodiments of the present invention, and modifications and/or changes can be made thereto without departing from the scope and spirit of the invention, the embodiments being illustrative and not restrictive. For example, the above-described methods can be executed with spline segments if the spline segments have previously been vectorised.

The invention claimed is:

1. A computer implemented method of determining an output path for use in rendering one or more graphical objects, said method comprising the steps of:
    (a) converting two or more input paths defining outlines or part thereof of said graphical objects into corresponding simple outline paths, each of said input paths comprising one or more closed edges having direction and an associated one of a plurality of fill rules, each of said edges comprising one or more original segments of said outlines, each of said simple outline paths having direction and comprising one or more of said original segments or parts thereof, the conversion of each of said input paths being dependent on the associated fill rule, wherein at least one of said input paths comprises an odd-even fill rule and is configured such that a result of rendering said at least one input path differs using another of said plurality of fill rules, and wherein each said simple outline path is configured such that a result of rendering said simple outline path is the same using any one of said plurality of fill rules;
    (b) intersecting at least one original segment from one of said simple outline paths with at least one original segment from at least another one of said simple outline paths, depending on a predetermined set operation, to select one or more of said original segments or parts thereof to be used in said output path; and
    (c) merging said selected original segments or parts thereof to form said output path represented as a simple outline path, wherein each said simple outline path is configured such that a result of rendering said simple outline path is the same using any one of said plurality of fill rules.

2. A method according to claim 1, wherein step (a) comprises the following sub-steps for each of said input paths:
    (a1) dividing a space in which said input paths are defined into a plurality of bands such that each of said original segments or parts thereof, have at least one corresponding band;

(a2) examining each of said bands and classifying each of said original segments or parts thereof, contained within each of said bands depending on the position and/or direction of said original segments within a corresponding band;

(a3) creating further segments within each of said bands depending on said examination;

(a4) assigning at least one of said original segments or parts thereof, and/or said further segments to be border segments, depending on the position and classification of each of said original segments or parts thereof, and/or said further segments contained within a corresponding band; and (a5) combining at least one of said border segments to form at least one edge to produce at least one of said simple outline paths for a corresponding input path.

3. A method according to claim 1, wherein step (b) comprises the following sub-steps for each point of intersection between said corresponding simple outline paths:

(b1) classifying said point of intersection;

(b2) inserting said classified point into any of said original segments corresponding to said point; and (b3) identifying additional segments and co-linear edges based on said classification and insertion.

4. A method according to claim 3, wherein said classified point is selected as part of said output path.

5. A method according to claim 3, wherein step (b) comprises the further sub-steps of:

(b4) selecting one or more of said original segments to be used in said output path, based on said identified additional segments and co-linear edges.

6. A method according to any one of claims 3 to 5, wherein said co-linear edges are identified based on a direction of said edges and said predetermined set operation.

7. A method according to claim 5, wherein step (b) comprises the further sub-step of traversing said corresponding representations, for each point of intersection, to select one or more of said original segments to be used in said output path.

8. A method according to claim 7, wherein said one or more of said original segments are selected based on said predetermined set operation.

9. A method according to claim 2, wherein step (c) comprises the sub-steps of repeating steps (a1) to (a5) for each of said simple outline paths associated with said input paths in order to form said output path.

10. A method according to claim 3, wherein said points are classified at sub-step (b1) as one of a pure intersection point, a start of a co-linear point or an end of a co-linear point.

11. A method according to claim 1, wherein said fill rules include at least the odd-even winding fill rule and the non-zero winding fill rule.

12. A method according to claim 2, wherein each of said bands is processed independently.

13. A method according to claim 12, wherein each of said original and said further segments contained within a band is processed in order of decreasing leftness as herein before defined.

14. A method according to claim 13, wherein said original segments, or parts thereof, which exist within a band currently being processed, are stored.

15. A method according to claim 2, wherein each of said bands is defined by a plurality of band lines, such that each of said band lines intersects at least one vertex of at least one edge defined by said input paths.

16. A method according to claim 15, wherein repeated band lines are discarded.

17. A method according to claim 2, wherein the assignment of said original segments and/or said further segments as border segments at sub-step (a4), is dependent on any intersection of said original segments and/or said further segments contained within a band.

18. A method according to claim 2, wherein the assignment of an original segment and/or further segment as a border segment at sub-step (a4), is dependent on the direction of a particular original segment and/or further segment.

19. A method according to claim 15, wherein each of said original segments remain stationary with respect to said bandlines.

20. A method according to claim 2, wherein said classification includes horizontal and vertical segments.

21. A method according to claim 2, wherein classification of a particular original or further segment at sub-step (a2) is dependent upon points in said particular original or further segment.

22. A method according to claim 21, wherein said points in said particular original or further segment are classified as a Combo point or a Local Minimum point, as herein before defined, depending on the position of a point relative to at least one of said band lines.

23. A method according to claim 2, wherein said original segments are split if more than one original segment is incident on a particular point.

24. A method according to claim 15, wherein original segments starting and ending at a particular point on a band line are split.

25. A method according to claim 1, wherein said predetermined set operation is one of an intersection operation, a union operation or a difference operation.

26. An apparatus for determining an output path for use in rendering one or more graphical objects, said apparatus comprising:

conversion means for convening two or more input paths defining outlines or part thereof of said graphical objects into corresponding simple outline paths, each of said input paths comprising one or more closed edges having direction and an associated one of a plurality of fill rules, each of said edges comprising one or more original segments of said outlines, each of said simple outline paths having direction and comprising one or more of said original segments or parts thereof, the conversion of each of said input paths being dependent on the associated fill rule, wherein at least one of said input paths comprises an odd-even fill rule and is configured such that a result of rendering said at least one input path differs using another of said plurality of fill rules, and wherein each said simple outline path is configured such that a result of rendering said simple outline path is the same using any one of said plurality of fill rules;

intersection means for intersecting at least one original segment from one of said simple outline paths with at least one original segment from at least another one of said simple outline paths, depending on a predetermined set operation, to select one or more of said original segments or parts thereof to be used in said output path; and combination means for merging said selected original segments or parts thereof to form said output path represented as a simple outline path, wherein each said simple outline path is configured such that a result of rendering said simple outline path is the same using any one of said plurality of fill rules.

27. An apparatus according to claim 26, further comprising:
- division means for dividing a space in which each of said input paths are defined into a plurality of bands such that each of said original segments or parts thereof, have at least one corresponding band;
- examination means for examining each of said bands and classifying each of said original segments or parts thereof, contained within each of said bands depending on the position and/or direction of said original segments within a corresponding band;
- segment creation means for creating further segments within each of said bands depending on said examination; and
- assign means for assigning at least one of said original segments or parts thereof, and/or said further segments to be border segments, depending on the position and classification of each of said original segments or parts thereof, and/or said further segments contained within a corresponding band, wherein said combination means combines at least one of said border segments to form at least one edge to produce at least one of said simple outline paths for a corresponding input path.

28. An apparatus according to claim 26, further comprising:
- classification means for classifying each point of intersection;
- insertion means for inserting said classified point into any of said original segments corresponding to said point; and
- identification means for identifying additional segments and co-linear edges based on said classification and insertion.

29. An apparatus according to claim 28, wherein said classified point is selected as part of said output path.

30. An apparatus according to claim 28, further comprising selection means for selecting one or more of said original segments to be used in said output path, based on said identified additional segments and co-linear edges.

31. An apparatus according to any one of claims 28 to 30, wherein said co-linear edges are identified based on a direction of said edges and said predetermined set operation.

32. An apparatus method according to claim 30, further comprising traversal means for traversing said corresponding representations, for each point of intersection, to select one or more of said original segments to be used in said output path.

33. An apparatus according to claim 32, wherein said one or more of said original segments are selected based on a predetermined set operation.

34. An apparatus according to claim 28, wherein said points are classified as one of a pure intersection point, a start of a co-linear point or an end of a co-linear point.

35. A computer readable medium encoded with a computer program recorded therein for determining an output path for use in rendering a graphical object, said computer program comprising:
- computer program code for convening two or more input paths defining outlines or parts thereof of said graphical objects into corresponding simple outline paths, each of said input paths comprising one or more closed edges having direction and an associated one of a plurality of fill rules, each of said edges comprising one or more original segments of said outlines, each of said simple outline paths having direction and comprising one or more of said original segments or parts thereof, the conversion of each of said input paths being dependent on the associated fill rule, wherein at least one of said input paths comprises an odd-even fill rule and is configured such that a result of rendering said at least one input path differs using another of said plurality of fill rules, and wherein each said simple outline path is configured such that a result of rendering said simple outline path is the same using any one of said plurality of fill rules;
- computer program code for intersecting at least one original segment from one of said simple outline paths with at least one original segment from at least another one of said simple outline paths, depending on a predetermined set operation, to select one or more of said original segments or parts thereof to be used in said output path; and
- computer program code for merging said selected original segments or parts thereof to form said output path as, a simple outline path, wherein each said simple outline path is configured such that a result of rendering said simple outline path is the same using any one of said plurality of fill rules.

36. A computer readable medium according to claim 35, further comprising:
- computer program code for dividing a space in which each of said input paths are defined into a plurality of bands such that each of said original segments or parts thereof, have at least one corresponding band;
- computer program code for examining each of said bands and classifying each of said original segments or parts thereof, contained within each of said bands depending on the position and/or direction of said original segments within a corresponding band;
- computer program code for creating further segments within each of said bands depending on said examination;
- computer program code for assigning at least one of said original segments or parts thereof, and/or said further segments to be border segments, depending on the position and classification of each of said original segments or parts thereof, and/or said further segments contained within a corresponding band; and
- computer program code for combining at least one of said border segments to form at least one edge to produce at least one of said simple outline paths for a corresponding input path.

37. A computer readable medium according to claim 35, wherein for each point of intersection between said corresponding input paths, said computer program product comprises:
- computer program code for classifying each point of intersection between said corresponding input paths;
- computer program code for inserting said classified point into any of said original segments corresponding to said point; and
- computer program code for identifying additional segments and co-linear edges based on said classification and insertion.

38. A computer readable medium according to claim 37, wherein said classified point is selected as part of said output path.

39. A computer readable medium according to claim 37, further comprising code for selecting one or more of said original segments to be used in said output path representation, based on said identified additional segments and co-linear edges.

* * * * *

UNITED STATES PATENT AND TRADEMARK OFFICE
CERTIFICATE OF CORRECTION

PATENT NO. : 7,321,373 B2
APPLICATION NO. : 10/323804
DATED : January 22, 2008
INVENTOR(S) : Sim Thong Yap It is certified that error appears in the above-identified patent and that said Letters Patent is hereby corrected as shown below:

COLUMN 8:

Line 16, "$x_3<X_4$." should read --$x_3<x_4$.--.
Line 29, "file" should read --fill--.

COLUMN 12:

Line 37, "$S_{13}$ flag" should read --S_flag--.

COLUMN 16:

Line 15, "ST_split point" should read --ST_split_point--.

COLUMN 17:

Line 1, "ST_split point" should read --ST_split_point--.
Line 48, "to-ACTIVE" should read --to ACTIVE--.

COLUMN 22:

Line 64, "next right_segment" should read --next_right_segment--.

COLUMN 23:

Line 26, "left segment" should read --left_segment--.

COLUMN 36:

Line 7, "ending segment" should read --ending-segment--.
Line 11, "starting_segent" should read --starting_segment--.
Line 38, "5300 5300" should read --5300--.

COLUMN 39:

Line 35, "edge_(i.e." should read --edge_1 (i.e.--.

COLUMN 40:

Line 11, "at 4015." should read --4015.--.

UNITED STATES PATENT AND TRADEMARK OFFICE
CERTIFICATE OF CORRECTION

PATENT NO. : 7,321,373 B2
APPLICATION NO. : 10/323804
DATED : January 22, 2008
INVENTOR(S) : Sim Thong Yap It is certified that error appears in the above-identified patent and that said Letters Patent is hereby corrected as shown below:

COLUMN 41:

Line 34, "'n canseg'" should read --'n_canseg'--.
Line 53, "each_1 and edges_2" should read --edge_1 and edge_2--.

COLUMN 43:

Line 16, "current_Point" should read --current_point--.

COLUMN 46:

Line 36, Claim 26 "convening" should read --converting--.

COLUMN 47:

Line 56, Claim 35 "convening" should read --converting--.

Signed and Sealed this

Tenth Day of March, 2009

JOHN DOLL
*Acting Director of the United States Patent and Trademark Office*